United States Patent [19]
Waitz et al.

[11] Patent Number: 6,004,095
[45] Date of Patent: Dec. 21, 1999

[54] REDUCTION OF TURBOMACHINERY NOISE

[75] Inventors: Ian A. Waitz, South Natick; John M. Brookfield, Somerville, both of Mass.; Julian Sell, Ann Arbor, Mich.; Belva J. Hayden, McLean, Va.; K. Uno Ingard, Kittery Point, Me.

[73] Assignee: Massachusetts Institute of Technology, Cambridge, Mass.

[21] Appl. No.: 08/661,281

[22] Filed: Jun. 10, 1996

[51] Int. Cl.⁶ .................................................. F01D 5/26
[52] U.S. Cl. .......................... 415/119; 415/914; 415/115; 416/97 R
[58] Field of Search .................................... 415/914, 115, 415/116, 119, 58.5, 58.7, 173.2; 416/91, 92, 96 A, 97 R

[56] References Cited

U.S. PATENT DOCUMENTS

| | | | |
|---|---|---|---|
| 2,933,238 | 4/1960 | Stalker | 415/58.5 |
| 3,572,960 | 3/1971 | McBride | 415/914 |
| 3,820,628 | 6/1974 | Hanson | 181/33 HC |
| 4,419,045 | 12/1983 | Andre et al. | 415/914 |
| 5,169,288 | 12/1992 | Gliebe et al. | 415/119 |
| 5,217,349 | 6/1993 | Succi | 415/119 |
| 5,232,338 | 8/1993 | De Paul et al. | 415/914 |
| 5,474,417 | 12/1995 | Privett et al. | 415/914 |
| 5,480,284 | 1/1996 | Wadia et al. | 416/92 |
| 5,601,399 | 2/1997 | Okpara et al. | 415/115 |

OTHER PUBLICATIONS

Reid et al., "Prelim. Invest. On Boundary Layer Control by Means of Suction and Pressure with the USA 27 Airfoil," *Tech. Notes, Nat. Advisory Comm. for Aeronautics*, No. 286, May, 1928.

Pierpont, "Invest. of Suction–Slot Shapes for Controlling a Turbulent Boundary Layer," *Tech. Notes, Nat. Advisory Comm. for Aeronautics*, No. 1292, Jun. 1947.

Goldstein, "Low–Drag and Suction Airfoils," *Journal of the Aeronautical Sciences*, vol. 15, No. 4, pp. 189–220, Apr., 1948.

(List continued on next page.)

*Primary Examiner*—Edward K. Look
*Assistant Examiner*—Richard Woo
*Attorney, Agent, or Firm*—Theresa A. Lober

[57] ABSTRACT

In the invention, propagating broad band and tonal acoustic components of noise characteristic of interaction of a turbomachine blade wake, produced by a turbomachine blade as the blade rotates, with a turbomachine component downstream of the rotating blade, are reduced. This is accomplished by injection of fluid into the blade wake through a port in the rotor blade. The mass flow rate of the fluid injected into the blade wake is selected to reduce the momentum deficit of the wake to correspondingly increase the time-mean velocity of the wake and decrease the turbulent velocity fluctuations of the wake. With this fluid injection, reduction of both propagating broad band and tonal acoustic components of noise produced by interaction of the blade wake with a turbomachine component downstream of the rotating blade is achieved. In a further noise reduction technique, boundary layer fluid is suctioned into the turbomachine blade through a suction port on the side of the blade that is characterized as the relatively low-pressure blade side. As with the fluid injection technique, the mass flow rate of the fluid suctioned into the blade is here selected to reduce the momentum deficit of the wake to correspondingly increase the time-mean velocity of the wake and decrease the turbulent velocity fluctuations of the wake; reduction of both propagating broad band and tonal acoustic components of noise produced by interaction of the blade wake with a turbomachine component downstream of the rotating blade is achieved with this suction technique. Blowing and suction techniques are also provided in the invention for reducing noise associated with the wake produced by fluid flow around a stationary blade upstream of a rotating turbomachine.

49 Claims, 23 Drawing Sheets

OTHER PUBLICATIONS

Magliozzi et al., Propeller & Propfan Noise, Ch. 1, pp. 1–64, *Aeroacoustics of Flight Vehicles: Theory and Practice,* vol. 1: "Noise Sources," NASA Ref. Pub. 1258, vol. 1, Aug., 1991.

Groeneweg et al., "Turbomachinery Noise," Ch. 3, pp. 151–209, *Aeroacoustics of Flight Vehicles Theory and Practice,* vol. 1: "Noise Sources," NASA Ref. Pub. 1258, vol. 1, Aug., 1991.

Park et al., "The effect of jet injection geometry on two–dimensional momentumless wakes," *J. Fluid Mech.,* vol. 224, pp. 29–47, 1991.

Corcoran, "Control of the Wake From a Simulated Blade by Trailing–Edge Blowing," Master of Science Thesis, Dept. Mech. Eng., Lehigh University, Feb. 1992.

Naumann, "Control of the Wake From a Simulated Blade by Trailing Edge Blowing," Master of Science Thesis, Dept. of Mech. Eng., Lehigh University, Jul. 1992.

Fournier, "Manipulation of the wake of a 2D wing in order to reduce propeller noise," *13 ème Colloque d'Aéro et d'Hydroacoustique,* Lyon, France, Jun. 9–11, 1993.

Leu et al., "Free Shear Layer Control and its Application to Fan Noise," AIAA Shear Flow Conference, AIAA 93–3242, Orlando, Florida, Jul. 6–9, 1993.

Hayden, "Two–Dimensional Analysis of Rotor Suction and the Impact on Rotor–Stator Interaction Noise," Master of Science Thesis, Dept. Aeronautics, MIT, Sep. 1994.

Waitz et al., "Prelim. Assessment of Wake Management Strat. for Reduction of Turbomachinery Fan Noise," $1^{st}$ Joint CEAS/AIAA Aeroacoustics Conf., CEAS/AIAA–95–102, Mun, Germ., Jun. 1995.

NO TREATMENT

TRAILING EDGE BLOWING

BOUNDARY LAYER SUCTION

REDUCTION OF TURBOMACHINERY NOISE

GOVERNMENT RIGHTS IN THE INVENTION

This invention was made with U.S. Government support under NASA Contract Number NAG1-1512. The U.S. Government has certain rights in this invention.

FIELD OF THE INVENTION

This invention relates to techniques for reducing noise associated with turbomachinery wakes, and more particularly relates to techniques for reducing noise associated with rotor wake-stator interaction in gas turbine engines.

BACKGROUND OF THE INVENTION

The noise generated by gas turbine engines can be broadly classified into three categories, namely, source noise such as fan and compressor noise, core noise, and jet noise. The first of these, fan noise, is expected to be the most important community noise source for next-generation subsonic aircraft engine technology. The reduction of aircraft community noise, i.e., the noise impact on residential communities, has become a major consideration in subsonic aircraft engine design. Since the 1960's, when the aircraft industry moved to favor high bypass ratio turbofan engines in an effort to increase engine efficiency, there have been only evolutionary advances in methods to reduce aircraft noise. But as regulatory standards for community noise continue to tighten, quieter higher thrust engines are required. In particular, a goal of reduction in current-day engine noise levels by an amount corresponding to a 6 dB effective perceived noise level (EPNL) has been established by the NASA Advanced Subsonic Technology Program. Conventional noise reduction technology is insufficient in meeting this goal.

For the case of subsonic fan tip speed, gas turbine engine fan noise generally is dominated by unsteady loading on both the stator/pylons and rotor. This unsteady loading arises from interaction of the stator/pylons and rotor with both random and periodic gusts introduced by a variety of sources. The most significant sources for these gusts are the blade wakes and tip clearance flows. Specifically, the interaction of the rotor blade wake and rotor blade clearance flow with the stator are expected to be a dominant noise sources on the next generation of gas turbine engines.

The fan rotor wake of a high speed gas turbine engine differs considerably from that associated with a two-dimensional, low speed airfoil. In the latter case, rotor wake-stator interaction, as well as unsteady stator loading due to interaction with endwall flows, are classically considered as periodic phenomena. In contrast, in high speed fans such as gas turbine engines, these phenomena are sources for pressure fluctuations with rich spectral content. Indeed, the wake structure of high speed compressor and fan blades has been the subject of considerable study due to their influence on stage efficiency as well as their impact on the interpretation of compressor performance measurements.

The blade wake structure produced by high speed fans is primarily determined by two design characteristics of modern machines, namely, the large variation in spanwise boundary layer loading resulting from a low hub-to-tip ratio geometry aimed at uniform spanwise total pressure rise, and the high degree of unsteadiness resulting largely from the high boundary layer loading and shock wave boundary layer interaction on sections of the blade designed to have supersonic speeds. These design characteristics thus produce a highly unsteady blade wake. In the case of a gas turbine engine compressor rotor, the interaction of the unsteady rotor blade wake velocity field with a down-stream stator results in an acoustic field that is harmonically much richer than would be expected from the classic airfoil wake-stator analysis.

The source of high-speed blade wake unsteadiness is generally agreed to be associated with two boundary layer phenomena, namely, vortex shedding in the wake, and diffuser instabilities. Vortex shedding in the wake is a condition similar to that of a von Karman vortex street except that it is quite three-dimensional, and that the shedding frequency is time-dependent. The vortex shedding is modulated at low frequencies, i.e., at about $\frac{1}{10}$ rotor blade passing, by diffuser-like instabilities within the blade passages. Compressor rotor blading is typically designed using a two-dimensional diffuser criterion to be just at the point where the diffuser pressure recovery drops precipitously, i.e., in the regime of diffuser instability.

Several methods for reducing fan noise have been proposed; e.g., Groeneweg et al., in "Aeroacoustics of Flight Vehicles: Theory and Practice; Vol. 1: Noise Sources; Turbomachinery Noise," NASA RP 1258, August, 1991; suggests the addition of fan duct acoustic treatments to absorb noise, the design of rotor blades with minimum blade section drag at operating conditions where noise levels are critical, the design of fans with a rotor-to-stator spacing that is large enough for the rotor wakes to decay and mix before impinging the stator blades, increase in the number of rotor wakes, and increase in the stator chord to reduce the unsteady lift response associated with wake-stator interaction. These methods are generally employed to some extent in current gas turbine engine technology, but are insufficient to significantly reduce radiated engine noise, and are not capable of meeting the 6 EPNdB noise reduction goal set by NASA.

SUMMARY OF THE INVENTION

The invention provides techniques for reducing the noise associated with rotor wake-stator interaction to a degree heretofore unachievable. Specifically, in the invention, propagating broad band and tonal acoustic components of noise characteristic of interaction of a turbomachine blade wake, produced by a turbomachine blade as the blade rotates, with a turbomachine component downstream of the rotating blade, are reduced. This is accomplished by injection of fluid into the blade wake through a port in the rotor blade at a blade chord line that is at more than about 75% of the blade chord. The mass flow rate of the fluid injected into the blade wake is selected to reduce the momentum deficit of the wake to correspondingly increase the time-mean velocity of the wake and decrease the turbulent velocity fluctuations of the wake. With this fluid injection, reduction of both propagating broad band and tonal acoustic components of noise produced by interaction of the blade wake with a turbomachine component downstream of the rotating blade is achieved.

In a second turbomachine noise reduction technique provided by the invention, boundary layer fluid is suctioned into the turbomachine blade through a suction port on the side of the blade that is characterized as the relatively low-pressure blade side. As with the fluid injection technique, the mass flow rate of the fluid suctioned into the blade is here selected to reduce the momentum deficit of the wake to correspondingly increase the time-mean velocity of the wake and decrease the turbulent velocity fluctuations of the wake;

reduction of both propagating broad band and tonal acoustic components of noise produced by interaction of the blade wake with a turbomachine component downstream of the rotating blade is achieved with this suction technique.

In embodiments of the noise reduction methods, the injected or suctioned fluid mass flow rate is selected to adjust the wake width to at least about 40% of the blade pitch, at a distance downstream of the blade equal to about 1.5 blade chord lengths. Preferably, the injected or suctioned fluid mass flow rate is selected to increase minimum time-mean velocity of the wake to at least about 80% of the time-mean velocity of freestream flow through the turbomachine, at a distance of about 1.5 blade chord lengths downstream of the blade; and preferably, the mass flow rate of the injected or suctioned fluid is selected to reduce the maximum rms of turbulent velocity fluctuation of the wake to less than about 4% of the freestream flow velocity through the turbomachine.

Preferably, the injected or suctioned fluid mass flow rate is selected to produce a wake momentum deficit profile that minimizes amplitudes of propagating tonal modes produced by interaction of the blade wake with a turbomachine component downstream of the rotating blade; more preferably, the produced wake momentum deficit profile minimizes amplitude of propagating acoustic tonal modes higher than a first harmonic of the blade passing frequency.

In embodiments provided by the invention, fluid injected into the blade wake is injected at an angle corresponding to the flow angle characteristic of freestream flow through the turbomachine. The port through which fluid is injected into the wake can in one embodiment include a row of separated slots in the blade at a blade chord line more than about 75% of blade chord.

In other embodiments provided by the invention, the port through which boundary layer fluid is suctioned includes separated slots in a row spanning at least a portion of the blade. Preferably, the boundary layer suction port is at a blade chord location of less than about 80% blade chord.

The invention provides a turbomachine blade with at least one internal passage extending from a corresponding open passage inlet at the hub of the blade to a corresponding open passage outlet at a chord line of more than about 75% of blade chord along at least a portion of blade span. The internal passage has a volume that is substantially sufficient to accommodate fluid mass flow from the passage inlet to the passage outlet. The blade has separated slots along at least a portion of the blade span corresponding to the open passage outlet. Together the slots provide an outlet port having an area that is substantially sufficient to inject into a trailing edge wake produced as the blade rotates a mass flow of fluid that reduces the momentum deficit characteristic of the wake.

Preferably, the slots are angled in the blade at an angle corresponding to a freestream flow angle for the blade; the slots are in one embodiment along substantially the entire blade span. The slots together provide a port area that is about three times as large as combined closed blade areas separating the slots, and the slot width, between blade surfaces, is about one-half the thickness of the blade's trailing edge. In provided embodiments, the blade internal passage is provided as at least three or four internal passages, and each internal passage has a chordwise width that accommodates a steady mass flow through the passage for a choked flow condition at the passage outlet. In one embodiment, the hub of the blade has a coupling to a source of high pressure, that in one embodiment is a gas turbine engine compressor.

The invention further provides a turbomachine blade having at least one internal passage extending from a corresponding passage end region at a point along the span of the blade to a corresponding open passage outlet at the hub or tip of the blade. The volume of the internal passage is substantially sufficient to accommodate fluid mass flow from the passage end region to the passage outlet. The blade has separated slots in a side of the blade that is characterized as the relatively low-pressure blade side, with the slots along at least a portion of the blade span that corresponds to the passage end region. Together the slots provide a suction port having an area that is substantially sufficient to suction into the internal passage from the boundary that is produced as the blade rotates a mass flow of fluid that reduces momentum deficit characteristic of the wake produced as the blade rotates.

In embodiments provided by the invention, the separated slots are provided as at least one row of slots, and for two or more rows of slots, the slots of one row are preferably spanwise-offset from slots in the other rows. The slot rows are located preferably at a blade chord line less than about 80% of blade chord, and the slots are characterized by a rectangular geometry having rounded corners. In one embodiment, the internal passage is provided as at least three internal passages, with each passage end region spanning a portion of the slots. As provided by the invention, the blade tip or blade hub can be coupled to a source of low pressure.

In accordance with the invention, there is provided a turbomachine blade having at least internal mass flow injection passage and injection slots to inject into a trailing edge wake a mass flow of fluid, as well as having at least one internal mass flow suction passage and suction slots to suction from the blade's boundary layer a mass flow of fluid, both for reducing the momentum deficit characteristic of the blade's wake. Here the injection passage has an inlet at the blade hub and the suction passage has an outlet at the blade tip. Preferably, the hub of the blade has a coupling to a source of high pressure and the blade tip has a coupling to a source of low pressure. In one embodiment, the high pressure source is a gas turbine engine compressor and the low pressure source is a pump located in a casing radially peripheral to the blade tip. In one embodiment, a shroud is connected to the blade tip and has a slot corresponding to the suction passage outlet at the blade tip; the shroud can include suction orifii.

In another aspect, the invention provides a turbomachine having a rotor with rotor blades connected at the blades' hubs to a rotor disk for rotation about a radial axis of the disk. A stationary blade upstream of the rotor has at least one internal passage extending between a corresponding open passage inlet at one end to a corresponding open passage outlet at a stationary blade chord line of at least about 75% of blade chord, along at least a portion of the stationary blade span. The internal passage volume is substantially sufficient to accommodate fluid mass flow from the passage inlet to the passage outlet. Separated slots are provided in the stationary blade along at least a portion of the stationary blade span corresponding to the open passage outlet. The slots together provide an outlet port having an area that is substantially sufficient to inject into a trailing edge wake produced as fluid flows around the stationary blade a mass flow that reduces the momentum deficit characteristic of the wake. A coupling path is provided from the open passage inlet of the stationary blade to a compressor for providing a source of high pressure to the internal passage of the blade.

In a further aspect of the invention, there is provided a turbomachine having a rotor with rotor blades connected at the blades' hubs to a rotor disk for rotation about a radial axis of the disk. A stationary blade upstream of the rotor has at least one internal passage extending between a corresponding passage end region at a point along the stationary blade span to an open passage outlet at one end of the stationary blade. The volume of the internal passage is substantially sufficient to accommodate fluid mass flow from the passage end region to the passage outlet. Separated slots are located in a side of the stationary blade along at least a portion of the stationary blade corresponding to the passage end region of the internal passage. The slots together provide a suction port having an area that is substantially sufficient to suction into the internal passage from the boundary layer produced as fluid flows around the stationary blade a mass flow of fluid that reduces the momentum deficit characteristic of the wake produced as fluid flows around the stationary blade. A coupling path is provided from the open passage outlet of the stationary blade to a pump in a casing of the rotor for providing a source of low pressure to the internal passage of the stationary blade.

In other aspects, the invention provides a turbomachine having a rotatable shaft and a support strut engaged with the shaft for supporting the shaft as it rotates. Blades are connected by their hub to the shaft. Each blade has at least one internal blade passage extending from a corresponding open passage inlet for coupling at the blade hub to a source of high pressure to a corresponding open passage outlet at a blade chord line more than about 75% of blade chord along at least a portion of the blade span. The volume of the internal blade passage is substantially sufficient to accommodate fluid mass flow from the passage inlet to the passage outlet. Slots are located in the blade along at least a portion of the blade span corresponding to the open passage outlet of the internal blade passage. The slots together provide an outlet port having an area that is substantially sufficient to inject into a trailing edge wake produced as the blade rotates a mass flow of fluid from the high pressure source that reduces the momentum deficit that is characteristic of the blade wake.

In embodiments provided by the invention, the support strut has an internal strut passage with a passage inlet for coupling to a source of high pressure. Separated slots are located in the strut at a strut chord line of more than about 75% strut chord and along at least a portion of strut span and are connected to the internal strut passage. The slots together provide an outlet port having an area that is substantially sufficient to inject into a trailing edge strut wake produced as fluid flows around the strut a mass flow of fluid from the high pressure source that reduces the momentum deficit characteristic of the strut wake.

In a further aspect of the invention, there is provided a turbomachine having a rotatable shaft and a support strut engaged with the shaft for supporting the shaft as it rotates. Blades are connected by their hub to the shaft. Each blade has at least one internal blade passage extending from a corresponding passage end region at a point along the span of the blade to a corresponding open passage outlet at the hub of the blade for coupling to a source of low pressure. The volume of the internal blade passage is substantially sufficient to accommodate fluid mass flow from the passage end region to the passage outlet. Separated slots are located in the side of the blade characterized as the low-pressure blade side along at least a portion of the blade span that corresponds to the passage end region. Together the slots provide a suction port having an area that is substantially sufficient to suction to the low pressure source through the internal blade passage from a boundary layer produced as the blade rotates a mass flow of fluid that reduces the momentum deficit characteristic of the wake produced as the blade rotates.

In embodiments provided by the invention, the support strut has an internal strut passage with a passage outlet for coupling to a source of low pressure. Separated slots are provided in a side of the strut along at least a portion of the span of the strut. Together the slots provide a suction port having an area that is substantially sufficient to suction to the low pressure source through the internal strut passage from a boundary layer produced as fluid flows around the strut a mass flow of fluid that reduces the momentum deficit characteristic of a strut wake produced as fluid flows around the strut.

The blowing and suction techniques of the invention can be applied to a wide range of turbomachine geometries. A turbomachine having rotating blades adapted in accordance with the invention for wake blowing and/or boundary layer suction can be employed in a variety of applications, including heating, cooling, ventilation, and air-conditioning or other heat exchange systems, for, e.g., supply, exhaust, compression, or return air flow; in industrial exhaust systems, e.g., power roof ventilators; in electrical systems, e.g., for cooling computer components in a computer housing, such as a table top or lap top personal computer; in processed air systems, for, e.g., filtering; in pollution-control systems, for, e.g., sintering or exhaust scrubbing; in mechanical draft systems such as steam-generating units; in drier units; in ground effect machines as a lift pressure mechanism; in air-supported structures as an inflation mechanism; and in many other scenarios in which fluid flow is required, including pumping of liquid, e.g., in a centrifugal pump.

Beyond these applications, the wake blowing and boundary layer suction mechanisms of the invention can be employed on rotating machines such as helicopter tail rotors and counter-rotating propeller fans. Generally, the noise associated with any combination of stationary and rotating blade structures in the path of flowing or pumping fluid can be reduced in accordance with the invention using trailing edge blowing and/or boundary layer suction on the appropriate structures. Axial-flow, radial-flow, combination-flow and other flow configurations can all be accommodated by the invention, and the size of the structures to be adapted for noise reduction is limited only by the mass flow requirements corresponding to a desired noise reduction level. Whatever the size and flow scenario of a given rotating machine, the wake produced by the rotating blades and the wake produced by stationary support or other structures both upstream and downstream from the rotor can be controlled by the wake control configurations of the invention to reduce the noise associated with interaction of those wakes with downstream structures.

Other features and advantages of the invention will be apparent with the claims, and with the following detailed description and accompanying drawings.

DETAILED DESCRIPTION

Figure 1:
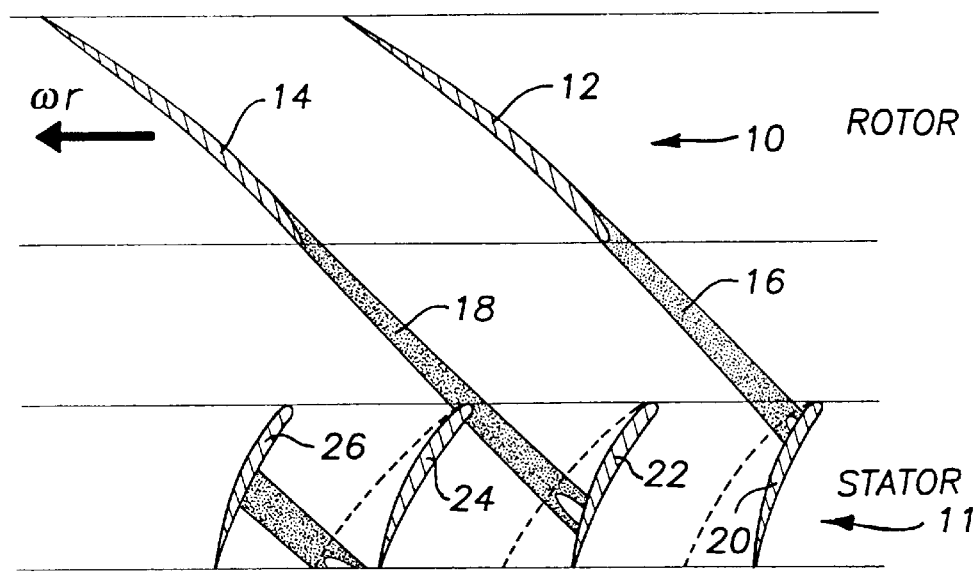
FIG. 1 is a schematic diagram of rotor blades, their wake, and downstream stator blades upon which the wake is impinging.

Referring to FIG. 1, there is schematically shown the nature of wake generation and interaction at a gas turbine engine fan rotor and stator downstream of the rotor. As shown in the figure, the fan rotor 10 includes a number of rotor blades, e.g., 12, 14, which are moving at a tangential velocity of ωr, where ω is the rotor shaft angular velocity and r is the radius. As the rotor blades turn, a wake, 16, 18 is produced downstream of the blades, as shown. The rotor blades' wakes in turn interact with the downstream stator 11 having blades, e.g., 20, 22, 24, 26. Note that each rotor blade wake has a distinct velocity profile that includes a central region of velocity and momentum deficit characteristic of the vortex shedding that occurs due to the nature of the boundary layer at the blade. It is this nonuniform, unsteady rotor blade wake velocity profile that produces acoustic noise as the wake interacts with the stator blades; specifically, the velocity deficit produces nonuniform aerodynamic loading on the stator.

In the invention, the velocity deficit of the rotor blades' wakes is made more uniform by minimizing the velocity deficit, or shed wake, at a time before the wake reaches the stator, to thereby make the wake flow into the stator more uniform. This increase in wake uniformity reduces the unsteady loading on the stator and in turn reduces the radiated acoustic noise caused by the wake impinging the stator. The rotor blade wake velocity deficit is minimized in the invention by either suction of fluid into the rotor blades to remove the wake in the region of the blade boundary layer, blowing of fluid out of the rotor blades to add to the wake, or some combination of wake fluid suction and blowing into and out of the rotor blades. These wake velocity deficit reduction techniques enable the control of initiation of gas turbine engine rotor blade wakes, thereby reducing the gust amplitude of the wake at the inlet of the stator.

Specifically, the boundary layer suction and trailing edge blowing techniques provided by the invention affect the time mean width, depth, and shape of the wake of a rotor blade to which the techniques are applied. Changes in unsteady wake behavior are achieved in the invention by control of the wake sources of unsteadiness, including control of unsteady boundary layer separation and modification of the wake's mean shear profile.

Figure 2A:
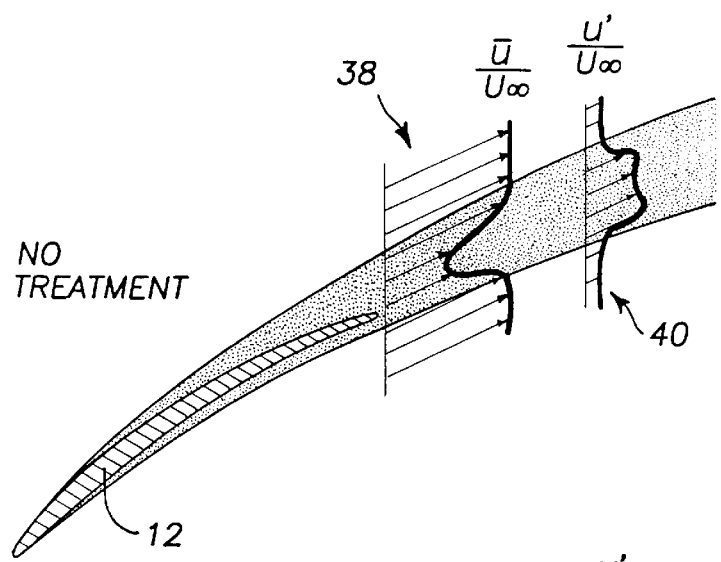
FIGS. 2A–2C are schematic diagrams of the steady and unsteady velocity profiles of a spinning rotor blade in its natural state, with the application of blowing at the rotor blade trailing edge in accordance with the invention, and with the application of boundary layer suction along the rotor blade surface in accordance with the invention, respectively.
Figure 2B:
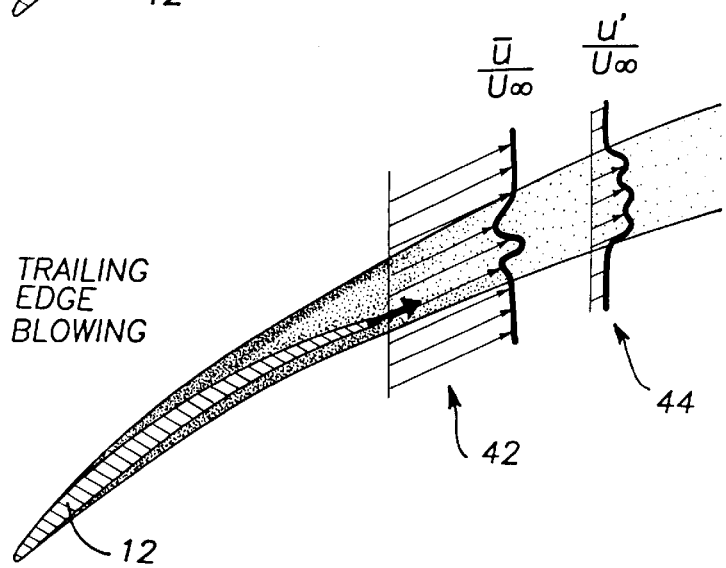

Referring to FIG. 2, there is shown the wake velocity profiles generally produced by the velocity deficit reduction techniques of the invention. First, FIG. 2A shows the time mean velocity to freestream velocity ratio profile, $\bar{u}/U_\infty$, 38, and the turbulent velocity fluctuation to freestream velocity ratio profile, $u'/U_\infty$, 40, for the wake of a gas turbine engine rotor blade 12 for which no wake control is applied; the velocity deficit is characteristic of unsteady vortex shedding. Then, as shown in FIG. 2B, application of trailing edge blowing in accordance with the invention to the rotor blade 12 results in an increase in the ratio of time mean velocity to freestream velocity in the region of the profile 42 corresponding to the blowing, and in turn results in a more uniform and smaller ratio of turbulent velocity fluctuation to freestream velocity profile 44, compared with that of the wake to which no control is applied. The mass and momentum added to the wake by the trailing edge blowing thereby decreases the magnitude of the wake velocity deficit below that of the wake to which no control is applied.

Figure 2C:
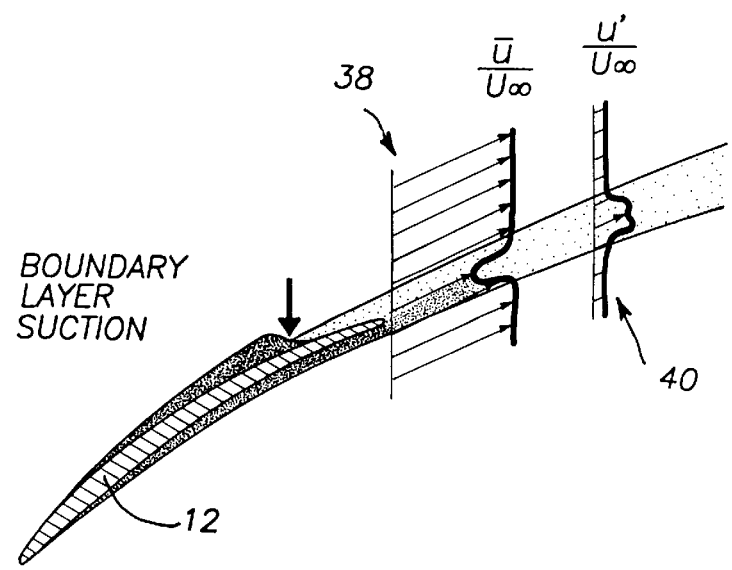

As shown in FIG. 2C, application of boundary layer suction in accordance with the invention to the rotor blade 12 results in a narrowing of the portion of the profile 38 of the ratio of time mean velocity to freestream velocity in which a deficit occurs, and further results in a more shallow velocity deficit, in comparison with the no-control wake. As a result, the corresponding portion of the ratio of turbulent velocity fluctuation to freestream velocity profile 40 is narrowed and made more shallow, compared with that of the wake to which no control is applied.

An important advantage of the wake control techniques of the invention results from their ability to control both the time mean wake velocity as well as turbulent wake velocity fluctuations, as illustrated in FIG. 2. As a result of this dual control, the wake control techniques address both broad band acoustic noise as well as tonal acoustic noise. It is generally recognized that in terms of characteristic human annoyance by aircraft, both broad band and tonal noise components play generally equal roles. For aircraft operating at subsonic rotor blade tip speeds, there is produced a noise spectrum having a broad band component on which is superimposed the blade-passage frequency and its harmonics. The wake control techniques of the invention address both the tonal and broad band noise components, and thus present a substantial advantage over past noise control techniques, e.g., active control strategies, that can mitigate only tonal noise.

The tonal noise components are controlled in the invention based on a recognition of the dependence of specific tonal, harmonic noise components on wake characteristics. Specifically, wake width is controlled in the invention to minimize the amplitude of higher-order harmonic noise. This control is based on recognition by the inventors of the specific correspondence between wake width and harmonic amplitude. Conventionally, only the overall mean velocity deficit is considered; but the inventors herein have recognized the importance of considering higher order harmonics and their sensitivity to wake width.

Figure 3:
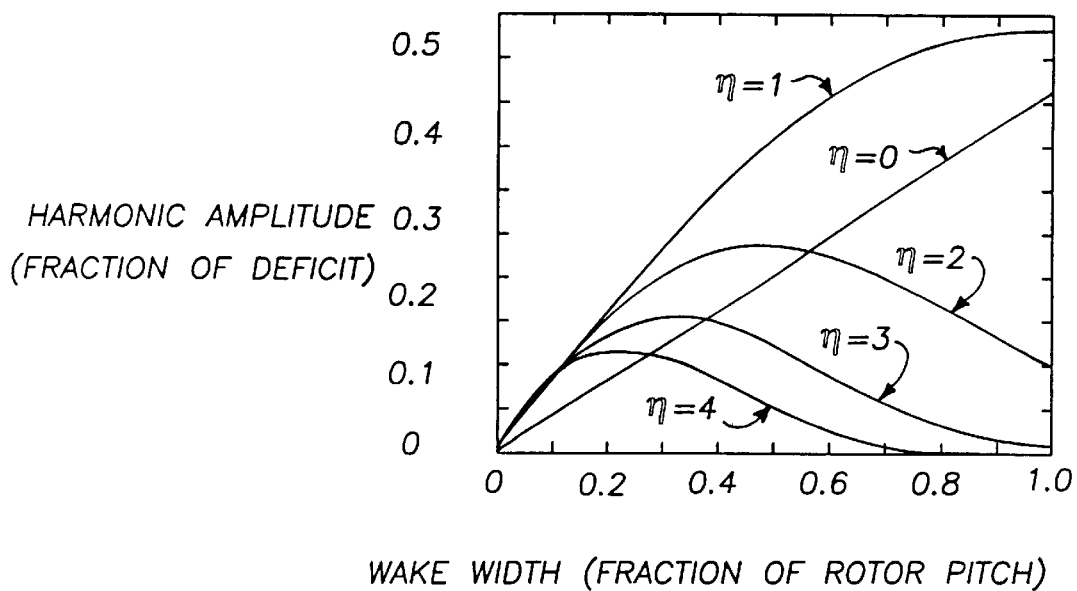
FIG. 3 is a plot of the amplitude of the zeroth, first, second, third, and fourth-order multiples of rotor blade passing frequency, wake harmonic, as a function of ratio of wake width to rotor pitch.

FIG. 3 is a plot of the harmonic amplitude, as a fraction of wake deficit, for the zeroth-, first-, second-, third-, and fourth-order harmonics, where n=0–4, as a multiple of blade passing frequency, plotted as a function of a rotor wake width, given as the ratio of wake width to rotor pitch, for a characteristic modem turbofan rotor-stator arrangement. As can be seen in the plot, given a constant velocity deficit at the centerline of the wake, the amplitude of the zeroth- and first-order harmonics decreases as the wake width is decreased. However, the amplitudes of the second-, third-, and fourth-order harmonics are found to increase with decreasing wake width for wakes greater than about one-half rotor pitch. Turbofan geometries typically are designed such that acoustic modes associated with the first-order harmonic are cut off over most of the engine operating envelope, but the higher-order harmonics remain. The increase in higher-order harmonic amplitude with decrease in wake width can counteract the significant decrease in engine noise from wake momentum deficit reduction. As shown in the plot, each harmonic mode peaks at a wake width of about 1/n times the rotor pitch.

In engines having a large rotor-stator spacing, the wake width is approximately equal to the rotor pitch—this maximizes the amplitude of the first-order harmonic, which as explained above is normally cut off over most of a typical engine operating envelope, and minimizes the amplitude of higher-order harmonics. However, if wake control is introduced in a suboptimal manner, resulting in unmerged wakes and little momentum deficit reduction, the wake control can result in an increase, rather than decrease, of radiated noise. The inventors herein have recognized that it is the wake harmonic amplitudes, not the overall mean velocity deficit of the wake, that control the wake-stator interaction noise. For example, considering the contribution of the second-order harmonic to radiated noise, the reduction in noise achieved by a 50% decrease in the wake velocity deficit would be substantially nullified if it were accompanied by a decrease in wake width-rotor pitch fraction from 100% to 75%. Recognition of the impact of wake width on harmonic amplitude is provided by the invention to achieve optimal reduction of fan noise, including harmonic noise contributions. Based on this recognition, the trailing edge blowing and boundary layer suction techniques are optimized to obtain a shallow but wide rotor wake that minimizes both broadband and harmonic components of turbofan noise at the location of a stator, e.g., about 1.5 chord lengths downstream from the rotor.

Figure 4A:
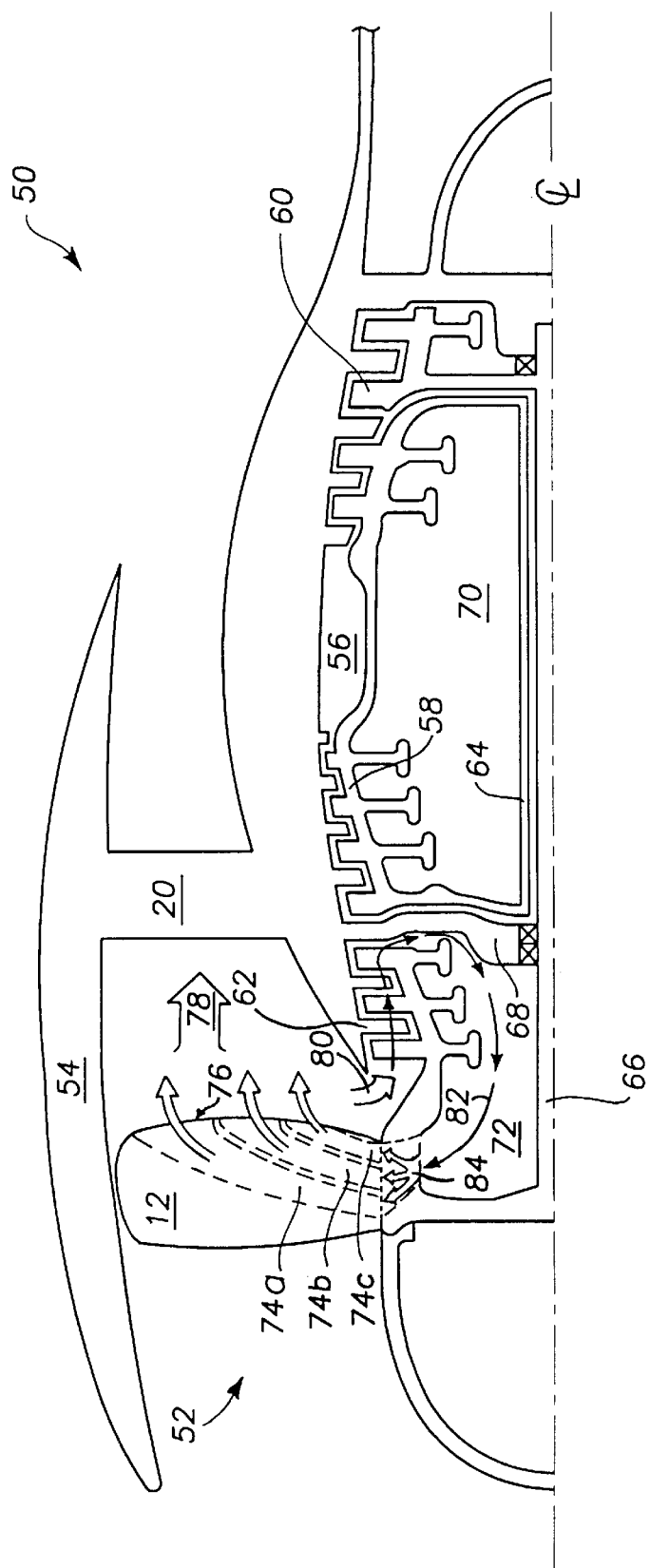
FIG. 4A is a schematic radial cross-section about the centerline of a gas turbine engine configured in accordance with the invention to provide trailing edge blowing control of the engine's fan rotor blade wake.

Turning now to the gas turbine engine configurations provided by the invention for controlling fan rotor blade wake, in a first configuration, schematically depicted in FIG. 4A, provisions are made in the engine for enabling blowing of air or other fluid out of the rotor blades at the trailing edge of the blades. As shown in the figure, the gas turbine engine 50 includes a fan 52 having a plurality of rotor blades 12 and stationary stator blades 20 downstream of the rotor. An outer casing 54 is located at the radial fan periphery. The engine also includes, as is conventional, a combuster 56 with corresponding high compressor 58 and low turbine 60 to drive the fan 52 and a low compressor 62. An outer high speed spool 64 and inner low speed spool 66 are also provided, as is conventional.

Note that the core compressor stages, i.e., the high compressor 58 and low compressor 62, are arranged as generally cylindrical disks that are attached to spools 64, 66 at one end and generally define an open space 70, 72, respectively, underneath the disks. In the invention, this compressor configuration is exploited to provide a fluid loop between the low compressor 62 and the hub of a rotor fan blade 12.

The rotor blade 12 has one or more internal passages, e.g., 74a, 74b, 74c, through which air is driven to exit at the trailing edge 76 of the blade. During operation, air passing through the fan, as well as the air exiting the blade's internal passages, takes one of two possible routes; a portion of the fluid, set by the bypass ratio, bypasses 78 the engine core and moves downstream to the stator 20. The remaining fraction of the fluid enters 80 the engine core and passes through the low compressor 62. A portion of this air is then drawn 82 through the open space 72 under the low compressor 62 and is injected 84 into the hub of the rotating fan blade. The air pressure produced by the low compressor, in combination with the fan's centrifugal force, is sufficient such that the injected air then traverses the blade through its one or more internal passages, to exit at the trailing edge of the blade. With this configuration, the invention exploits the fan's inherent centrifugal force generation to enable fluid injection at the trailing edge of a gas turbine engine fan rotor blade using the pressure of the engine's low compressor to drive the fluid injection.

Figure 4B:
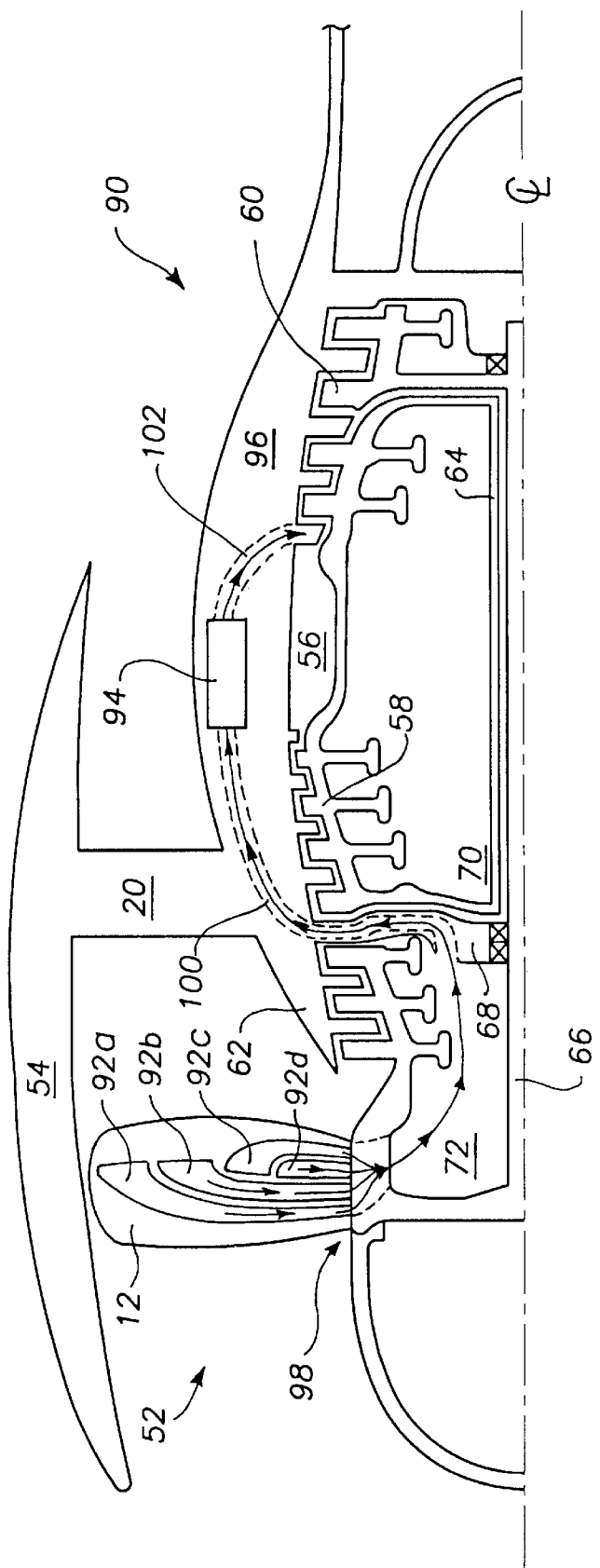
FIG. 4B is a schematic radial cross-section about the centerline of a gas turbine engine configured in accordance with the invention to provide boundary layer suction control of the engine's fan rotor blade boundary layers.

In an alternative gas turbine engine configuration provided by the invention, and schematically depicted in FIG. 4B, suction of the boundary layer at the engine's fan rotor blades is enabled. In this case, the gas turbine engine 90 includes a fan 52 having a plurality of rotor blades 12 and stator blades 20 downstream of the rotor. An outer casing 54 is located at the radial fan periphery. The engine also includes, as is conventional, a combuster 56 with corresponding high compressor 58 and low turbine 60 to drive the fan 52 and a low compressor 62. An outer high speed spool 64 and inner low speed spool 66 are also provided, as is conventional.

To facilitate suction of the rotor blade boundary layer, the rotor blade 12 includes one or more internal passages, e.g., 92a, 92b, 92c, 92d, through which suction of air moving past the blade in the boundary layer is accomplished. A suction pump 94, or other suitable mechanism, is employed to produce the necessary drop in pressure for enabling the blade suction. In one example configuration, a suction pump 94 is provided in the engine core outer casing 96. A continuous path is provided between the suction pump 94 and hub 98 of the rotor blade 52, the path traversing the open space 72 below the low compressor 62, and continuing through the structural support shaft 68 to the pump 94. This is accomplished by, e.g., providing a cavity 100 in the support shaft, with the cavity extending into the outer casing 96 to the pump 94.

As the suction pump is run during operation of the gas turbine engine fan, boundary layer fluid suctioned into the rotor blades is pulled into the cavity in the support shaft. Upon reaching the pump, the fluid can be exhausted to the ambient or alternatively, as shown, can be injected 102 to the combuster and turbine to cool these engine components. As will be recognized by those skilled in the art, other boundary layer suction configurations can also be employed. The invention does not require a specific configuration, but rather, requires the ability to provide a means of adequate pressure drop such that fluid can effectively be drawn out of internal rotor blade passages.

Figure 4C:
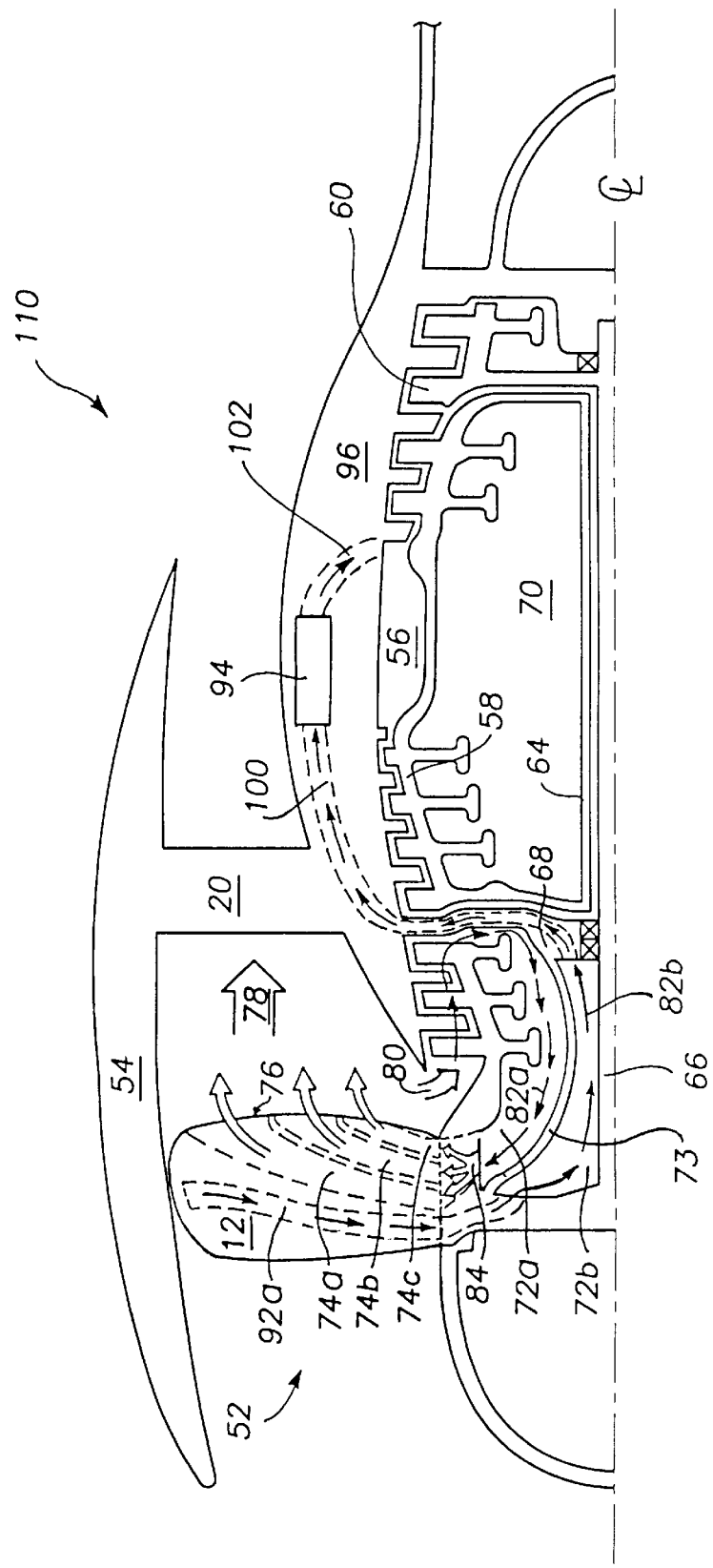
FIG. 4C is a schematic radial cross-section about the centerline of a gas turbine engine configured in accordance with the invention to provide both boundary layer suction control and trailing edge blowing control of the engine's boundary layers and wake, respectively, with both low pressure for suction and high pressure for blowing provided at the rotor hub.

The invention further provides a gas turbine engine configuration that enables a combination of boundary layer suction as well as trailing edge blowing to control the wake of the engine's fan rotor blades. As depicted schematically in FIG. 4C, this engine configuration 110 includes fan rotor blades 12 that include one or more internal passages, e.g., 74a, 74b, 74c, for blowing fluid out the trailing edge 76 of the blade; here, as described above, the low compressor 62 is employed to provide adequate pressure for drawing 80 air into the compressor 62 and circulating 82a, 82b the air to be injected 84 at the end of the blade.

The rotor blade 12 here also includes one or more slotted passages 92a for suction of the blade's boundary layer into the blade and through the blade hub to a low-pressure source in the engine, as in the configuration of FIG. 4B. In this case, accommodation of both suction and blowing through the lower cavity 72 under the low compressor 62 is enabled by partitioning of the cavity into a high-pressure blowing region 72a and a low-pressure suction region 72b, by way of a sealing wall 73. Suctioned boundary layer fluid is drawn from the blade hub into the suction region 72b of the cavity, where it is then further drawn through a cavity 100 in the support shaft 68 to a low-pressure pump 94, or other suitable device, in the engine outer casing 96. As explained in connection with FIG. 4B, the suctioned fluid can then be either exhausted or, as shown in the figure, injected 102 to the combustor/turbine.

Figure 4D:
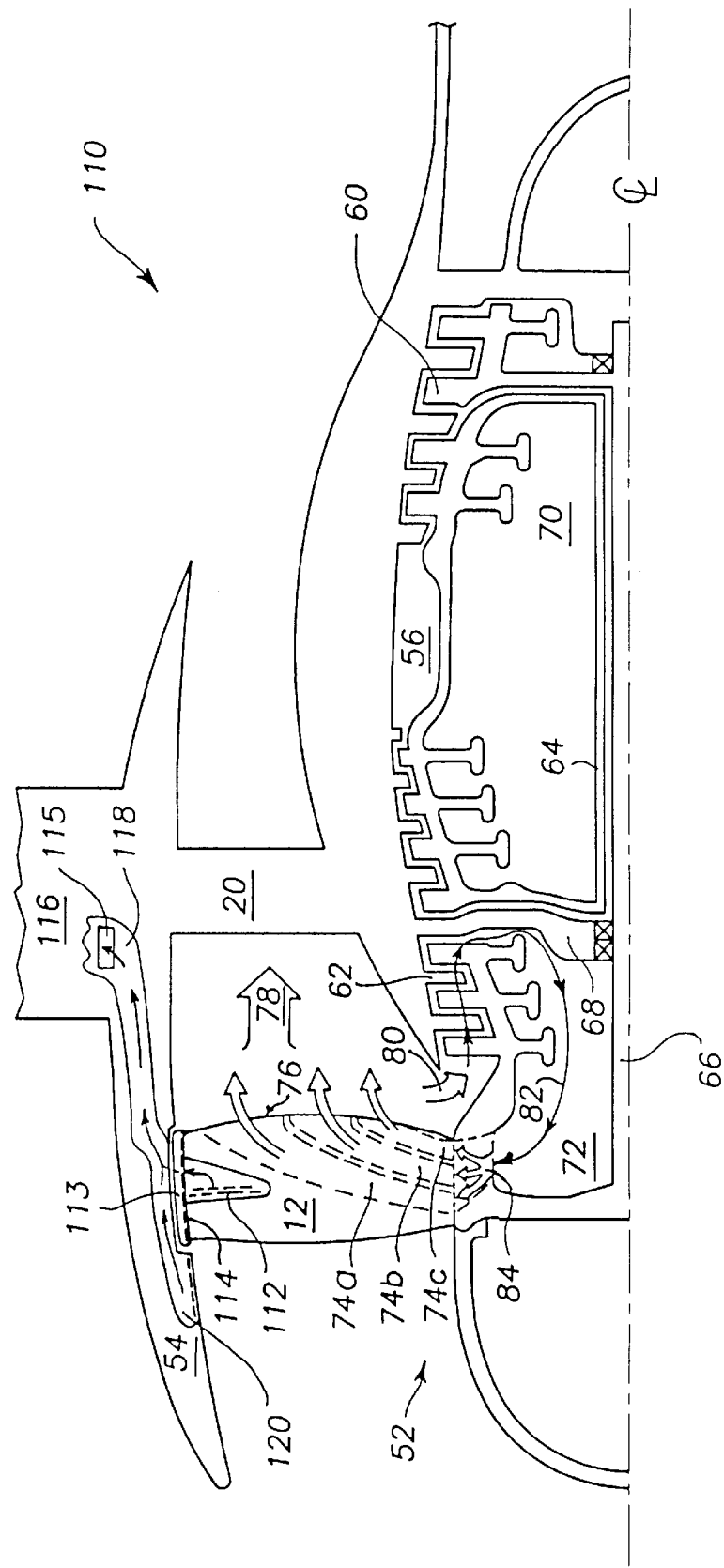
FIG. 4D is a schematic radial cross-section about the centerline of a gas turbine engine configured in accordance with the invention to provide both boundary layer suction control and trailing edge blowing control of the engine's boundary layers and wake, respectively, with high pressure for blowing provided at the rotor hub and low pressure for suction provided at the rotor tip, and including a rotor tip shroud for tip clearance flow control in accordance with the invention.

Turning to FIG. 4D, the invention further provides a second configuration for combination trailing edge blowing and boundary layer suction. The rotor blade 12 here is configured with blowing slots 74a–74c and a high-pressure loop through the low compressor 62 as in the scenario of FIG. 4A and FIG. 4C, and also includes one or more slotted passages 112 for suction of the blade's boundary layer with an opening 113 over the blade tip enabling the air suctioned through the slotted passage to be drawn out of the tip. Also provided is a blade tip shroud 114 having a porous morphology at locations between the rotor blades, to enable suction of the shroud boundary layer as well.

Suctioning of boundary layer fluid is here enabled by a pump 115 located in, e.g., a pylon 116 to the wing and fuselage mount. Operation of the suction pump 115 during fan operation provides a pressure drop such that fluid is suctioned out of the slotted blade passage 112 and through the tip shroud 114 into a cavity 118 in the outer casing 54 and pylon 116 connected to the pump. The centrifugal force of the fan aids in this suction flow. Upon reaching the pump 115, the suctioned fluid can be exhausted to the ambient or used otherwise, e.g., for cooling purposes.

Also provided in the outer casing 54 is a slotted region 120 connected to the cavity 118 for suction of boundary layer fluid at the casing surface. This suction augments the rotor blade boundary suction to reduce noise associated with the intersection of the inlet boundary layer and the blade tip. This engine configuration thereby enables a combination of trailing edge blowing and boundary layer suction to minimize noise associated with the interaction of the fan blade rotor wake with the downstream stator, as well as to minimize the noise associated with the blade tip clearance flow and the interaction of the fan blade tip with the outer casing boundary layer.

Turning now to specific fan rotor blade designs for trailing edge blowing and boundary layer suction configurations, a wide range of blade designs are contemplated by the invention to enable the desired wake control schemes. In one example, a conventional high bypass turbofan engine rotor can be employed. This engine fan is generally characterized by a relatively low number of fan blades each having a wide chord and designed to be heavily loaded aerodynamically. In one design provided by the invention, the turbofan includes 16 blades, has a total pressure ratio of about 1.2, and is designed to provide a generally uniform work input over the outer ⅔ span of the blades. The blade design can here be a simple double-circular arc airfoil design, or as will be readily recognized, can take on any of a wide range of more advanced shapes, e.g., a controlled diffusion airfoil geometry.

Figure 5:
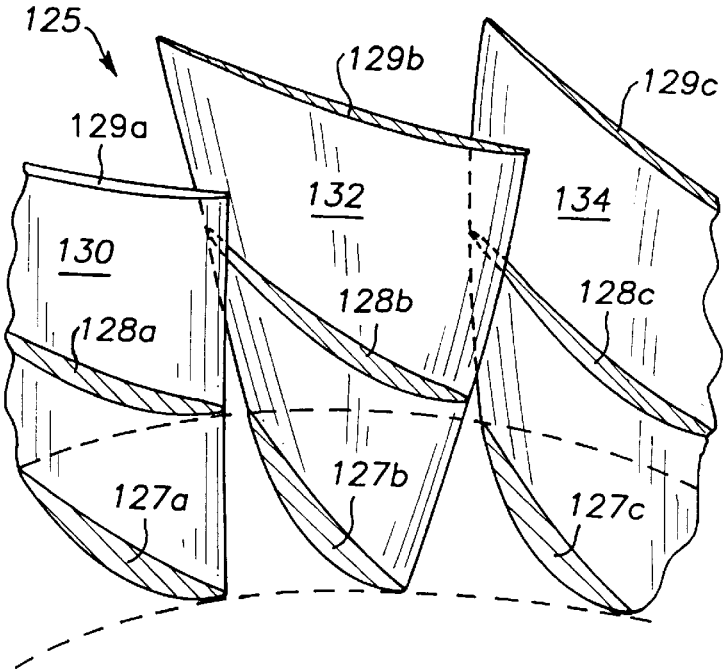
FIG. 5 is a partial schematic view of a 16-blade turbo fan provided in accordance with the invention.

Conventional fan designs typically employ relatively thin rotor blades. Rotor blades to be designed for wake control in accordance with the invention in some cases are preferably relatively thicker, between the blade's two surfaces, for optimal overall rotor performance; i.e., efficiency as well as noise reduction. Generally, a thicker airfoil produces a bigger wake but also provides more internal volume for internal passages used to inject fluid out of the blade or suction fluid into the blade. Thus, the wide range of performance criteria for a given fan rotor must be considered when designing a blade for wake control in accordance with the invention. FIG. 5 shows a portion of a 16-blade turbofan having a double-circular arc geometry, with the hub 127a, 127b, 127c, the midspan 128a, 128b, 128c, and the tip 129a, 129b, 129c explicitly shown for three blades 130, 132, 134. Different blade numbers and shapes change the quantitative geometric details for enabling trailing edge blowing or boundary layer suction, as explained below, but do not qualitatively impact the engine configurations described above for facilitating a specific wake control technique.

The design of gas turbine engine fan blades for wake control must take into account a large number of performance criteria. For example, due to typical blade geometries, the internal blade space available as mass flow passages is limited and as a result, the available flow area for blowing or suction of air is limited; this in turn requires consideration of viscous effects of the flow in such constrained internal blade passages. Internal flow effects due to blade rotation must also be given consideration. Based on these two considerations alone, it cannot be known a priori if a given blade can accommodate a desired level of mass flow for a given wake control technique. Accordingly, it is preferable that the design of fan blades in accordance with the invention for controlling rotor wake include not only modeling of mass flow through internal fan blade passages, but also include structural analysis to determine what maximum passage configuration can be employed while maintaining a blade's structural integrity. This latter analysis then indicates an overall upper limit on the mass flow for the blade. With this known, the mass flow of particular passages can be then specifically designed.

Considering the structural integrity of a turbofan blade having a plurality of internal passages, it can be said that as with semi-monocoque structural elements of closed cross-section in general, the strength of a blade in bending and torsion comes from the outer areas of the element, i.e., from the blade skin. Thus, advantageously, the internal blade structure can be largely eliminated with little impact on blade strength. For example, elimination of about 50% of the central volume of a given blade results in a decrease in bending stiffness of only about 12.5%, and results in a decrease in torsional stiffness of less than about 10%. Because bending and torsional stiffness are critical for aerodynamic loading and flutter considerations, this minimal loss in stiffness is an important enabling factor for the blade designs of the invention.

Turning to other structural considerations for blade design, the internal blade passages employed in accordance with the invention for trailing edge blowing or boundary layer suction preferably extend substantially along the full blade span. This results in virtually no change in the stress applied to the blade, due to centrifugal effects, over that of a blade having no internal passages. Specifically, the internal passages preferably are designed such that the internal blade volume surrounding the passages supports the same respective surface area that it would support in a solid blade design. This is accomplished, as explained in detail below, by, e.g., use of internal voids as well as internal passages.

It is even possible with the blade designs of the invention to produce a blade with internal passages that is of higher structural integrity than a solid blade. For example, one blade design in accordance with the invention having about 50% internal open volume and various internal voids was found, using finite element analysis, to be under less stress than a corresponding solid blade. This is likely a result of a reduction in centrifugal loads on the blade, corresponding to the particular void and passage geometry. This example generally illustrates, however, that blades designed for wake control can be relied upon to exhibit little, if any, loss in structural integrity over corresponding solid blades.

Considering specific internal passage geometry, the chordwise width of internal passages must be evaluated as a function of the passage pressure. High pressure in the passages can be expected during blowing operations, and reduced pressure can be expected during suction operations; the blade surface skin over a given passage could bulge out, or push in, respectively, under extreme conditions. Accordingly, it is generally preferred that for a given blade's structural sensitivity, the passage design use several passages rather than a single passage, and if necessary, include internal supports, to reduce or eliminate the likelihood of bulging or pushing in of blade surface skin. It is recognized, of course, that the use of a support across a passage introduces a loss mechanism and therefore can require a higher pressure to achieve the flow of a corresponding unsupported passage. For a given internal pressure and blade skin thickness, the deflection and stresses on the skin can be generally approximated using a corresponding model of a single plate element. This analysis can then be employed to determine a satisfactory number of passages and passage widths, as well as passage supports.

As mentioned above, the mass flow through a given blade internal passage design is also preferably analyzed. Although the flow in a channel having a slowly varying area can be modeled fairly easily, the losses in the end regions of the passage, where rapid area changes and corners occur, must be either estimated from empirical data or modeled numerically, e.g., with densely-gridded Navier-Stokes calculations. This can be accomplished by first making empirical estimates, then running several calculation models based on the estimates, and then undertaking experimental tests to fine tune the empirical data and corresponding models. This exercise enables a full understanding of the mass flow conditions to be expected in a blade having internal passages.

Several blade design techniques and blade designs in accordance with the invention will now be presented. In a first example, trailing edge blowing is employed to fill the mass and momentum deficit in a gas turbine engine fan rotor blade wake. Theoretically and optimally, the momentum deficit is entirely filled along the full blade span such that a fully uniform wake velocity profile interacts with a stator row downstream of the blade and produces a minimum of radiated acoustic noise. In this case, a spanwise distribution of blowing slots is preferable, and further, the largest possible slot that can be feasibly accommodated is preferably included in the blade's trailing edge.

These design goals are constrained by a number of factors. For example, the maximum allowable slot width is limited by the thickness of the blade's trailing edge. The degree of mixing achieved between the injected liquid and the blade wake before the wake reaches the stator row is limited by the achievable mixing spread angle of the injected air. Furthermore, the structural integrity considerations discussed above limit the range of structurally feasible passage and slot geometries.

In terms of engine configuration constraints, it is preferable to operate the blowing slots in a choked mode so that fluid mass flow through the fan is steady, independent of local static pressure external to the blade. A more general engine configuration consideration, however, concerns the loss of engine performance resulting from a given trailing edge blowing technique. Specifically, the noise reduction obtained for a given low compressor operational level must be considered. Trade-offs must be made between an additional amount of noise reduction to be achieved by the corresponding engine power increase required.

In a first step for designing a turbofan blade to accommodate trailing edge blowing into the blade wake, the spanwise profile of the wake for a given blade geometry is determined. This specifically should include the wake characteristics downstream of the rotor blade, to thereby provide a measurement of the velocity distribution normal to the streamwise direction. Engine data or modeling calculations can be used to obtain this information. Based on the determined wake profile, the momentum deficit in the wake is then determined as a function of the blade span. This determination in turn then specifies the spanwise distribution of additional momentum required to achieve a uniform wake profile. For example, referring back to FIG. 2A, the momentum deficit indicated by the profile 38 of the time mean velocity to freestream velocity ratio sets the theoretical maximum requirement of additional momentum needed to produce a spanwise uniform blade wake.

Given a momentum profile to be added to a blade wake, the corresponding mass flow for that momentum profile is then designed. The flow is first divided into a plurality of spanwise flow sections, with one internal passage in the blade for each section. Preferably, three, four, or five flow sections and corresponding internal passages are employed. A single internal passage can be employed, however, if the work done by the rotor is such that the centrifugal forces on the flow in the blade passage give the desired spanwise pressure distribution of the air being blown out of the blade. Typically, several passages are required to obtain a desired spanwise distribution of mass. Using more than one passage can also be preferable so that no more than the minimum additional spanwise mass addition is necessarily added; the addition of more mass than is called for can result in an increase, rather than decrease, in noise.

The radial profile found to maximize noise reduction from trailing edge blowing may ideally require spanwise-nonuniform wake reduction instead of a spanwise-uniform reduction that would be assumed by simply dividing total flow between a given number of internal passages. Spanwise nonuniform design requires a high degree of characterization however; for example a passage configuration that does not provide trailing edge blowing in the area of the blade tip may result in noise reduction that is an order of magnitude less effective than blowing over the entire blade radius.

A blade surface blowing port configuration is determined in parallel with the passage configuration to accommodate the internal passage geometry. In the invention, the blowing port can take the form of one or more slots or other geometrically-shaped orifii, can take the form of very fine holes in the blade surface, can be inherently provided by a porous blade material, or can take another suitable configuration. From structural considerations, the blowing port preferably is constructed as more than one discrete hole, e.g., slots having some structure between adjacent slots to maximize strength. The amount of open area on the blade trailing edge is preferably less than that indicated to produce a level of stress causing failure, including a safety factor, as indicated by, e.g., finite element modeling of the slotted blade.

The invention contemplates a configuration in which momentum is not only injected at the blade trailing edge, but is in addition or alternatively injected at one or more ports along the blade chord, with each port consisting of, e.g., one or more slots. This may be required, for example, where the mean flow angle of the blade is greater than a few degrees. Indeed, blowing of fluid into the trailing edge wake from a chord location of 60%–70% of chord can be employed in accordance with the invention, given a corresponding degree of fluid injection velocity. Thus, "trailing edge blowing" is meant in accordance with the invention to refer to any fluid injection from chord locations along the blade or at the blade trailing edge that enable reduction of wake momentum deficit.

Theoretically, for the most efficient reduction of the wake momentum deficit using trailing edge blowing, it is optimal to inject into the wake an air stream having a velocity as close to the freestream velocity as possible, and to make the injection not through a plurality of discrete slots but rather, through one maximum-width orifice whose dimensions are based on structural integrity considerations. This optimal case provides the closest scenario to adding both the required mass and momentum deficits; generally, only one of these can be achieved in practice, however. This optimal case also requires the least amount of engine work to drive the injected air flow and the least amount of required mixing, once air is injected in the wake, to attain a uniform velocity field corresponding to just filling the velocity deficit. In practice, however, the blowing port must be formed as a slot or other geometry whose width must in most cases be narrowed, for structural reasons, to the point that discrete slots are preferable.

Figure 6A:
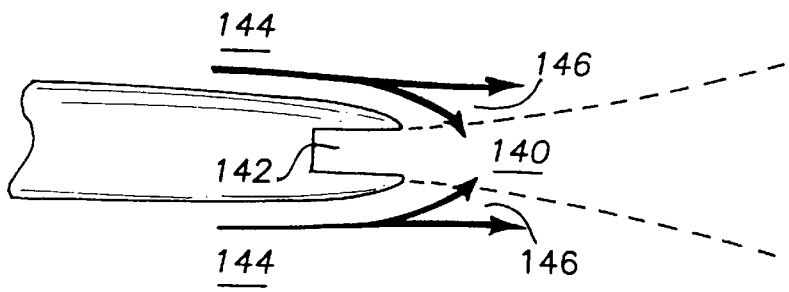
FIGS. 6A–6B are schematic illustrations of a preferred trailing edge blowing configuration using discrete slots and a less-preferred trailing edge blowing configuration using a single continuous slot, respectively.
Figure 6B:
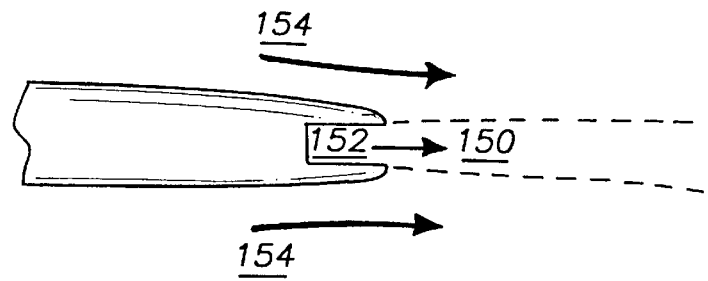

The entrainment of wake fluid into the higher velocity jets produced by the slots is understood to be higher for discrete slotted jets than for a single two-dimensional jet. Also, a discrete jet configuration generates better wake mixing in the near-blade wake regions by causing streamwise vorticity at the slot edges as the freestream expands around them. This is illustrated in FIG. 6A. Fluid 140 injected out of a passage 142 in a row of discrete slots causes the freestream flow 144 around the blade to be entrained between the jets by expanding 146 around the slot edges. Mixing of the injected fluid with the wake is thereby improved over the case, shown in FIG. 6B, in which a continuous slot is employed. Here, fluid 150 injected out of the continuous slot 152 results in freestream flow 154 that moves along its original path, whereby less mixing results from freestream interaction.

Figure 7:
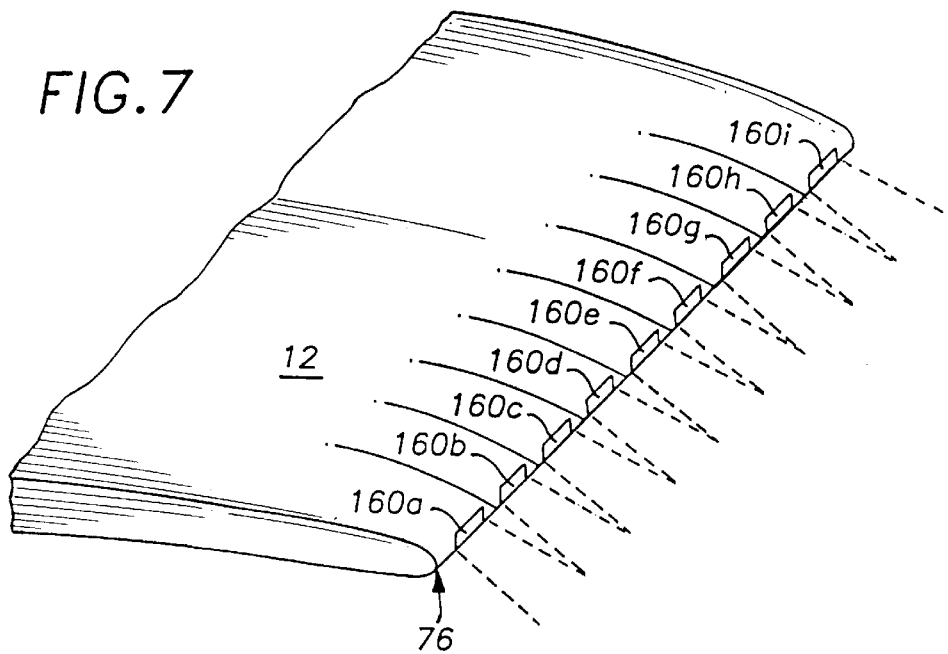
FIG. 7 is a perspective view of a trailing edge blowing slot configuration provided by the invention.

Furthermore, the structural integrity of the trailing edge section is substantially increased with a multi-slot configuration. Thus, balancing these various considerations, it is preferred that the slot configuration include a plurality of spanwise open areas separated by structural spans. It should be noted, however, that as the slot jet-to-solid area decreases, the jet velocity is inherently forced to increase to introduce a given momentum into the wake. It is thus expected that an open-to-solid slot area ratio of about 3:1 provides a good compromise. A trailing edge slot configuration having an open-to-solid slot area ratio of about 1.8:1 is shown in FIG. 7. At the trailing edge 76 of the blade 12, a row of slots 160a, 160b, . . . , 160i are provided. Note that the fluid injected into the wake from the slots mixes to provide the desired spanwise profile.

Figure 8A:
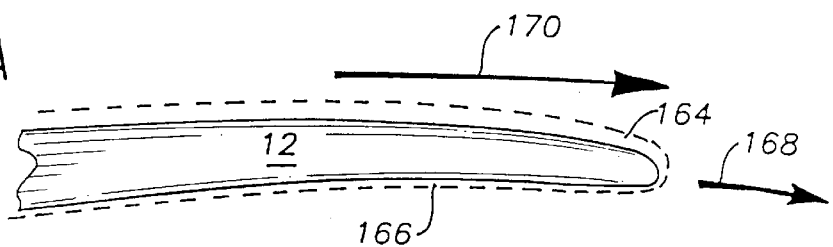
FIG. 8A is a schematic diagram of a rotor blade chord angle and deviation angle.

The slot configuration preferably also provides a desired blowing angle. Referring to FIG. 8A, the boundary layer 164 on the suction surface of the blade 12 is much thicker than the boundary layer 166 on the opposing surface of the blade. This boundary layer results in an effective trailing edge surface geometry that is different from the true blade surface geometry. As a result, air flow around the blade does not leave the blade at the trailing edge angle 168 but instead leaves the blade at a flow angle 170 that is about 5–10 degrees larger than the trailing edge angle.

Figure 8B:
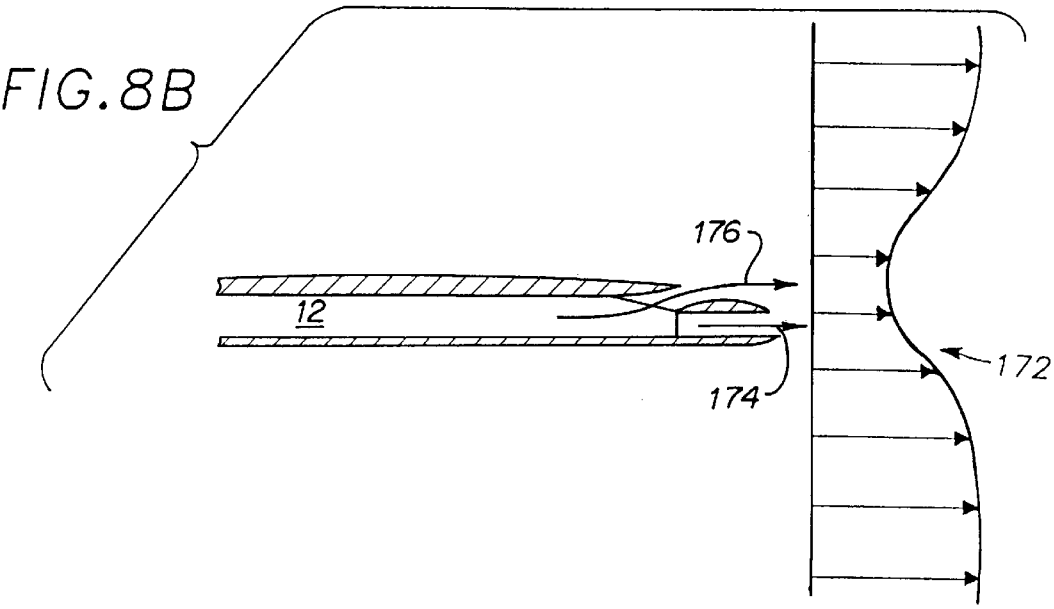
FIG. 8B is a schematic diagram of a preferred trailing edge blowing angle employed in the invention.

As a result, as shown in FIG. 8B, the blade wake profile 172 takes on an orientation corresponding to the flow angle 170. Thus, injection 174 at the trailing edge blade angle introduces momentum preferentially into one side of the wake instead of the center. Although wake momentum addition is in this case accomplished, more effective momentum addition oriented with the momentum deficit minimum of the wake can be accomplished by injection 176 at the angle at which the flow actually leaves the blade, i.e., at an angle equal to the blade surface angle plus the deviation angle.

The number as well as geometry of internal blade passages and the corresponding slot configuration are all specifically developed, for a given blade thickness, based on the required mass flow for a given hub total pressure and choked conditions at the blowing slots. These mass flow calculations and models must be made with a view to minimizing degradation of the blade structural integrity. Preferably, the mass flow calculations specifically consider the flow as a function of radius. The radial work input and blade design determine both the mass flow and the total pressure required at each spanwise location for a given blowing strategy. Generally, the highest pressure is required at the blade tip, and this pressure level then sets the corresponding pressure required in the hub of the fan to achieve a desired momentum addition. Corresponding tip and hub boundary conditions can then be established for the given total pressure of the flow at the blade hub, this being the same for all passages in the configuration shown in FIG. 4A in which all passages are fed from the same position in the compressor.

The radial variation in required mass flow and the total pressure required sets the number of internal passages needed to accomplish a desired momentum addition. An amount of radial variation can be achieved in each passage using a sharp corner at the bottom of the blade injection section and by using a gradual corner at the top of the injection section, as explained in detail below. Alternatively, various internal passage flow constriction structures, such as posts and vanes, can be used to introduce a desired level of total pressure loss. Whatever variation mechanism is used, when this variation is adequate to achieve a variation over about 1/3 of the blade span, only three passages would be needed, although structural concerns may dictate another configuration. Here each passage will in operation need to be throttled to reduce the total pressure into each passage, especially the hub sections, to obtain the correct pressure at the injection point. The passages' widths are then limited only by the structural considerations discussed above.

If an analysis of the stresses on the blade in operation for a given number of passages shows that the blade material yield point may be exceeded, taking into account a safety factor, or if the radial variation of pressure is too high, then the number of passages is increased to give both acceptable surface stresses and deflection, as well as acceptable radial pressure variation. As the number of passages is increased, however, the hydraulic diameter of each passage is necessarily decreased, resulting in an increase in losses and corresponding loss of total pressure along the radius. Accordingly, the various considerations are preferably balanced to employ the minimum number of passages necessary to obtain a required radial pressure variation and to correspondingly enable a maximum wake momentum deficit filling.

EXAMPLE 1

A 22 inch-diameter turbofan blade design was produced for complete smoothing of the blade wake velocity profile using a trailing edge blowing mechanism. An engine bypass ratio of about 8–15 was assumed. This design was produced with the following considerations. To fill in the blade wake momentum deficit, the required trailing edge blowing jet velocity, $u_{jet}(r)$, is given by:

$$u_{jet}(r) = \sqrt{\frac{\theta_{wake}(r)}{d_{jet}(r)}} \, u_{freestream}(r); \tag{1}$$

where $\theta_{wake}(r)$ is the blade wake momentum thickness, $d_{jet}(r)$ is the selected slot width, and $u_{freestream}(r)$ is the freestream velocity at the trailing edge of the blade. The momentum thickness and freestream velocity are functions of the radial position, r, along the blade, thus the blowing slot width and corresponding slot jet velocity are also functions of radial position. Note that this relation does not optimally address the mass deficit, however. This can be accounted for by including the thickness, t(r), of the blade at the trailing edge in the numerator of the square root in relation (1) above. The relation then results in momentum filling that is relatively more close to the theoretical requirement of both momentum and mass deficit reduction.

Based on measurements of blade trailing edge freestream velocity, blade thickness, and wake momentum thickness, all as a function of radial position, for the 16 blade, simple circular-arc fan design described above, having a diameter of about 22 inches and a span of about 0.165 meters, the following parameters were determined, where the slot width is selected to be one-half the blade trailing edge thickness, t(r), and the slot fluid mass velocity was determined using relation (1) above and accounting for the blade trailing edge thickness.

| Trailing Edge | $\theta_{wake}(r)$(in.) | $d_{jet}(r) = 0.5\, t(r)$ (in.) | $u_{jet}(r)/u_{freestream}(r)$ |
|---|---|---|---|
| Blade hub: | 0.025 | 0.025 | 1.73 |
| 25% radius: | 0.026 | 0.0235 | 1.76 |
| 50% radius: | 0.027 | 0.022 | 1.80 |

-continued

| Trailing Edge | $\theta_{wake}(r)$(in.) | $d_{jet}(r)$ = 0.5 t(r) (in.) | $u_{jet}(r)/u_{freestream}(r)$ |
|---|---|---|---|
| 75% radius: | 0.030 | 0.021 | 1.85 |
| 100% radius (tip): | 0.035 | 0.020 | 1.94 |

Then, given the relative Mach number, M(r), and static pressure, P(r), at the blade trailing edge as a function of radius, r, the required Mach number of the jet injection, $M_j(r)$, and the required total pressure of the jet, $P_t(r)$, is given as follows.

| Trailing Edge | M(r) | P(r)(atm) | $M_j(r)$ | $P_t(r)$ (atm) |
|---|---|---|---|---|
| Blade hub: | 0.44 | 0.94 | 0.76 | 1.38 |
| 25% radius: | 0.46 | 1.00 | 0.81 | 1.54 |
| 50% radius: | 0.51 | 1.026 | 0.92 | 1.77 |
| 75% radius: | 0.58 | 1.054 | 1.07 | 2.17 |
| 100 radius (tip): | 0.62 | 1.075 | 1.20 | 2.62 |

With this information, the fluid mass flow, i.e., the slot jet mass addition, per unit span, $\dot{m}_{jet}(r)$, of the blade required for a series of discrete slots and corresponding internal passages can be determined. To accomplish this, the operating factors determined above, for a continuous slot, must be scaled to the selected slot configuration. For a 3:1 ratio of open slot area to closed area, this results in the following adjustments to achieve the same total momentum addition.

$$u_{jet}(r)_{3:1} = \sqrt{\frac{4}{3}} u_{jet}(r)_{continuous} \quad (2)$$

$$\dot{m}_{jet}(r)_{3:1} = \sqrt{\frac{3}{4}} \dot{m}_{jet}(r)_{continuous}$$

$$P_T(r)_{3:1} > P_T(r)_{continuous}.$$

The required slot jet fluid mass flow per unit span, $m_j(r)$, is given as $$\dot{m}_{jet}(r) = \rho_{jet}(r) u_{jet}(r) d_{jet}(r), \quad (3)$$

where $\rho_{jet}(r)$ is the mass density, in kg/m³, as a function of radius, and which depends on the flow inside the passages. This then provides the following parameters for a 3:1 slot area ratio.

| Trailing Edge | $M_{jet3:1}$ | $P_{T3:1}$(atm) | $\dot{m}_{jet3:1}$(kg/s/m) |
|---|---|---|---|
| Blade hub: | 0.88 | 1.56 | 0.156 |
| 25% radius: | 0.94 | 1.77 | 0.164 |
| 50% radius: | 1.06 | 2.09 | 0.178 |
| 75% radius: | 1.24 | 2.69 | 0.200 |
| 100 radius (tip): | 1.385 | 3.35 | 0.233 |

Finally, the slot jet fluid mass flow per internal passage is determined by selecting the number of passages to be included. Four passages were used here. This provides a four-point spanwise distribution with reasonable passage sizes that require minimal structural support. Given a blade span of 0.165 m, and segmenting this into four passage regions, namely, a hub passage region, an inner-middle passage region, an outer-middle passage region, and a tip passage region, then the mass flow per passage and total pressure per passage at the tip of the sections is given as follows.

| Passage Region | $\dot{m}$/passage | $P_T$/passage |
|---|---|---|
| Hub: | 0.0066 | 1.77 |
| Inner-middle: | 0.0071 | 2.09 |
| Outer-middle: | 0.0078 | 2.69 |
| Tip: | 0.0089 | 3.35 |

Given a constant total pressure at the blade hub, the passage dimensions are iteratively varied with the required mass flows to obtain convergent solutions for the dimensions of each of the four internal passages. This iterative process specifically is iterated to obtain geometries that give the required mass flow for a given hub total pressure and amount of loss corresponding to near-sonic Mach numbers at the tip, and for the required tip total pressures. One example model suitable for this iterative calculation describes the internal passage flow as a one-dimensional viscous flow in a variable area, rotating channel with heat transfer at the passage walls. A corresponding state equation and equations describing conservation of mass, momentum, and energy are then given as:

$$\text{state} \quad \frac{dP}{P} = \frac{d\rho}{\rho} + \frac{dT}{T} \quad (4)$$

$$\text{mass} \quad \frac{d\rho}{\rho} + \frac{du}{u} + \frac{dA}{A} = 0$$

$$\text{momentum} \quad \rho u \, du = -dP - \rho\Omega^2 r \, dr - \frac{f}{2D_H}\rho u^2 \, dr$$

$$\text{energy} \quad C_p \, dT + u \, du + \Omega^2 r \, dr = dq$$

where:
  p is the static pressure along the passages, as a function of radius, (corresponding to p (r) above),
  ρ is the fluid mass density along the passages, as a function of radius,
  T is the temperature of the passages, as a function of radius,
  u is the velocity of mass fluid flow, as a function of radius,
  A is the passage area, as a function of radius,
  Ω is the rotational speed of the fan rotor
  $D_H$ is the hydraulic diameter, and
  $C_p$ is the coefficient of specific heat at constant pressure.
The viscous and heat transfer terms in the above equations are approximated using a friction coefficient, $f$, curve-fit to the Moody diagram given by:

$$f = \frac{0.25}{\left\{\log_{10}\left[\frac{k}{3.7D_H} + \frac{5.74}{Re_{D_H}^{0.9}}\right]\right\}^2} \quad (5)$$

and the heat transfer term is given by:

$$\frac{dq}{C_p T} = \frac{\frac{f}{2D_H}}{\left[1 + 13(Pr^{2/3} - 1)\left(\frac{f}{8}\right)^{1/2}\right]}\left(\frac{T_b}{T} - 1\right) dr \quad (6)$$

where q is the heat transfer rate, $T_b$ is the blade temperature, and r, as used earlier, is the radius. Rearranging the state equations and incorporating relations (5) and (6) above gives the following relations for dependence on internal passage pressure, radius, and other factors:

$$\frac{dT}{T} = \frac{du}{u} + \frac{dP}{P} + \frac{dA}{A} \qquad (7)$$

$$\frac{du}{u} = \frac{1}{1+(\gamma-1)M^2}\left\{\frac{-dp}{p} - \frac{dA}{A} - \right.$$

$$(\gamma-1)M^2\frac{\Omega^2 r^2}{u^2}dr_s + \frac{fr}{2D_H}dr_s\frac{\frac{T_b}{T}-1}{1-13(Pr^{2/3}-1)\left(\frac{f}{8}\right)^{1/2}}\right\}$$

$$\frac{dp}{p} = \frac{1}{\frac{1+(\gamma-1)M^2}{\gamma M^2}-1}\left\{\frac{dA}{A} - \frac{\Omega^2 r^2}{u^2}dr_s - \right.$$

$$\left.\frac{fr}{2D_H}dr_s\cdot\left[\frac{\frac{T_b}{T}-1}{1-13(Pr^{2/3}-1)\left(\frac{f}{8}\right)^{1/2}} + (1+(\gamma-1)M^2)\right]\right\}$$

where:

γ is the ratio of specific heats;

M is the Mach number along the radius in the passages, and $r_s$ is the span coordinate, i.e., $r_s=r/r_{tip}$.

These equations are integrated radially to determine the passage geometry for the specified flow rate and hub pressure. This was accomplished using the MATLAB software package, version 4.2c, from MathWorks, Inc., and run on an IBM RISC 550 workstation.

The thickness of the blade specified in this example varies generally linearly along the blade span. Accordingly, the four internal passages are also designed to vary in thickness generally linearly; this results in a passage thickness equal to about one/half the blade thickness along the span. The internal passages are thus not rectangular, but preferably, tend to the airfoil shape. The iterative passage geometry calculation for the blade specified provided the following internal passage design, where $P_{Tt}$ and $P_{Th}$ are the total pressures at the tip and hub, respectively; $M_t$ and $M_h$ are the Mach numbers at the tip and hub, respectively; $w_t$ and $W_h$ are the passage widths across the blade thickness, at the tip and hub, respectively; and $b_t$ and $b_h$ are the passage breadths along the blade chord, at the tip and hub, respectively, of each individual passage; and where the radial coordinate corresponding to the middle of each internal passage at the tip is given as $r_t$, with all dimensions given in meters.

|  | Tip Passage | Outer-Middle Passage | Inner-Middle Passage | Hub Passage |
|---|---|---|---|---|
| $r_t$ | 0.260 | 0.222 | 0.184 | 0.146 |
| m | 0.0089 | 0.0080 | 0.0074 | 0.0067 |
| $M_h$ | 0.146 | 0.144 | 0.27 | 0.45 |
| $M_t$ | 0.8 | 0.85 | 0.85 | 0.85 |
| $P_{Tt}$(atm) | 3.35 | 3.25 | 2.98 | 2.77 |
| $P_{Th}$(atm) | 3.05 | 3.05 | 3.05 | 3.05 |
| $w_t$ | 0.0008 | 0.0009 | 0.0013 | 0.0013 |
| $w_h$ | 0.0030–0.0036 | 0.0035–0.0038 | 0.0023–0.0031/0.0010–0.0020 | |
| $b_t$ | 0.015 | 0.0125 | 0.0085 | 0.0082 |
| $b_h$ | 0.015 | 0.0125 | 0.0085 | 0.009 |

Figure 9:
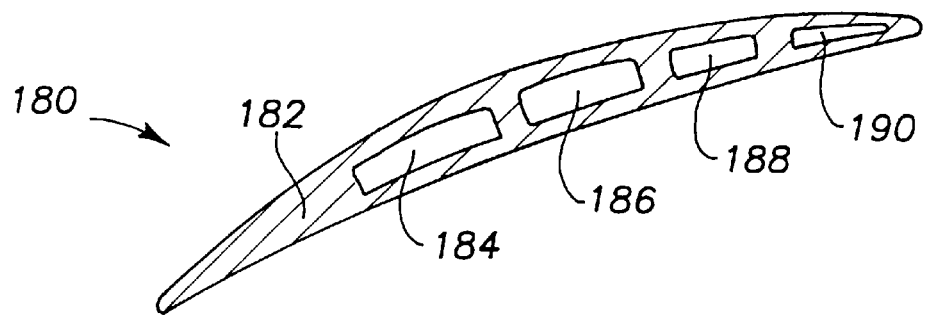
FIG. 9 is a cross-sectional diagram, cut at the hub, of four-passage rotor blade provided by the invention for trailing edge blowing.

Referring to FIG. 9, there is shown a cross sectional view of the four internal passages in the specified blade 180 at the blade hub. Within the blade solid volume 182, there is provided a tip region passage 184, outer-middle region passage 186, inner-middle region passage 188, and hub region passage 190.

Figure 10:
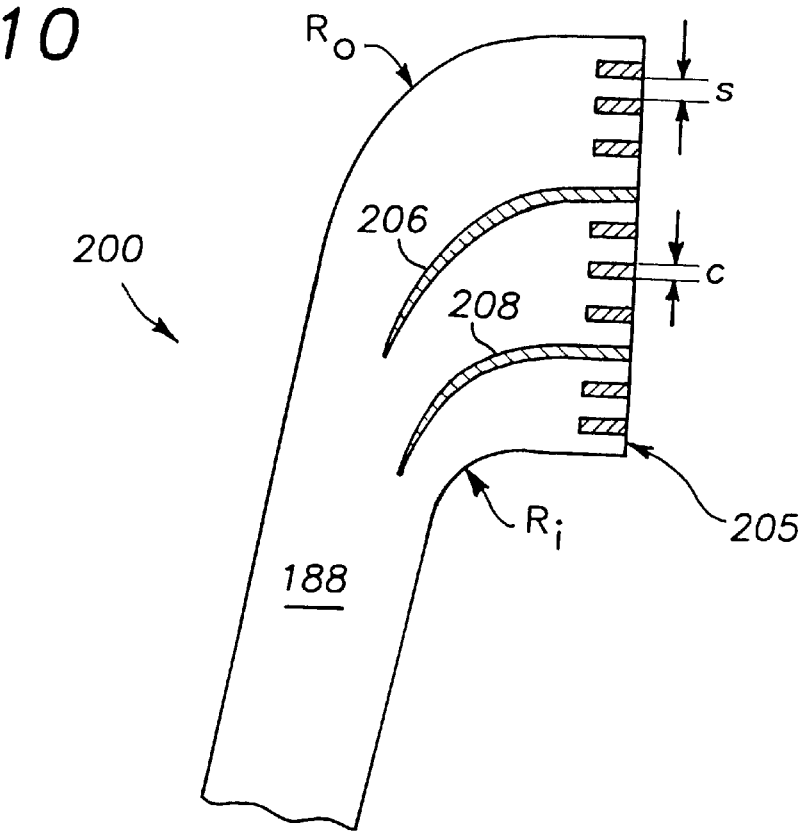
FIG. 10 is a cross-sectional view, along the camber line, of the injection section of an internal passage for trailing edge blowing in accordance with the invention.

Beyond this geometric design of the four internal blade passages, it is required to design the injection section of the passages, i.e., the geometry of the passages near the blade trailing edge; at the top of the blade, the passages must turn toward the blade trailing edge. Referring now to FIG. 10, there is shown the injection section 200 for the inner-middle region passage 188 of FIG. 9. The inner radius of curvature, $R_i$, set at about 2% of the blade span, results in a pressure loss of about 0.6 times the dynamic head pressure in that region of the passage. The outer radius of curvature, $R_o$, set at about 8% of the blade span, results in a pressure loss of about 0.2 times the dynamic head pressure in that region of the passage. Correspondingly, the pressure loss in the curvature at the center of the passage is about 0.4 times the dynamic head pressure. This variation produces a corresponding radial variation in total pressure that roughly corresponds to the total pressures required for the momentum addition. This correspondence depends strongly on the specific blade design, however, and flow restriction mechanisms, such as injection port area, can also be used to reduce the total pressure of a passage where required.

At the trailing edge 205 of the injection section 200, each slot has a slot height, S, of about 1.0% of the blade span, and each section of blade between the slots has a height, C, of about 0.34% of the blade span. For the blade specified in this example, the corresponding slot height, S, is about 3 mm, with a thickness of about one-half the blade thickness, as discussed above, and the corresponding height, C, of the blade sections between the slots is about 1 mm, with a thickness of about 4 mm taken chordwise.

Based on the pressure loss considerations for the injection section of the passages, the following outer radius of curvature, $R_o$, and inner radius of curvature, $R_i$, for the four passages of the blade specified in this example are given as follows, in millimeters.

|  | Tip Passage | Outer-Middle Passage | Inner-Middle Passage | Hub Passage |
|---|---|---|---|---|
| $R_i$ | 6 | 6 | 6 | 3 |
| $R_o$ | 30 | 25 | 15 | 9 |

Also shown in FIG. 10, turning vanes 206, 208 can be included in the passages' injection sections. Such vanes can be included to provide structural support in the middle area of an injection region; this middle area is typically about twice the chordwise-width of the passage at span sections closer to the hub, and so may require more structural support. In addition, the vanes can be included to more precisely direct flow in the chordwise-direction back to the blade's trailing edge. It will be recognized that the addition of vanes impacts the total blade pressure drop, and so vane design must be considered during the initial overall internal passage design. Without vanes, flow through the injection section, which is typically at Mach numbers exceeding about 0.5, can separate at the sharper inner radius of curvature $R_i$, thereby reducing the amount of mass flow through the passage. Such inner radius flow separation also results in an underturning of the flow, thereby introducing a radial velocity component to the flow.

Even with the inclusion of turning vanes in a blade passage, flow through the sub-passages defined between the vanes can be expected to have some degree of separation and introduction of a radial velocity component. The degree of separation and added radial velocity is reduced, however, with an increasing number of vanes, but the vanes themselves also introduce viscous effects. The number of vanes to be included in a given passage is determined based on considerations for required chordwise-flow, required radial total pressure distribution, and flow restriction corresponding to decreased flow volume. Preferably, two or three vanes are employed in a typical blade where the internal blade passages inject flow into about one-quarter of the blade span. Turning vanes thus can be preferred in cases where either or both structural or flow considerations warrant their inclusion, but are not required by the invention.

Figure 11:
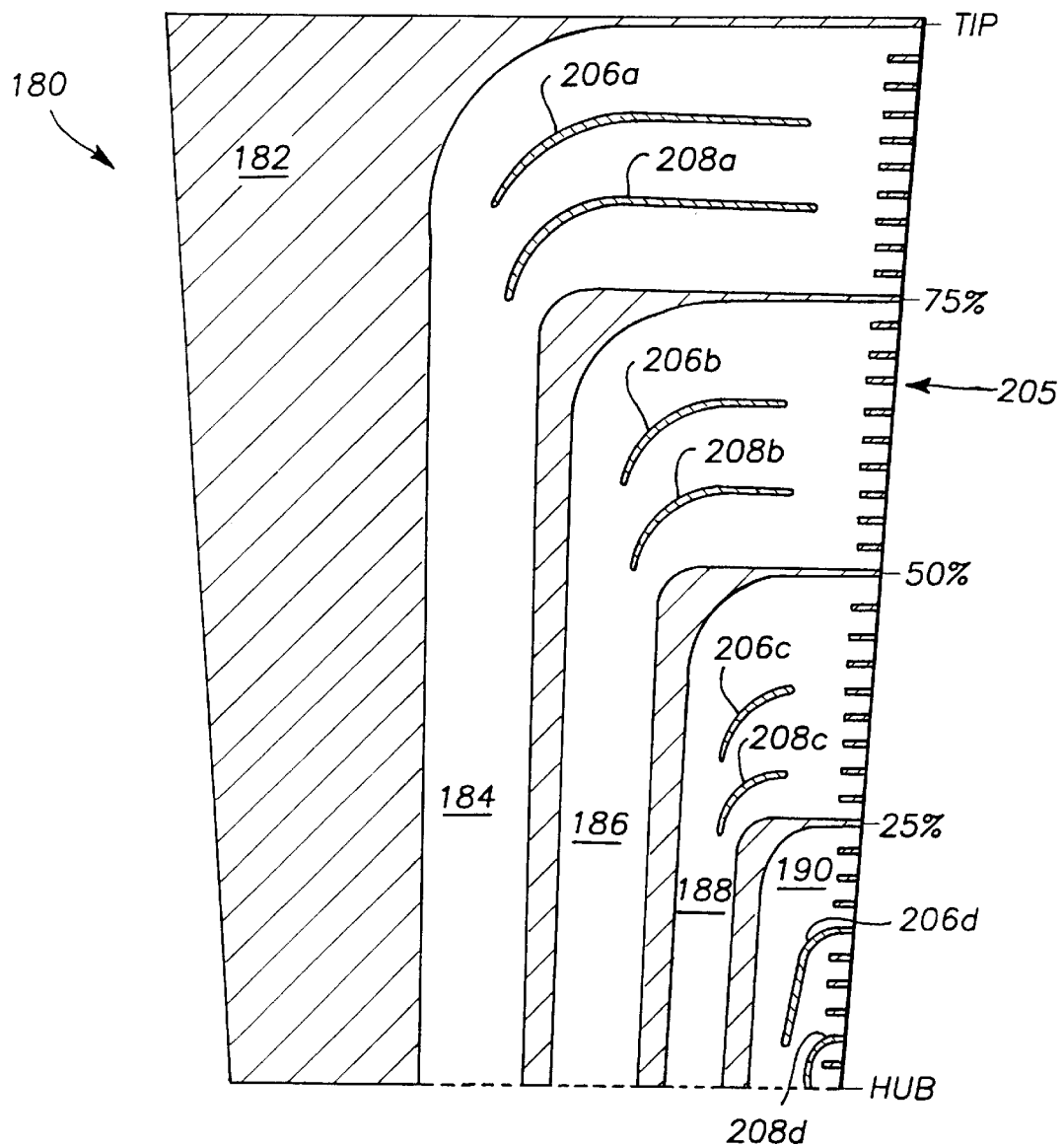
FIG. 11 is a cross-sectional view, along the camber line, of a four-passage rotor blade provided in accordance with the invention for trailing edge blowing.

Now referring to FIG. 11, there is shown a view of the final design for the blade 180 specified in this example, cut through the mean camber line of the blade. As specified, the blade has an internal solid volume 182 in which are provided four passage regions with the span divided into quarters. The tip passage 184, outer-middle passage 186, inner-middle passage 188, and hub passage 190 together provide the ability to inject fluid into the blade wake to substantially fill in the wake momentum deficit and correspondingly substantially reduce both the broad band and tonal noise associated with the wake interaction with the downstream stator. Each passage has two turning vanes 206a–d, 208a–d, respectively, for adding structural support and more precisely directing fluid flow in the injection sections of the passages.

EXAMPLE 2

A second design for the blade specified in Example 1 above was produced to provide the same blade wake momentum addition using five, instead of four, internal passages; this provides a smoother radial matching in mass flow variation than that provided by the four-passage design. Given the mass flow, pressure, and Mach numbers for the blade layed out in Example 1, and given the blade span of 0.165 m, segmentation of the span into five passage regions, namely, a hub passage region, an inner-middle passage region, a middle passage region, an outer-middle passage region, and a tip passage region, then the mass flow per passage, $\dot{m}$/passage, and total pressure per passage, $P_T$/passage, at the tip of the section is given as follows.

| Passage Region | $\dot{m}$/passage | $P_T$/passage |
| --- | --- | --- |
| Hub: | 0.0048 | 1.65 |
| Inner-middle: | 0.0051 | 1.85 |
| Middle: | 0.0054 | 2.09 |
| Outer-middle: | 0.0059 | 2.54 |
| Tip: | 0.0066 | 3.05 |

Iterative passage geometry calculation for the five-passage blade provided the following internal passage design, where $P_{Tt}$ and $P_{Th}$ are the total pressures at the tip and hub, respectively; $M_t$ and $M_h$ are the Mach numbers at the tip and hub, respectively; $w_t$ and $w_h$ are the passage widths across the blade thickness, at the tip and hub, respectively; and $b_t$ and $b_h$ are the passage breadths along the blade chord, at the tip and hub, respectively, for each individual passage; and where the radial coordinate corresponding to the middle of each internal passage at the tip is given as $r_t$, with all dimensions given in meters.

|  | Tip | Outer-Middle | Middle | Inner-Middle | Hub |
| --- | --- | --- | --- | --- | --- |
| $r_t$ | 0.264 | 0.234 | 0.203 | 0.173 | 0.142 |
| $\dot{m}$ | 0.0066 | 0.0059 | 0.0054 | 0.0051 | 0.0048 |
| $M_h$ | 0.140 | 0.15 | 0.18 | 0.29 | 0.5 |
| $M_t$ | 0.72 | 0.72 | 0.80 | 0.82 | 0.82 |
| $P_{Tt}$(atm) | 3.39 | 3.28 | 3.12 | 2.91 | 2.74 |
| $P_{Th}$(atm) | 3.05 | 3.05 | 3.05 | 3.05 | 3.05 |
| $w_t$ | 0.00075 | 0.0009 | 0.0011 | 0.0013 | 0.0013 |
| $w_h$ | 0.0031 | 0.0034 | 0.0035 | 0.0025 | 0.0015 |
| $b_t$ | 0.0125 | 0.0095 | 0.007 | 0.006 | 0.0058 |
| $b_h$ | 0.0125 | 0.0095 | 0.007 | 0.006 | 0.0058 |

Figure 12:
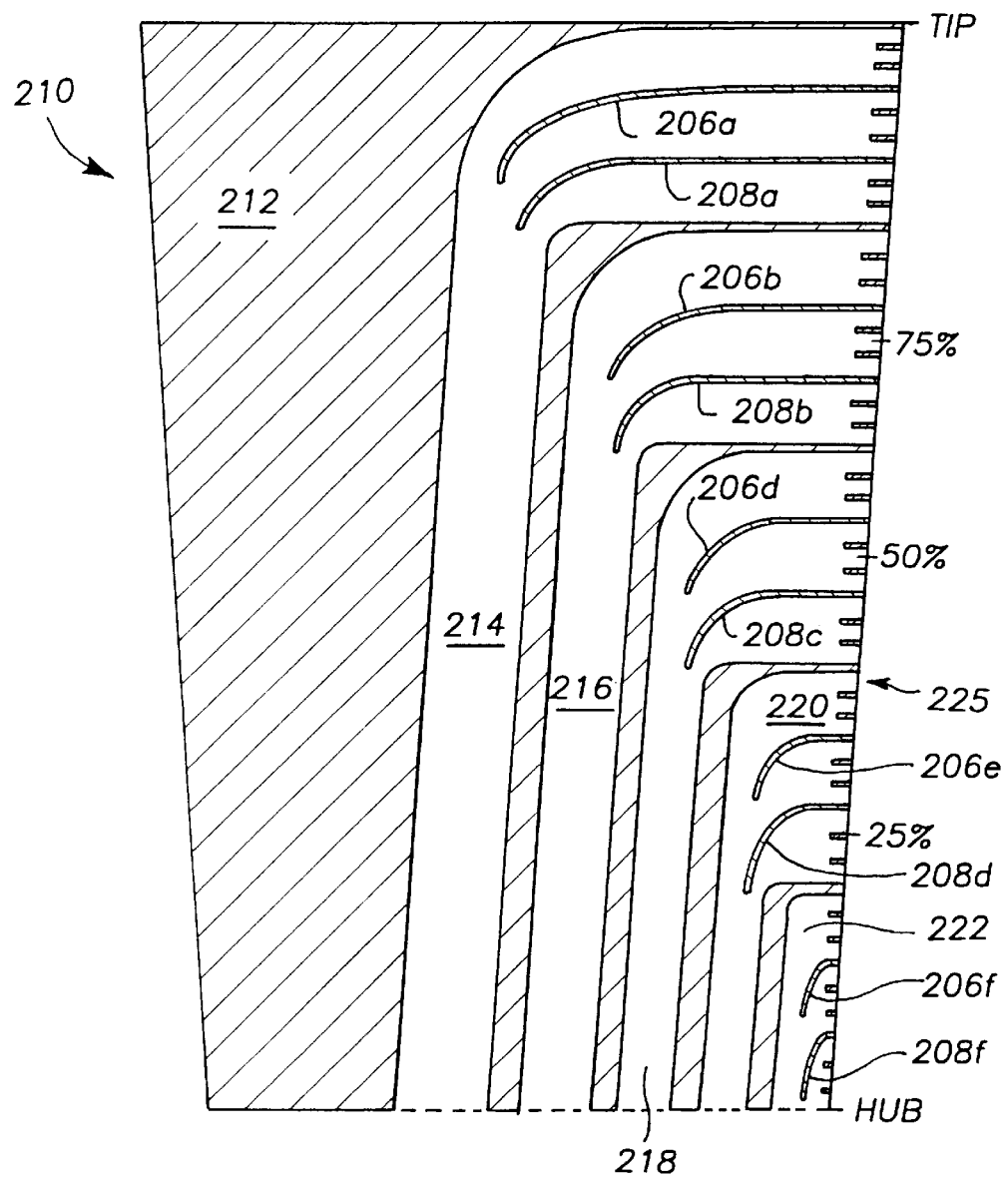
FIG. 12 is a cross-sectional view, along the camber line, of a five-passage rotor blade provided in accordance with the invention for trailing edge blowing.

FIG. 12 illustrates the resulting five-passage blade 210, cut through the mean camber line. As shown, the blade 210 has an internal solid volume 212 in which the tip passage 214, outer-middle passage 216, middle passage 218, inner-middle passage 220, and hub passage 222 are cut. Each passage includes a rounded injection region, having a radius of curvature corresponding to the specifications given in Example 1, and ending at the blade trailing edge 225. Turning vanes 206a–206f, like that of FIG. 11, are provided in the passages.

EXAMPLE 3

A third design for the blade specified in Example 1 above was produced to provide the same blade wake momentum addition using three internal passages; as can be understood, this design has less-uniform radial matching of mass flow variation than the designs having more passages. Given the mass flow, pressure, and Mach numbers for the blade layed out in Example 1, and given the blade span of 0.165 m, segmentation of the span into three passage regions, namely, a hub passage region, a middle passage region, and a tip passage region, then the mass flow per passage, $\dot{m}$/passage, and total pressure per passage, $P_T$/passage, at the tip of the section is given as follows.

| Passage Region | $\dot{m}$/passage | $P_T$/passage |
| --- | --- | --- |
| Hub: | 0.0083 | 1.72 |
| Middle: | 0.0091 | 2.09 |
| Tip: | 0.0107 | 2.90 |

Iterative passage geometry calculation for the three-passage blade provided the following internal passage design, where $P_{Tt}$ and $P_{Th}$ are the total pressures at the tip and hub, respectively; $M_t$ and $M_h$ are the Mach numbers at the tip and hub, respectively; $w_t$ and $W_h$ are the passage widths across the blade thickness, at the tip and hub, respectively; and $b_t$ and $b_h$ are the passage breadths along the blade chord, at the tip and hub, respectively, for each individual passage; and where the radial coordinate corresponding to the middle of each internal passage at the tip is given as $r_t$, with all dimensions given in meters.

|  | Tip | Middle | Hub |
| --- | --- | --- | --- |
| $r_t$ | 0.254 | 0.203 | 0.153 |
| $\dot{m}$ | 0.0107 | 0.0091 | 0.0084 |
| $M_h$ | 0.15 | 0.24 | 0.43 |
| $M_t$ | 0.80 | 0.78 | 0.80 |
| $P_{Tt}$(atm) | 3.30 | 3.03 | 2.81 |
| $P_{Th}$(atm) | 3.05 | 3.05 | 3.05 |
| $w_t$ | 0.0008 | 0.0011 | 0.0013 |

|  | Tip | Middle | Hub |
|---|---|---|---|
| $w_h$ | 0.0032 | 0.0025 | 0.0017 |
| $b_t$ | 0.0182 | 0.0126 | 0.0103 |
| $b_h$ | 0.0182 | 0.0126 | 0.0103 |

Figure 13:
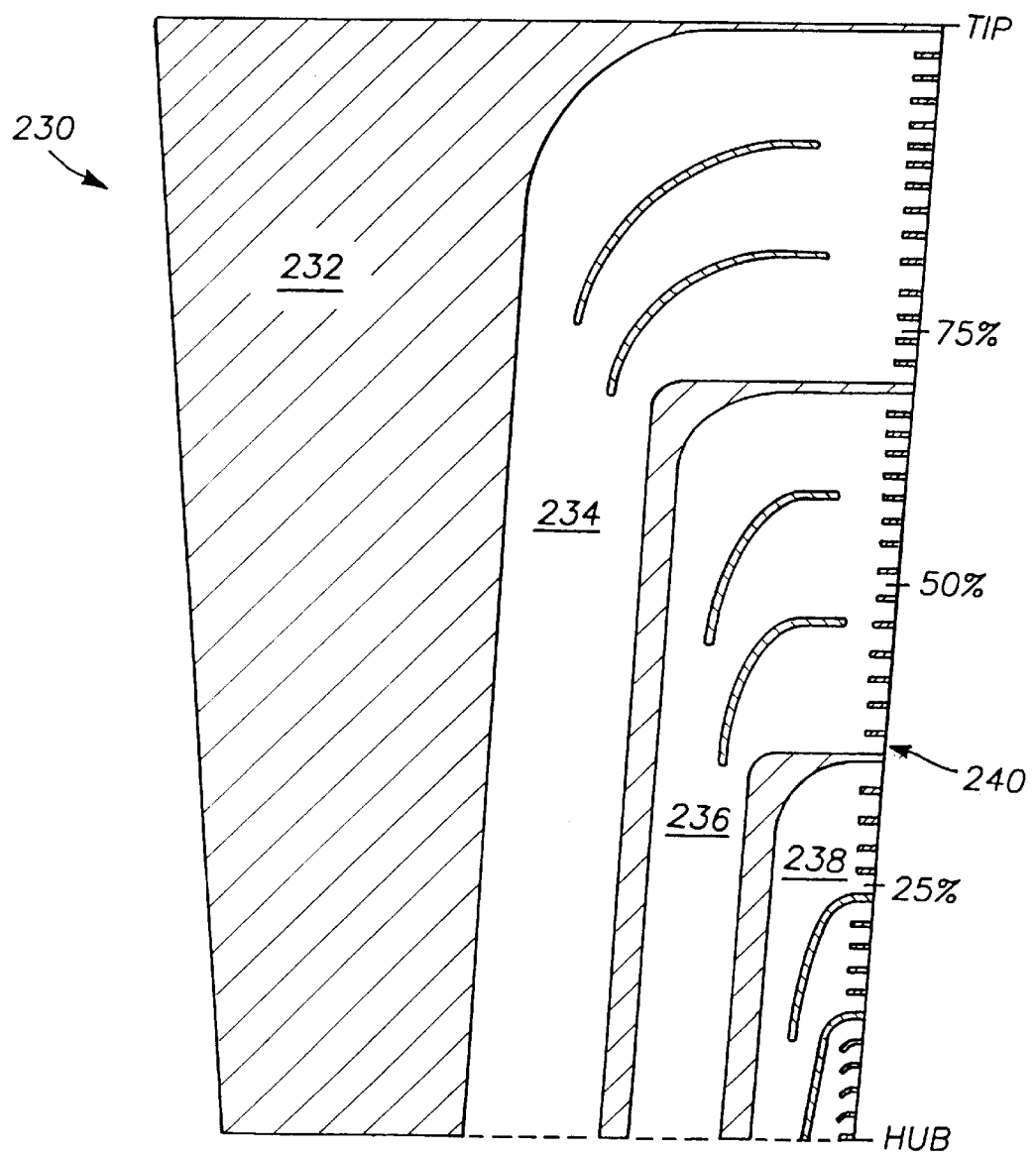
FIG. 13 is a cross-sectional view, along the camber line, of a three-passage rotor blade provided in accordance with the invention for trailing edge blowing.

FIG. 13 illustrates the resulting three-passage blade 230, cut through the mean camber line. As shown, the blade 230 has an internal solid volume 232 in which the tip passage 234, middle passage 236, and hub passage 238 are cut. Each passage includes a rounded injection region, having a radius of curvature corresponding to the specifications given in Example 1, and ending at the blade trailing edge 240.

With these examples, it is illustrated that the invention provides a range of trailing edge blowing configurations for filling in blade wake momentum deficit and correspondingly reducing wake-stator interaction noise. Indeed, as much as 8 dB or more reduction in tonal and broad band noise components associated with wake-stator interaction can be attained by the trailing edge blowing techniques provided by the invention. Through two-dimensional analysis of these designs, it was determined that the trailing edge blowing mechanisms significantly reduce the mean wake velocity deficit, while having little impact on the wake width. Decomposition of the wakes resulting from the blade designs into their harmonic components indicated about 60% reduction in the harmonic amplitudes, corresponding to about 8 dB of tonal noise reduction. In addition, the fluctuating component of the resulting wakes were found to also be reduced by about 60%, with little change to the spectrum, thereby providing about 8 dB reduction in broad band noise.

Figure 14:
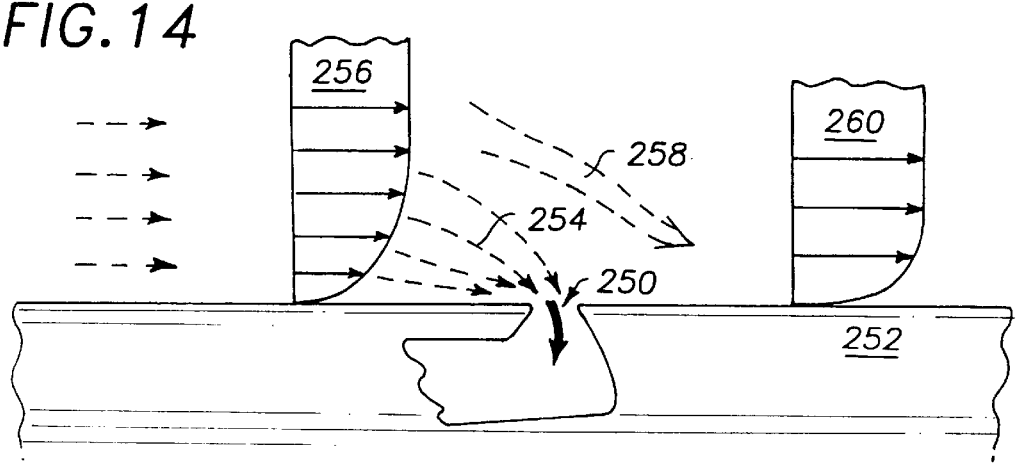
FIG. 14 is a schematic diagram of the rotor blade boundary layer suction mechanism provided by the invention.

As explained earlier, the invention also provides boundary layer suction techniques for producing a more uniform blade wake and thereby for reducing wake-stator interaction noise. Referring to FIG. 14, this generally is accomplished in accordance with the invention with one or more suction ports, e.g., slots 250 in a rotor blade 252. Recall, as was shown in FIG. 4B, that in the invention, an engine employing the boundary layer noise reduction technique is configured to include a low pressure source to drive suction of boundary layer liquid into a blade port such as slots 250. The result of this suction, as shown in FIG. 14, consists of drawing in 254 of the boundary layer freestream flow as the flow 256 approaches the blade slots 250. Flow away from the boundary layer then is inherently drawn down 258 to fill in the suctioned boundary layer. A more uniform freestream flow 260 thus is produced. This more uniform freestream flow, as previously explained, results in a lower level of noise upon interaction with a downstream stator.

Figure 15A:
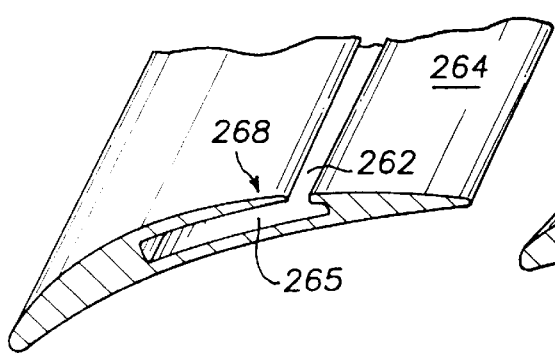
FIGS. 15A–15B are schematic perspective views of a continuous boundary layer suction slot configuration and a more-preferred discrete suction slot configuration employed in the invention.

Theoretically, the maximum amount of boundary layer suction accommodated by a given blade is preferred, to maximize noise reduction, but is preferred only up to an amount of suction corresponding to entire removal of the boundary layer; suction of freestream flow, in addition to the entire boundary layer, does not aid in wake management and thus is generally not useful. In practice, however, considerations for structural integrity, as discussed above, dictate a suction passage design that is more conservative than that indicated for maximum boundary layer suction. For example, as shown in FIG. 15A, theoretically, a continuous slot 262 along the span of a blade 264 and connected to an internal passage 265, would provide a maximum and very uniform boundary layer suction mechanism. However, this configuration effectively cuts the blade into two structural pieces; the blade's leading and trailing edge sections are here held only by the blade skin 268 behind the slot.

Figure 15B:
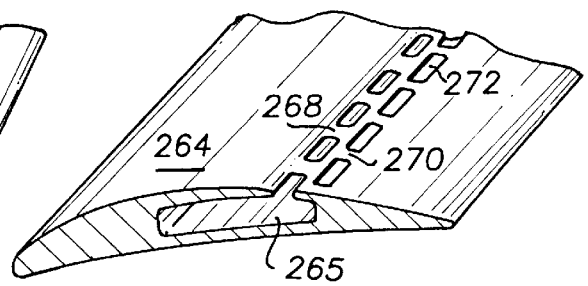

It is therefore preferred in the invention, as shown in FIG. 15B, that the blade suction mechanism consist of one or more rows 268, 270 of discrete slots 272 each connected to an internal passage 265 in the blade 264. If more than one row of discrete slots is employed, it is preferred that the slots of the various rows be offset from each other, as shown in the figure. A double row of offset discrete slots increases spanwise suction uniformity; this configuration is preferred because it very closely approximates the fluid dynamics of a continuous slot, but provides a continuous structural support for the leading and trailing edges of the blade.

Figure 16:
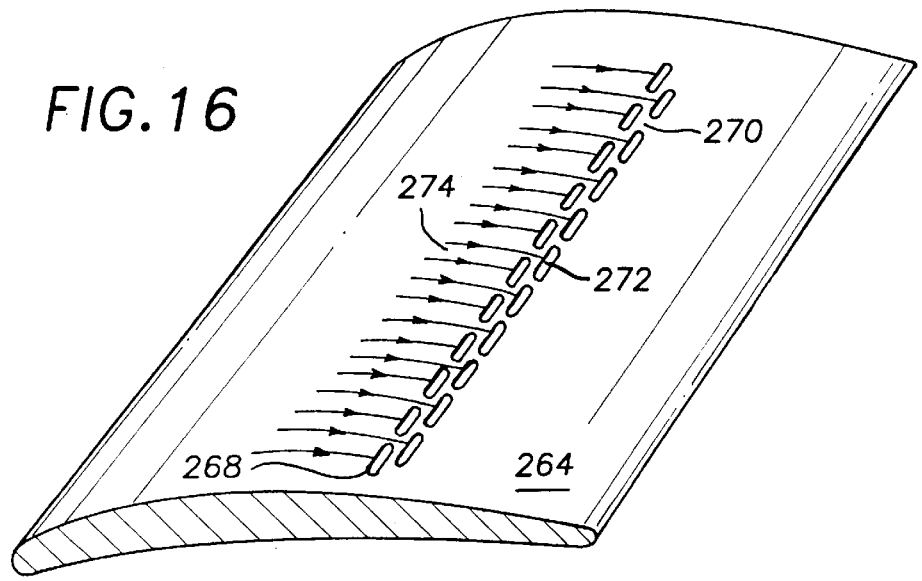
FIG. 16 is a perspective view of the slot configuration of FIG. 15B.

Considering other factors in the slot design, it is understood that for smoothly-contoured slots, i.e., slots with rounded corners, the boundary layer downstream of the slot is not impacted by the particular slot angle in the blade skin; the important factor is instead the amount of mass flow accommodated by a given slot and internal blade passage. Furthermore, pressures required for suction are not widely different for slots facing between the forward and normal blade positions. Rearward facing slots, however, are found to require a much lower pressure for effective suction, as can be expected from geometrical factors. Because, from a manufacturing perspective, normal-facing slots are most easily produced in a blade, and will generate minimal interference to the flow when no suction is applied, rounded, normal-facing slots are preferred. FIG. 16 schematically illustrates a slot profile based on these various considerations, showing the entire blade 264 of FIG. 15B. Here two rows 268, 270 of rounded, offset discrete slots 272 are provided normal to the blade surface. With this configuration, the boundary layer, streamlines 274 of which are shown in the figure, is effectively suctioned into one or more internal passages (not shown).

In the invention, the suction port can take on a wide range of geometries beyond rows of slots, however. Boundary layer suction can be accomplished through rows or other configurations of desired orifii geometries other than slots, and can be arranged as random orifii groups. The port can also consist of an array of very fine holes. A suction port can also be provide by the blade skin itself with the use of a porous blade material. The particular suction port selected for a given application should account for various flow and pressure scenarios for that application.

In the invention, a blade designed for boundary layer suction is preferably shaped with a thin, tapered blade trailing edge rather than a rounded trailing edge, which is in general thicker than that of a tapered trailing edge. Thicker trailing edges generally introduce larger velocity deficits and turbulence into the wake; to maximize the amount of wake control enabled by boundary layer suction it is therefore preferable to employ a thin, tapered trailing edge geometry with boundary layer suction. Structural considerations must, of course, be accounted for in determining a preferred trailing edge geometry, however.

The design of internal blade passages for accomplishing boundary layer suction proceeds as described above for trailing edge blowing, including considerations for blade structural integrity and the ability of the blade skin over one or more passages to accommodate a given passage pressure reduction while maintaining position. In general, once a suction distribution is determined for maximum noise reduction corresponding to a given blade wake, the corresponding radial mass flow and local blade passage pressure distributions are determined. These are then considered, along with structural limitations, to determine a practical number of internal passages. The number of internal passages must be sufficient to obtain a given radial mass flow variation corresponding to a desired noise reduction. The radial profile for obtaining maximum noise reduction may indeed require spanwise-nonuniform wake reduction instead of the spanwise-uniform reduction assumed in the examples above. Spanwise-nonuniform design requires a high-degree of characterization, however; for example, a passage configuration that does not provide suction of the boundary layer in the area of the blade tip may result in noise reduction that is more than an order of magnitude less effective than suction over the entire blade radius.

EXAMPLE 4

A design was produced for the turbofan rotor blade of Example 1 for enabling boundary layer suction along the radius of the blade using four internal passages. Using the blade wake data given in Example 1, the Mach number, M(r) of the freestream flow, and the blade momentum thickness, $\theta(r)$, both being a function of radius and determined for a location at 60% of the chord, the required mass flow per unit of blade span, $\dot{m}$/unit span, was determined, given a speed of sound, c, of 330 m/s, for the blade hub, middle, and tip regions, to remove about 80% of the boundary layer mass flow, on the low-pressure, suction surface side of the blade, corresponding to about 30% wake momentum deficit reduction.

| Blade Region | M(r) | $\theta(r)$ | $\dot{m}$/unit span (kg/s/m) |
| --- | --- | --- | --- |
| Hub: | 0.55 | 0.16% c | 0.106 |
| Middle: | 0.70 | .20% c | 0.191 |
| Tip: | 0.80 | 0.17% c | 0.207 |

Note that the 60% chord location was chosen for the above determination because downstream of this point, the blade boundary layer generally grows very quickly, depending on the particular airfoil geometry. Beyond the 60% chord position of the blade specified in this example, a correspondingly larger mass flow removal would be required to achieve the impact of a smaller mass flow removal at the 60% chord position. In addition, boundary layer removal at more rearward locations on the chord impacts the wake width more severely than does boundary layer removal at more forward locations; i.e., such rearward boundary layer removal narrows the wake, thereby to some degree nullifying the noise reduction benefit of the momentum deficit reduction. Therefore, suction at about 60% chord, can be understood to have the largest impact on wake harmonics of interest for noise reduction. In general, it is preferred that for a given airfoil geometry, the boundary layer growth be characterized as a function of chord position to ascertain the most effective location at which to configure the blade for suction.

Given that four internal passages are to be used, the blade span is divided into four regions to determine the corresponding mass flow required of each region. Then, following the procedures of the earlier examples, an iterative passage geometry calculation is made for the four-passage blade. In contrast with the above examples, in this case, the boundary conditions are specified with about vacuum level at the hub and the total required passage pressure at the passage tip.

It is found that an initial specification of 80% boundary layer removal through blade suction in a four-passage blade requires a total passage volume that is close to the entire blade volume based on a convergent blade passage solution. As a practical matter, this amount of suction cannot be accommodated due to structural limitations. Indeed, a blade having no slots may realistically include only about 70% open internal volume while retaining structural integrity, but surface slots require additional blade structure and a correspondingly lower open internal volume. Thus, it was decided to a priori set the total open passage volume at about 50% of the total possible blade volume, and to therefore scale by a factor of 0.6 the passage breadth values calculated for the initial 80% suction specification.

This provides the following internal passage design, where $P_{Tt}$ and $P_{Th}$ are the total pressures at the tip and hub, respectively; $M_t$ is the Mach number at the tip; $w_t$ and $w_h$ are the passage widths across the blade thickness, at the tip and hub, respectively; and $b_t$ and $b_h$ are the passage breadths along the blade chord, at the tip and hub, respectively, for each passage; and where the radial coordinate corresponding to the middle of each internal passage at the tip is given as $r_t$, with all dimensions given in meters.

| | Tip Passage | Outer-Middle Passage | Inner-Middle Passage | Hub Passage |
| --- | --- | --- | --- | --- |
| $r_t$ | 0.260 | 0.222 | 0.184 | 0.146 |
| $\dot{m}$ | 0.0085 | 0.0082 | 0.0073 | 0.0055 |
| $M_t$ | 0.70 | 0.78 | 0.70 | 0.70 |
| $P_{Tt}$(atm) | 1.00 | 1.00 | 1.00 | 1.00 |
| $w_t$ | 0.0008 | 0.0010 | 0.0013 | 0.0013 |
| $w_h$ | 0.0033 | 0.00365 | 0.0027 | 0.0015 |
| $b_t$ | .6 × 0.049 | .6 × 0.038 | .6 × 0.026 | .6 × 0.0195 |
| $b_h$ | .6 × .0514 | .6 × 0.024 | .6 × 0.0215 | .6 × 0.024 |

Figure 17:
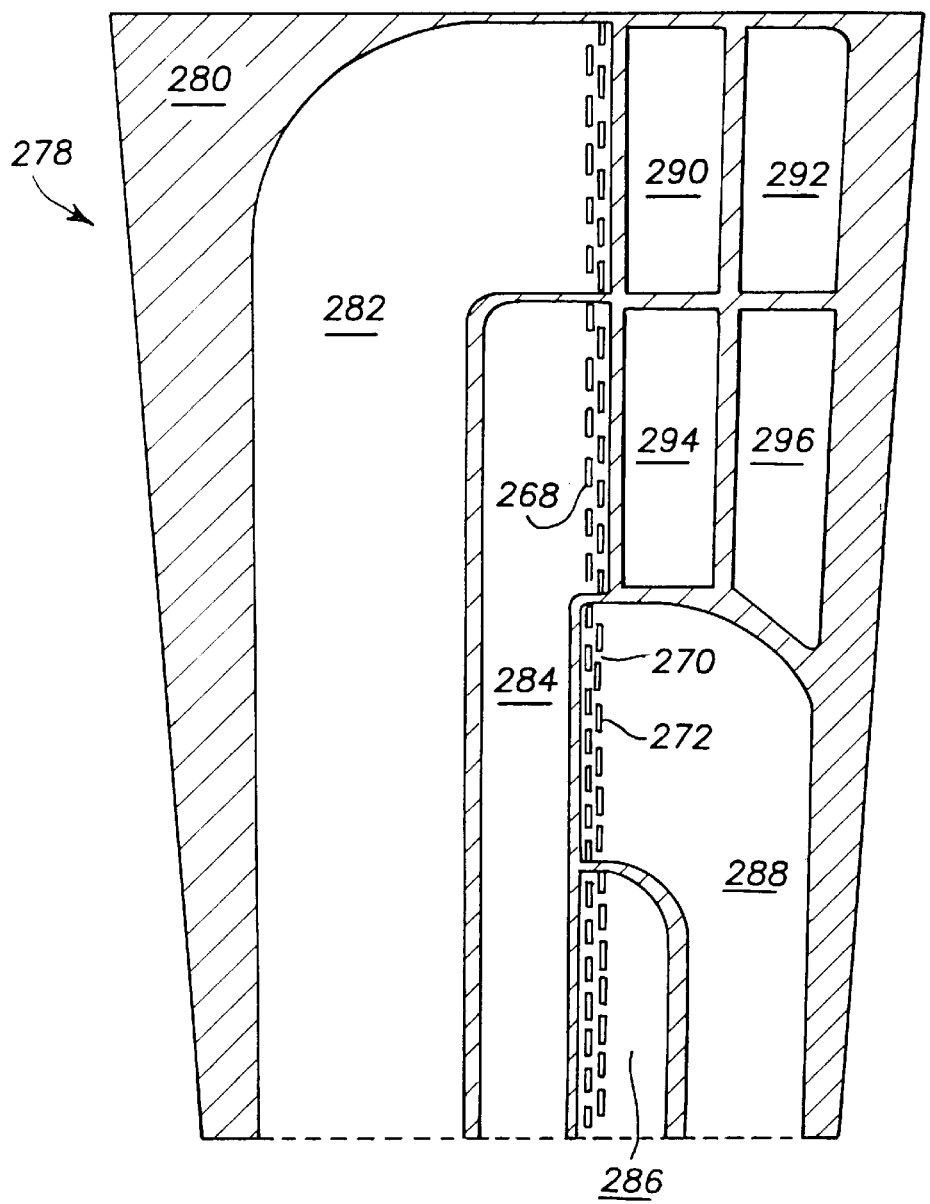
FIG. 17 is a cross-sectional view, along the camber line, of a four-passage rotor blade provided in accordance with the invention for boundary layer suction.

FIG. 17 illustrates the designed blade 278. The blade includes two rows 268, 270 of rounded, offset slots 272 along the 60% chord line; the slot rows communicate with the tip passage 282, the outer-middle passage 284, the inner-middle passage 286, and the hub passage 288 all cut into the blade solid volume 280. The slots are preferably about 3 mm spanwise, with a stretch of about 1 mm between the slots. The slots are preferably about 0.5% of the chord wide, or about 0.5 mm for this design.

Four void sections, 290, 292, 294, 296 are also included in the blade configuration. These voids replace internal blade material that would be structurally supported by material in the blade volume that now constitutes hollow passages. This void configuration thereby reduces stress and results in a blade stress that is roughly the same as that of a corresponding solid blade. In general, such voids are of a thickness (between blade sides) that is the same as the blade passages, and are of a chordwise extent that is the same as that of the passages under the voids. As can be recognized, the voids should be partitioned into several smaller voids if the surface deflection of the blade is determined to be too large due to structural limitations.

This blade design is found to provide about 50% reduction of the wake boundary layer at the 60% chord line of the blade. This corresponds to a decrease in wake momentum deficit of about 20%, for a noise reduction of about 2 dB. Clearly this is substantially less than the 8 dB noise reduction enabled by the trailing edge blowing techniques provided by the invention. It will be readily recognized that the internal blade passage volume of the blade could be increased beyond that derived in this example, but would require substantial computation, modeling, and testing to determine a passage configuration having adequate structural integrity.

But even considering the passage geometry derived in this example, note the relatively large combined volume of the passages here compared with the four-passage blade configuration for trailing edge blowing. This imbalance in passage volume is due to the fact that in suction, drawing in of the boundary layer fluid to the blade hub requires relatively higher pressure differences than required in blowing air out the blade trailing edge, due to the centrifugal force exploited in the blowing configuration, and thus for hub-based suction, the corresponding internal flow passages must be much larger than for trailing edge blowing. Accordingly, a given amount of wake deficit reduction is more easily obtained by trailing edge blowing techniques than by hub-based boundary layer suction techniques alone.

EXAMPLE 5

Figure 18:
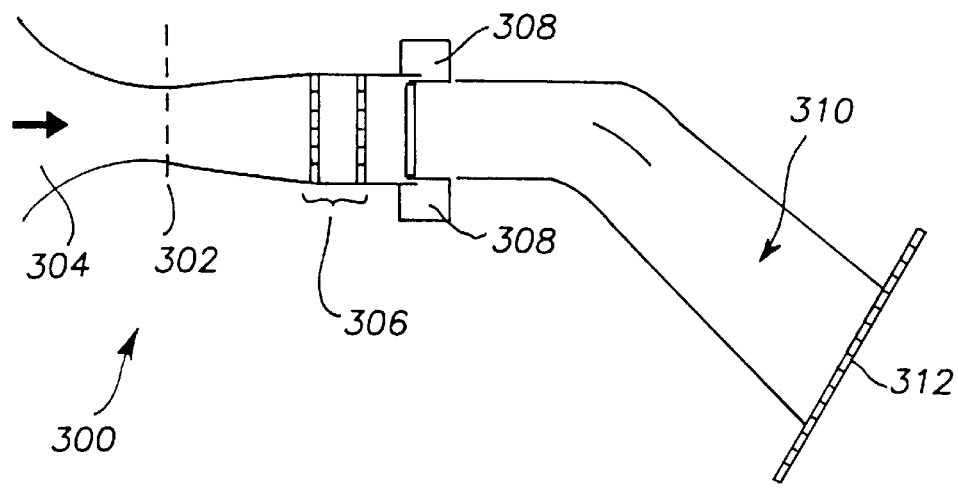
FIG. 18 is a schematic diagram of a cascade test duct provided in accordance with the invention for evaluating fan blade mid-span sections designed to accommodate trailing edge blowing and boundary layer suction.

A blade test facility, shown schematically in FIG. 18, was constructed to test fan blade geometries designed in accordance with the invention to provide various trailing edge blowing and boundary layer suction mechanisms. The test facility enabled testing and evaluation of the wake configurations produced by the invention in a miniaturized flow environment that duplicated many aspects of an engine environment but that was more easily outfitted with testing and measurement equipment. As shown in the figure, the test facility 300 is a flow duct connected at the output 302 of a wind tunnel 304. A flow conditioning section 306 is provided for achieving uniform inlet conditions, and pressure bleed pumps 308 are provided to remove the inlet boundary layer. Downstream of these sections is a measurement section 310 for wake data collection. A screen 312 is positioned at the downstream end of the facility.

Figure 19:
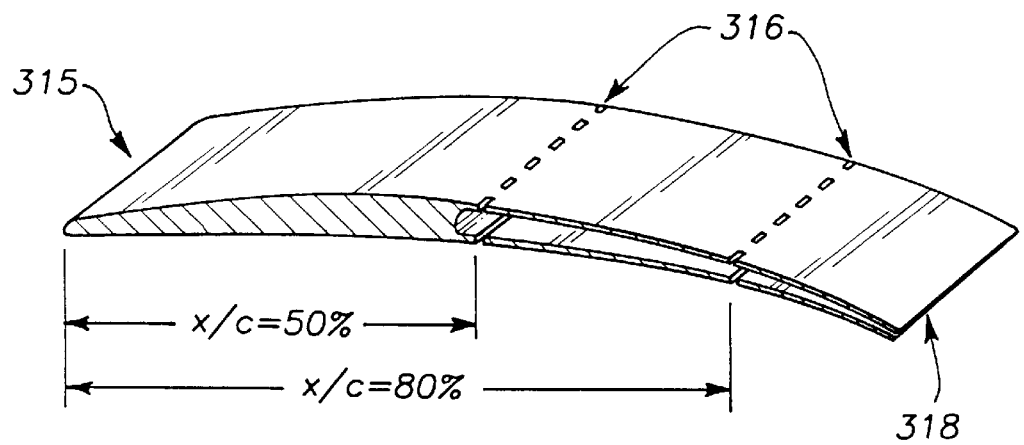
FIG. 19 is a perspective view of a test blade produced in accordance with the invention for testing in the test duct of FIG. 18.

Cascade experiments on three test fan blades utilizing a midspan section were undertaken to collect data on the effectiveness of the wake control mechanisms of the invention. FIG. 19 schematically illustrates the test blade geometry 315. The chord of the blades is about 0.25 m and the blade span is about 0.3 m. Two rows 316 of boundary layer suction slots are provided, one row at a chordwise position x/c of about 0.5 and the other at a chordwise position x/c of about 0.8. Each suction slot is about 2.5 mm-wide, chordwise, and about 12.5 mm-long, with adjacent slots separated along the span by about 3 mm. A row of trailing edge blowing slots 318 is also provided in the blade trailing edge, which has a thickness of about 2.5 mm. Blowing tubes (not shown) are included in the blade and connected with the slots. The tubes have an internal diameter of about 1.5 mm and a center-to-center spacing of about 3 mm, and are aligned along the mean camber line at the blade trailing edge.

Three such test blades were positioned in a cascade configuration in the wind tunnel to approximate fan rotor conditions. The flow configuration and aerodynamic loading of the blades was set to match typical aircraft engine take-off conditions; namely, a rotor inlet flow angle of about 39.8 degrees, a rotor outlet flow angle of about 58.9 degrees, and a rotor incidence angle of about 11 degrees. The inlet-to-exit pressure rise coefficient, $C_p$, was set at about 0.45, and the Reynolds number was maintained above about 300,000 based on the chord; this Reynolds number regime is sufficient to simulate the turbulent blade boundary layers and wakes typically present at full-scale engine flow conditions.

During the trailing edge blowing and boundary layer suction experiments, a single-wire hot wire anemometer probe, positioned in the measurement section of the test facility, was employed to collect data. Probe measurements were made at 0, 0.5, 1.5, and 2.5 chord lengths downstream of the test blade trailing edge. The probe was traversed along a line parallel to the exit plane of the three-blade cascade. Because the axial pressure gradients downstream of typical turbofans are generally near-zero, the area of the downstream test facility duct in which the wakes were measured 310 (FIG. 18) was adjusted such that the stream-wise pressure change in the duct was maintained at less than about 1.5% of the dynamic head.

Sampling of data from the probe was carried out at about 25 KHz, and frequencies above about 10 KHz were filtered. Unsteady flow was resolved below about 10 KHz, corresponding to a Stouhal number of about 1.4, based on a blade trailing edge thickness of about 2.5 mm and a freestream velocity of the cascade test facility set at about 18 m/s. With this configuration, the time-response of the hot wire anemometer was sufficient to resolve the dominant turbulent structures in the wakes of the test blades. The error in the velocity measurements obtained with the hot wire was found to be less than about ±1%.

Two tests were conducted to evaluate the boundary layer suction mechanism of the invention; in the first, the suction pumps in the test duct were employed to produce suction on the suction side of the test blades at the 80% chordline with a mass flow rate corresponding to about 50% reduction of the local boundary layer momentum thickness, in the second test, a mass flow rate corresponding to about 70% reduction of the local boundary layer momentum thickness at the 80% chordline was accomplished.

Figure 20A:
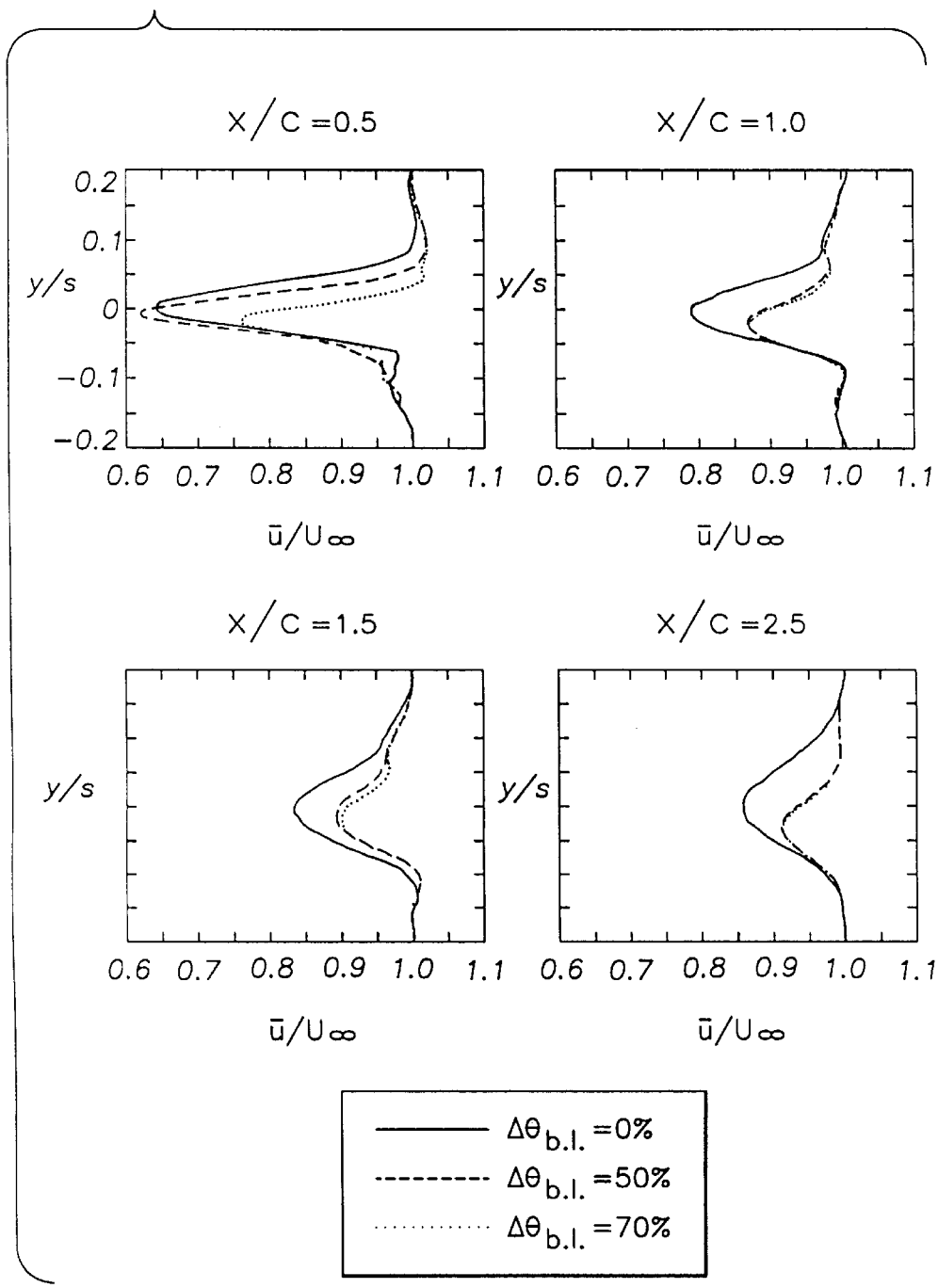
FIGS. 20A–20B are plots of the time-mean velocity deficit profiles and velocity deficit fluctuations, respectively, for an uncontrolled wake, a wake produced under conditions of 50% boundary layer suction, and a wake produced under conditions of 70% boundary layer suction, measured at positions of 0.5 chord length, 1 chord length, 1.5 chord lengths, and 2.5 chord lengths.

FIG. 20A shows plots of the resulting measured mean wake velocity deficit profiles, for 50% boundary layer reduction and 70% boundary layer reduction, at four downstream locations, namely, at about 0.5 of the chord, at about the chord length, at about 1.5 chord lengths, and at about 2.5 chord lengths. Also shown in the plots is the velocity deficit profile for the case of no boundary layer reduction. The profiles are plotted along an axis centered at the blade span center, with the span coordinate, y, as a fraction of total span, s.

Both narrowing of the wake on the suction side, i.e., low pressure side, of the blade (y/s>0), where the boundary layer was removed, as well as overall velocity deficit reduction, is evident from the plots. Note that the wake was changed little in going from 50% to 70% boundary layer thickness removal. For the case of 70% momentum thickness reduction, the peak wake deficit was reduced by about 40% at about 1.5 chord lengths downstream of the blade. The reduction in wake width for this case was about 15%. These plots clearly confirm that the boundary layer suction mechanism of the invention achieves the stated goal of reduction in the wake deficit of a fan blade operating in an aircraft environment. However, upon analysis of the wake harmonics, it is seen that some of this reduction is counteracted by the wake narrowing produced by the boundary layer suction.

Figure 20B:
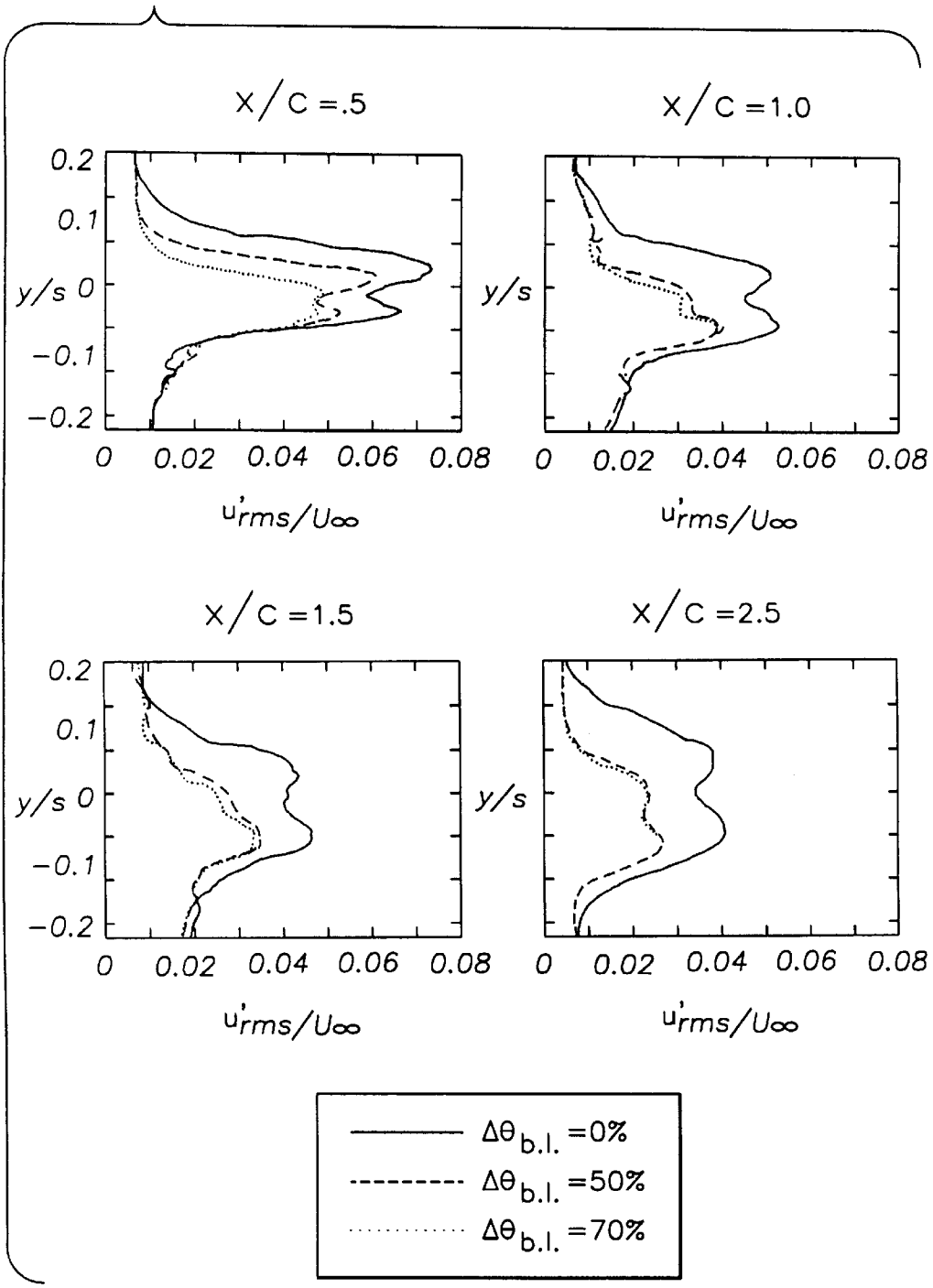

FIG. 20B shows plots of the rms wake velocity fluctuations resulting for the 50% boundary layer reduction and 70% boundary layer reduction, again at four downstream locations, namely, at about 0.5 of the chord, at about the chord length, at about 1.5 chord lengths, and at about 2.5 chord lengths. Also shown in the plots is the rms wake velocity fluctuation for the case of no boundary layer reduction. The profiles are plotted along an axis centered at the blade span center, with the span coordinate, y, as a fraction of total span, s.

Note in each of the plots of FIG. 20B the two turbulent fluctuation peaks, indicative of the wake vortex shedding mechanism. The peaks correspond roughly to the location of maximum shear in the mean velocity profiles, as expected.

At about 1.5 chord lengths downstream, the turbulent velocity fluctuations are seen to be reduced by about 35% for the 70% boundary layer reduction test. Since there are no significant changes in the corresponding turbulence spectrum, this reduction can be equated to a reduction of about 3.7 dB in the broad band noise component associated with the wake turbulence.

Figure 21A:
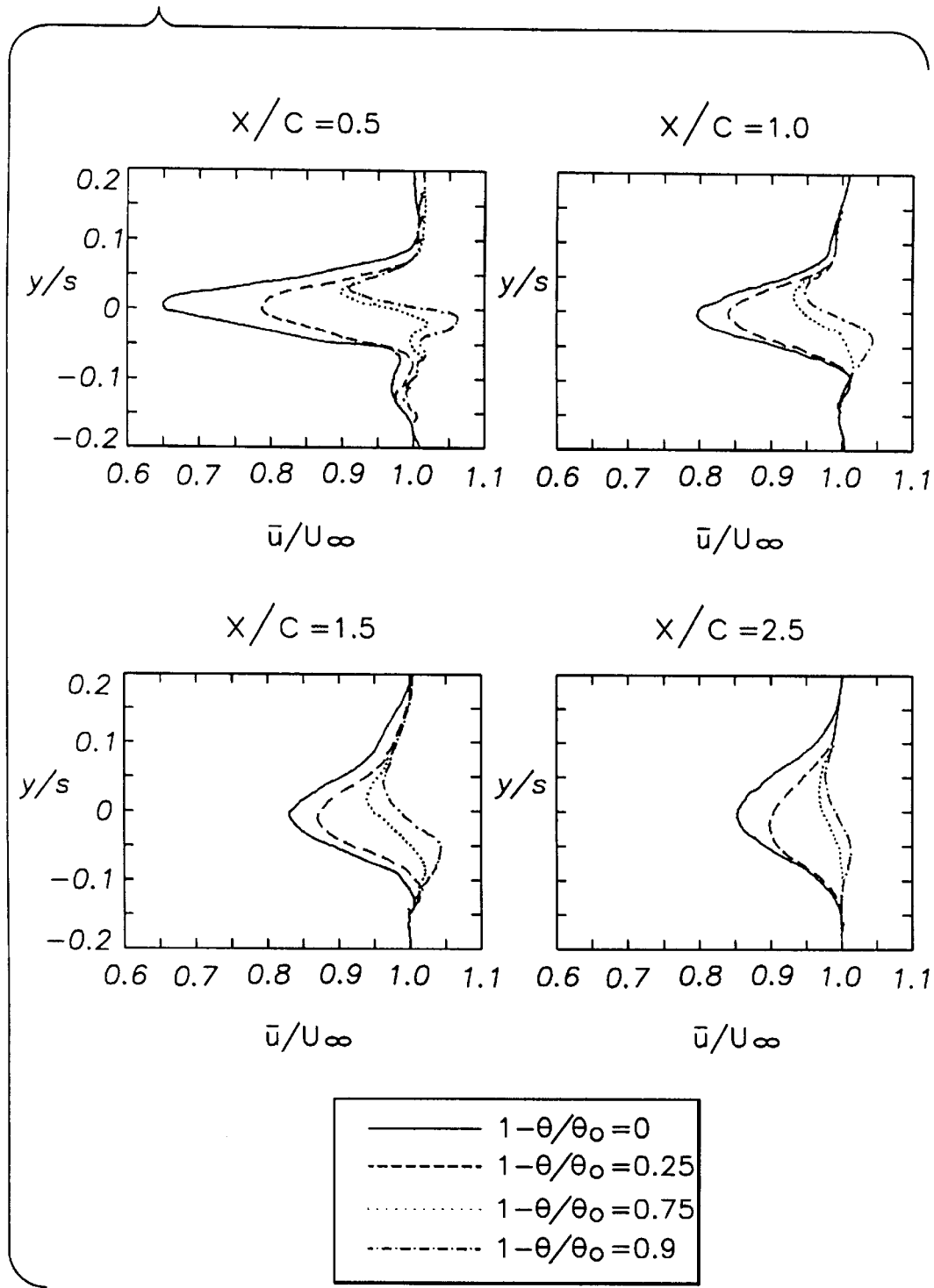
FIGS. 21A–21B are plots of the time-mean velocity deficit profiles and velocity deficit fluctuations, respectively, for an uncontrolled wake, a wake produced under conditions of 25% wake momentum deficit reduction, 75% wake momentum deficit reduction, and 90% wake momentum deficit reduction, measured at positions of 0.5 chord length, 1 chord length, 1.5 chord lengths, and 2.5 chord lengths.

Turning to the trailing edge blowing tests, three tests were undertaken, namely, blowing of air with mass flow rates corresponding to addition of 25%, 75%, and 90% of the wake momentum deficit calculated for the natural, uncontrolled wake. FIG. 21A shows plots of the resulting measured mean wake velocity deficit profiles, for all three tests, at four downstream locations, namely, at about 0.5 of the chord, at about the chord length, at about 1.5 chord lengths, and at about 2.5 chord lengths. Also shown in the plots is the velocity deficit profile for the case of no trailing edge blowing. The profiles are plotted along an axis centered at the blade span center, with the span coordinate, y, as a fraction of total span, s.

A reduction of up to about 50% in wake deficit over the uncontrolled wake profile is clearly indicated in the plots. The filling of the wake deficit preferentially on the pressure side, i.e., higher pressure side, of the blade (y/s<0) may be due to alignment of the injection slots with the mean camber line in the test blades rather than alignment with the blades' deviation angle; the deviation angle is here about 6 degrees.

Figure 21B:
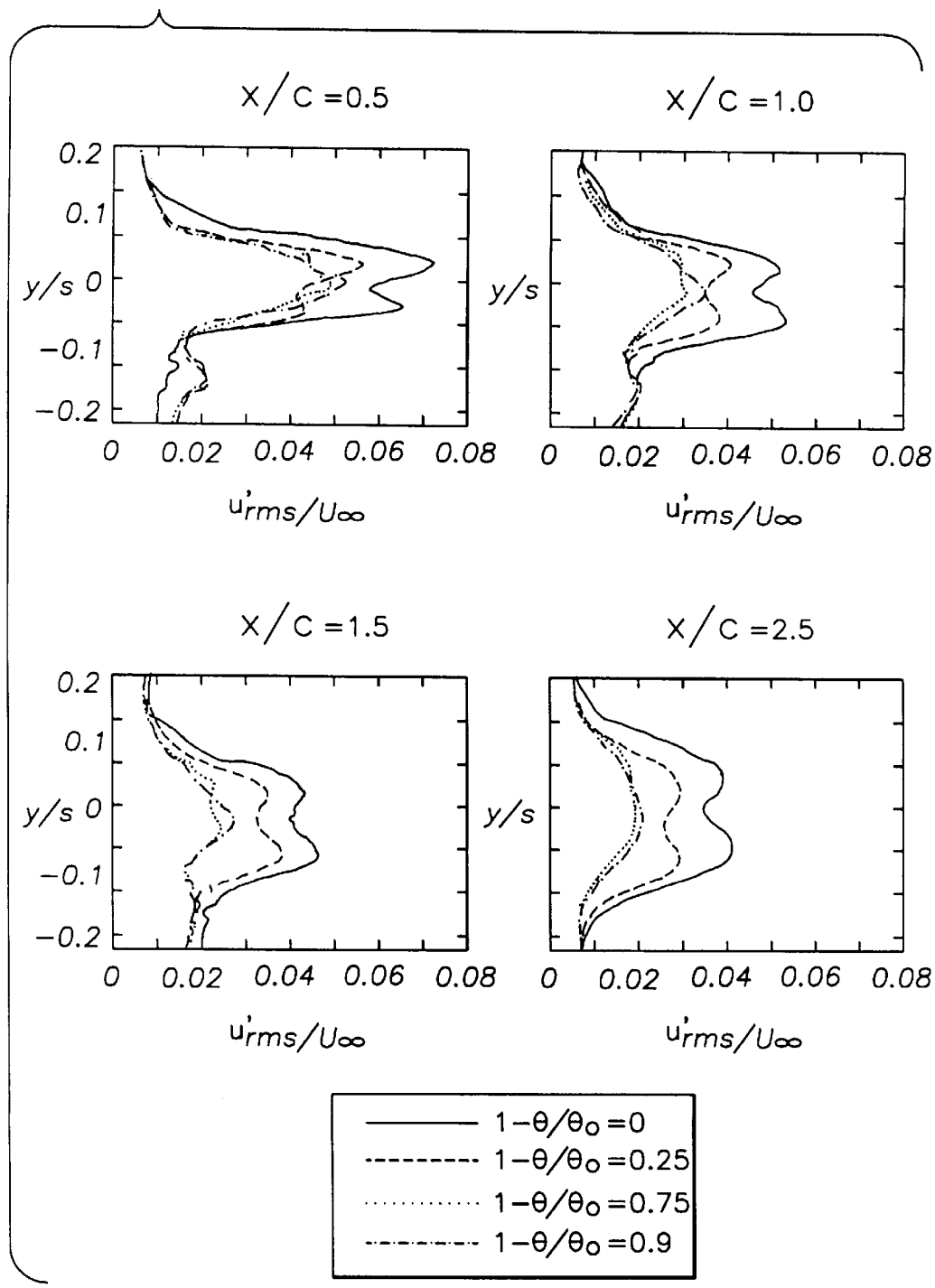

FIG. 21B shows plots of the rms wake velocity fluctuations resulting for the four wake deficit filling tests, again at four downstream locations, namely, at about 0.5 of the chord, at about the chord length, at about 1.5 chord lengths, and at about 2.5 chord lengths. Also shown in the plots is the rms wake velocity fluctuation for the case of no wake deficit filling. The profiles are plotted along an axis centered at the blade span center, with the span coordinate, y, as a fraction of total span, s. Here the maximum reduction in wake velocity fluctuations is seen to be about 50%, occurring at a downstream location of about 1.5 chord lengths, for the 90% wake momentum deficit fill test. As with the boundary layer suction tests, there are in this case no significant changes in the corresponding turbulence spectrum, and so this 50% reduction can be equated to a reduction of about 6 dB in the broad band noise component associated with the wake turbulence.

The test measurements for the maximum boundary layer suction, i.e., 70% boundary layer suction, and the maximum trailing edge blowing, i.e., 90% wake momentum deficit, were further analyzed with respect to the amplitude of radiated acoustic modes that would be produced by interaction of the corresponding wakes with a downstream stator. Accordingly, data from the downstream measurement point of 1.5 chord lengths was here employed. The time-mean wake signatures for the two cases were converted to a stator reference coordinate frame and decomposed into spatial harmonics to be used as the initial conditions of a two-dimensional, linearized panel modeling method called LINSUB, developed by S. N. Smith and described in "Discrete Frequency Sound Generation in Axial Flow Turbomachines," *Aeronautical Research Council R. & M.*, No.3709, 1971. The LINSUB modeling code is based on flat plate airfoils with zero mean aerodynamic loading and sinusoidal inlet wakes. The radiated acoustic modes calculated by the code correspond to the circumferential mode orders in a three-dimensional annular reference frame. Thus, the code results, although two-dimensional in nature, yield relevant results. Both upstream and downstream propagating acoustic waves are calculated by the code, as well as the downstream convected vorticity wave shed from the stator blades due to the unsteady aerodynamic loading of the wake on the stator blades.

Flow conditions used in the code model were established by setting the flow angle to about 12 degrees, the Mach number to about 0.54, and the rotor-stator pitch ratio to about 0.4; these values are typical for the blade design used. Table 1 below provides the results of the model for the first six harmonic modes, using the experimentally measured harmonic mode amplitudes of the baseline wake profile, the wake profile produced by trailing edge blowing, and the wake profile produced by boundary layer suction.

TABLE 1

Mode Amplitudes in dB: upstream and (downstream)
All referenced to: Baseline m = −8, 2 × BPF upstream and (downstream), respectively

| Mode | Baseline | Boundary Layer Suction $\Delta\theta_{b.l.} = 70\%$ | Trailing Edge Blowing $1 - \theta/\theta_o = 0.9$ |
|---|---|---|---|
| 2 × BPF, m = −8 | 0 (0) | −4.4 (−4.4) | −11.4 (−11.4) |
| 3 × BPF, m = 8 | −0.6 (−28.3) | −5.1 (−32.7) | −7.7 (−35.3) |
| 3 × BPF, m = −32 | −5.5 (−9.5) | −9.9 (−13.9) | −12.5 (−16.5) |
| 4 × BPF, m = 24 | −6.0 (−18.3) | −9.9 (−22.1) | −10.7 (−23.0) |
| 4 × BPF, m = −16 | −24.7 (−16.3) | −28.5 (−20.1) | −29.3 (−21.0) |
| 4 × BPF, m = −56 | −3.7 (−14.2) | −7.5 (−18.1) | −8.3 (−18.9) |

As given in Table 1, the amplitude's of the various propagating acoustic modes are indeed reduced by the boundary layer suction and trailing edge blowing mechanisms provided by the invention. The amplitude of the strongest propagating mode, for which m=−8, 2×BPF, downstream, is reduced by about 4.4 dB by the 70% boundary layer suction. The amplitude of this mode is shown to be reduced by about 11.4 dB by the 90% trailing edge blowing. Higher-order modes show similar reductions in amplitude from the boundary layer suction and 5 dB–10 dB reductions from the trailing edge blowing. For a full-scale fan blade along the entire span of which is applied this degree of boundary layer suction, only about 2.2% of the fan flow-through would be required. Similarly, only about 0.9% of the fan flow-through would be required to apply the defined trailing edge blowing along the entire span of a blade.

This experimental example and analysis clearly confirm that the boundary layer suction and trailing edge blowing techniques provided by the invention reduce both the broad band and tonal harmonic acoustic radiation associated with the interaction of fan rotor wakes with a downstream stator. Note that under the trailing edge blowing conditions, the harmonic mode corresponding to twice the blade passing frequency is no longer the dominant noise source, as it is without the trailing edge blowing. This demonstrates that the impact of a selected trailing edge blowing or boundary layer suction scheme on all wake harmonics must be considered to ensure that a newly dominant harmonic noise source does not nullify reduction of other harmonic sources.

In the examples above for both trailing edge blowing and boundary layer suction, internal passage design was accomplished based on an initial assumption of a spanwise-uniform wake momentum deficit reduction requirement, which then determined the spanwise-uniform mass flow distribution required. In an alternative design process in accordance with the invention, the wake momentum deficit reduction requirement is not initially assumed to be spanwise-uniform, and instead, the mass flow required is tailored as a function of span to reduce the momentum deficit at locations where coupling of the wake to propagating acoustic modes is at a maximum, to in turn achieve a maximization of noise reduction. As can be readily understood, such a determination requires detailed quantitative data on the wake characteristics of a given blade.

The coupling of a wake to propagating acoustic modes, and the corresponding unsteady stator blade loading, depends on a range of factors. For example, certain circumferential modes can propagate for specific fan speeds and relative rotor and stator blade numbers. Each such circumferential mode includes one or more radial modes having shapes that are dependent on the blade span and that are themselves different for each circumferential mode. For a fan having no tangential skew, i.e., a fan for which the wake is radially straight, the degree of circumferential, radial, and axial matching between the blade pressure distribution and the acoustic mode pressure distribution determines the degree to which the wake aerodynamic loading of the stator is coupled to a given acoustic mode. Each mode has a different wavelength in the axial direction, and as a result, couples differently with a stator chord. Thus, even if the spanwise and circumferential pressure distributions of the blade loading and the acoustic mode are matched, the stator chord's axial configuration may cancel the mode due to positive coupling on one part of the blade and negative coupling on the other. As a result, the noise of rotor wake interaction with a stator can be inadvertently increased, rather than decreased, if precise characterization of the wake, in conjunction with mode modeling, is not undertaken.

A further practical consideration concerns the nature of the rotor blade wake interaction with the stator blades. In practice, the rotor blade wake does not strike all points across the stator blade span at the same time, and instead sweeps up the blade span due to the relative angle between the stator blade and the rotor wake, also known as the skew between the stator blade and the rotor wake. This creates a spanwise phase shift for all pressure distributions, resulting in a radial mode coupling that is not consistent with two-dimensional theory. As with the axial coupling described above, wake skew can cancel or nearly cancel modes that are dominant in the case of no skew; indeed, modes that are generally small may be dominant modes with skew. In addition, the radial modes of a low hub-to-tip ratio engine, e.g., a ratio of less than 0.75, are complicated combinations of Bessel functions. Thus, except for special cases such as high hub-to-tip ratio engines, in which case the radial modes are reasonable approximated as cosines, or for cases of very small skew angles, the complicated nature of the wake pressure field coupling from the stator blades to propagating acoustic modes generally requires an automated three-dimensional simulation tool for design of a spanwise custom wake control configuration. Once this is accomplished, the region of the wake, and the corresponding region of the rotor blade, that is most influential to acoustic mode coupling can be identified, and an appropriate distribution of boundary layer suction and/or trailing edge blowing determined. Then, following the procedures outlined in the examples, internal blade passages can be designed to accommodate the necessary mass flow rate.

In the case of high hub-to-tip ratio and low wake skew angle, coupling to acoustic radial modes is largely dominated by the zeroth order radial mode for spanwise-uniform unsteady stator loading, with the other radial modes integrating to nearly zero. For relatively lower hub-to-tip ratios, the zeroth order radial mode is relatively more weighted toward the blade tip, and as a result, increased wake control at the outer one-half span of the blade can significantly reduce this mode. However, higher radial modes, which may be small with spanwise-uniform loading, high hub-to-tip ratios, and little skew, can at lower ratios and increased wake skews be coupled to a degree that results in more radiated noise than was present without any wake control. In other words, spanwise-tailored wake control, unlike spanwise-uniform wake control, can reduce a dominate acoustic mode, but may result in strengthening of a different mode to a degree that increases, rather than decreases, the overall radiated noise. Careful wake characterization and acoustic mode modeling are thus required, as stated above, if an initial uniform wake momentum deficit reduction assumption, that is guaranteed to reduce noise, like that used in Examples 1–4 is not made.

Beyond the various wake control configurations discussed above, the invention provides a combined trailing edge blowing/boundary layer suction configuration for wake control. This combination technique enables the ability to almost completely eliminate the rotor blade wake and to fully accomplish this at short distances behind the blade, whereby both broadband and tonal noise from wake interaction with even relatively closely spaced downstream stator blades is nearly eliminated.

This advantage of the combination wake control scheme can be understood by considering each control component separately. Boundary layer suction reduces the momentum deficit along the blade and results in flow off the blade that is oriented at approximately the chordline, rather than at the relatively large deviation angle described above and shown in FIG. 8B. But boundary layer suction alone, even in a scenario that achieves complete boundary layer removal (which as explained above is difficult to do), inherently results in some downstream wake and momentum deficit due to the thickness of the blade's trailing edge. Trailing edge blowing techniques are successful at filling in this trailing edge velocity deficit, however, as demonstrated in the examples above. The chordline flow alignment of the boundary layer suction mechanism further aids in the effectiveness of the blowing. Thus, a combination of boundary layer suction and trailing edge blowing synergistically enables filling in of momentum deficit due to both boundary layer conditions and trailing edge conditions.

Importantly, this two-phase process is accomplished at short distances behind the blade; removal of the boundary layer and orientation of the resulting flow by the suction mechanism reduces the amount of mixing required of the trailing edge blowing in the wake. As a result, effective and fast wake control is achieved by the combination technique. Stators in a typical turbofan are generally configured about two chord lengths downstream from the fan rotor and thus may not in all cases need to take full advantage of this fast control. But turbine engine compressor and turbine stages, in which rotors and stators are typically closely spaced, as well as many other rotor-stator configurations, are well-addressed by the combination boundary layer suction/trailing edge blowing mechanism provided by the invention.

In general, the combination mechanism requires a rotor blade design that accommodates the various requirements explained earlier for both wake control techniques alone. Accordingly, large-volume boundary layer suction passages and distributed slotting geometry are preferably provided upstream of about 80% of the blade chord to accommodate internal blowing passages and corresponding trailing edge slot geometry at the last 20% of the blade chord. Both a high-pressure source and a low-pressure source are required of the engine configuration. Returning to FIG. 4C, in a first such configuration, both the high- and low-pressure sources communicate with the fan blades through the blade hubs. Alternatively, as shown in FIG. 4D, for a case in which the fan is shrouded, the high-pressure source can be located under the hub of the blades, with the low-pressure source located in the outer casing radially peripheral to the fan. As can be understood, the pressure and mass flow requirements in the former case are quite complicated, and so for shrouded configurations, it is preferred that the low-pressure source be located in the fan casing. Other configurations are also suitable, however, as can be recognized.

The design of a combination-wake-control blade geometry, like the single-control techniques above, is based on an understanding of the boundary layer and wake characteristics of a given blade. In one example design scheme in accordance with the invention, the boundary layer mass flows and wake momentum deficits for the blade geometry are determined and a design criteria of, e.g., about 60% boundary layer removal by the suction mechanism is set. The resulting trailing momentum deficit is then spanwise determined, and given an initial blowing slot configuration, the required blowing mass flows and corresponding blowing passage geometries are calculated, in the manner of the previous examples, given the blade thickness, engine pressure conditions, number of desired passages, and other factors. Preferably, the blowing passages are located as close to the chord end as is structurally allowable.

Then, the geometry and distribution of suction slots is determined, preferably through a combination of modeling and experimental data manipulation. In particular, as discussed in Example 4, it is prudent to determine the blade chord position beyond which suction is less effective due the rate of boundary layer growth. Once the optimum suction slot positioning is determined, the spanwise suction passage distribution and passage geometries are determined in the manner of Example 4. Preferably, this determination is iterated starting with the initial suction slot position to ascertain the maximum boundary layer mass flow that can be accommodated in the blade volume not taken up by blowing passages.

If the amount of boundary layer suction provided by the suction slot and passage geometry solution is less than the initial assumption of suction, e.g., less than the initial 60% assumption, then the trailing edge blowing geometry must again be determined, based on the calculated, rather than initial, suction geometry and the corresponding trailing edge momentum deficit. An iterative design cycle is continued until the maximum achievable boundary layer suction and trailing edge blowing that can be structurally accommodated by the given blade is achieved.

The combination wake control technique provided by the invention is particularly advantageous for turbofan designs that include rotor tip shrouding. Shrouding of rotor blade tips in a turbine engine is frequently employed based on structural and performance considerations for the engine. The inventors herein have recognized that beyond their conventional purpose, rotor tip shrouds can be employed to remove rotor tip clearance flow; such flow can add to the radiated noise produced when the clearance flow, as well as rotor blade wake, interacts with a downstream stator. Indeed, in some cases, the interaction between the rotor tip clearance flow and a downstream stator can dominate the broadband noise radiation produced by the rotor-stator interaction.

While a rotor tip shroud can remove the freestream fluid that passes around the rotor tips, it creates corner separations of the rotor blade boundary layers. This separation is primarily caused by migration of boundary layer fluid on the shroud from the high-pressure side of the blade to the low-pressure side of the blade; the resulting boundary layer then accumulates in the corner of the blade-shroud connection, thereby producing a momentum deficit. In the invention, such separated boundary layers and the corresponding momentum deficit are removed using a boundary layer suction technique. As a result, a tip-shrouded fan rotor blade configuration having boundary layer suction and trailing edge blowing in accordance with the invention eliminates blade clearance flow and its associated noise, as well as reduction or elimination of the boundary layer and wake noise components. Ideal application of this configuration results in substantially only freestream turbulence remaining to generate noise at the stator blades.

Weight, cost, and performance considerations, in addition to noise reduction considerations, must be evaluated for a given shrouding configuration. Specifically, the weight and size of a rotor tip shroud, which for a high-bypass engine can be more than about ten feet in diameter and about one foot deep, can significantly add to the fan structure and corresponding engine fuel requirements. Accordingly, it is prudent to evaluate the amount of noise reduction to be gained by tip shrouding as a function of the weight, size, and cost of such shrouding.

Turning back to the turbine engine configuration of FIG. 4D, the use of a rotor tip shroud in accordance with the invention provides an elegant solution for enabling both trailing edge blowing and boundary layer suction mechanisms that are driven by the fan's inherent centrifugal force. Here the low compressor 62 is employed as a high pressure source for driving 84 trailing edge blowing through the hub section of the fan blades, and is enhanced by fan's centrifugal forces, while the tip shroud 114 provides a fluid path for boundary layer suction out of the tip blade to a pump source in, e.g., the pylon 116, again being enhanced by the fan's centrifugal forces. Thus, both blowing and suction are aided in this configuration by the fan's centrifugal force and can achieve a combined suction/blowing mechanism that in some cases may be more effective than for a hub-based suction/blowing configuration.

Figure 22:
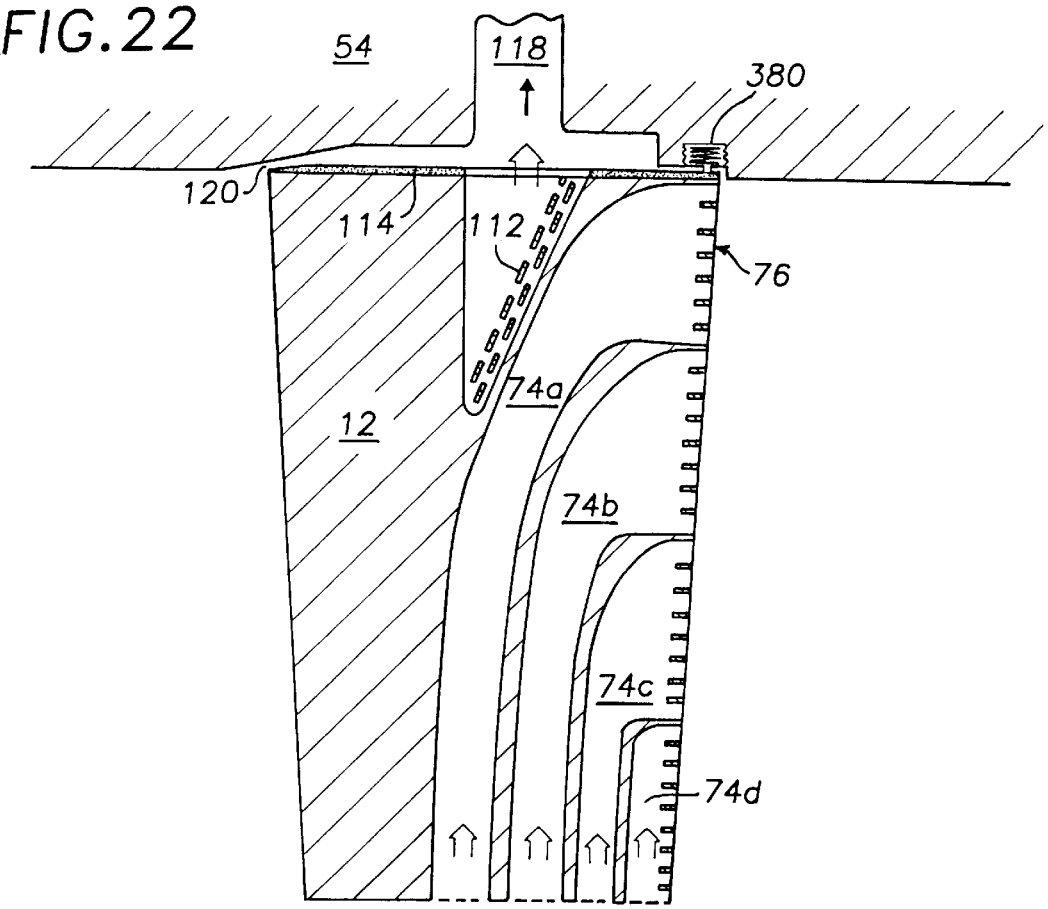
FIG. 22 is a cross-sectional view, along the camber line, of a four-passage rotor blade provided in accordance with the invention for trailing edge blowing, having a passage with slots for boundary layer suction out of the blade tip, and further having a tip shroud with suction ports for controlling tip clearance flow.

Referring also to FIG. 22, one example fan blade design 12 in accordance with the invention for this configuration is shown in more detail. Boundary layer suction is employed in the blade to both reduce the tip-shroud boundary layer separation as well as to work synergistically with a trailing edge blowing mechanism. Removal of about 50% of the boundary layer using slots 112 at about the 50% chord line and set at a pitch of about 10%, on the suction side of the blade, reduces the blade boundary layer and thus reduces the amount of trailing edge blowing needed to fill in the wake momentum deficit. While the boundary layer suction slots can be located anywhere on the blade, it is preferred that they be located on the outer region of the blade span, e.g. the outer 20% of the span, where the boundary layer mass flows are known to be largest and the suction flow can be sent out of the blade tip into a cavity 118 in the outer casing 54.

As shown in the figure, one or more internal passages, e.g., four internal passages 74a, 74b, 74c, 74d are included for accommodating trailing edge blowing. Whatever number of passages are employed, preferably, they are designed, in the manner of the earlier examples, such that the entire wake momentum and mass deficit is filled along the blade span. The final flow control mechanism used in this case is suction on the tip shroud 114, near the suction surface of the blade, to remove boundary layer fluid migrating toward the blade surface. The tip shroud is thus preferably a porous structure. This enables suction into an underlying open area 120 in the casing 54 that is connected to the cavity 118 leading to the low-pressure pump with little disturbance to the freestream flow. With this three-way wake control scheme, a trailing vortex will still be shed by the blade, but it will not have the large total pressure defect of the tip clearance flow or corner separation.

This configuration further accommodates a scheme for elimination of trailing edge-to-leading edge flow over the shroud. Such shroud clearance flow results from leakage of air upstream over the shroud, with high-loss fluid being thereby injected in front of the fan, resulting in degradation of the fan performance. This flow is eliminated in the invention by providing a seal 380, e.g., a double-labyrinth seal, at the trailing edge of the tip shroud, such that high-pressure fluid cannot migrate across the shroud to the low-pressure leading edge. In contrast, the opening of the leading edge cavity 120 in the casing 54 under the leading edge of the tip shroud is provided because its connection to the low-pressure pump acts to remove the inlet boundary layer, and thus acts to reduce noise caused by interaction of the rotor blades with turbulence in the boundary layer.

Because the internal passage pressures at the blade tip required for trailing edge blowing are typically quite high, e.g., 3–4 atm and the flow from the boundary layer suction is at least partially pumped out of the blade tip as a result of centrifugal force, the trailing edge blowing may require more work per unit mass than for the previous cases in which blowing alone was employed. If this is found to be the case for a given configuration, then it is preferable to maximize the amount of boundary layer suction that is applied, e.g., 80% boundary layer removal. It should be noted that the amount of mass flow required per unit of boundary layer removal beyond 80% is generally substantially larger than for less than 80% removal, and thus it is typically not preferred to exceed 80% removal.

Given 80% boundary layer suction, at 60% of the blade chord, the wake momentum deficit is reduced by about 30% below that for no application of suction, whereby only about 70% of the momentum, and 83% of the mass flow that would need to be added in a blowing scheme alone needs to be added in this combination suction-blowing scheme. Because the amount of blowing corresponding to these factors is actually reduced only by about 20%, the actual work required for the trailing edge blowing depends not only on the particular fan and engine design but also whether any useful work can be abstracted from the boundary layer suction flow.

Figure 23:
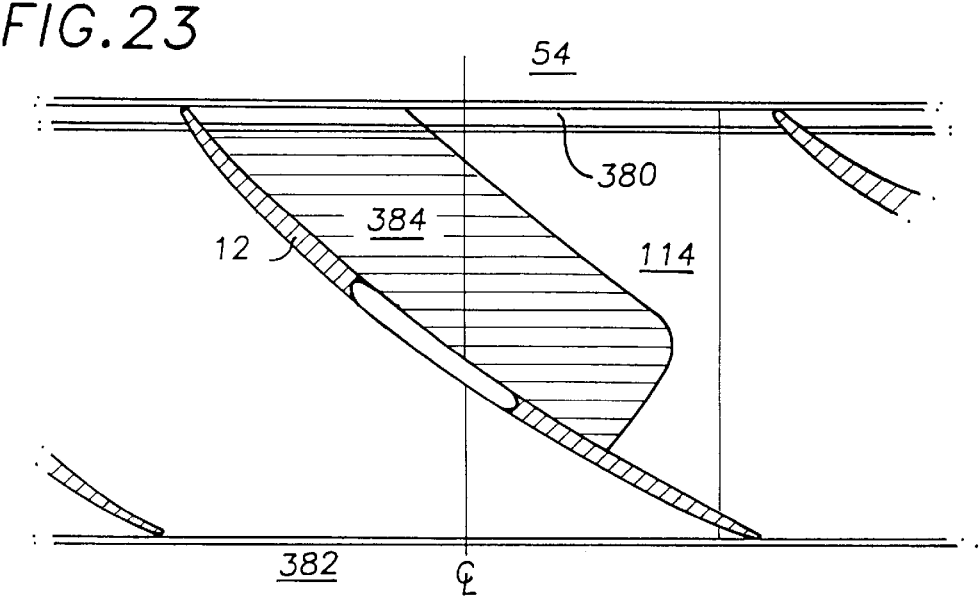
FIG. 23 is a tip view of the blade of FIG. 22, turned ninety degrees.

In one example scenario, the hub total pressure indicated for trailing edge blowing alone is employed and the size of the tip section passage is decreased by about 20% in accordance with the reduced requirements for the combined configuration. Alternatively, the total pressure can be decreased and the size of the outer blade passages increased to maintain the required mass flows. In terms of the suction scheme, the 80% boundary layer suction design parameters given in Example 4 above can be employed. Referring also to FIG. 23, the shroud suction is accomplished through perforations 384 in the shroud, preferably over about, e.g., 30% pitch on the suction side, i.e., low-pressure side, of the shroud to slowly remove the shroud boundary layer. This configuration is more structurally sound than a slot scheme, and has less impact on the mean boundary layer flow than a slot scheme. Also as shown in FIG. 23, perforations 382 can be provided upstream of the cavity, in place of the leading edge slot of the cavity 120 shown in FIG.22. This configuration enables improved performance when suction flow is not applied, e.g., lower losses than an open slotted configuration.

The various blowing and suction techniques provided by the invention can be applied to various other engine configurations beyond those already presented. For example, engine compressors can include rotor blades having a geometry for accommodating the trailing edge blowing configurations described above to reduce the noise associated with compressor rotor wake-stator interaction. Similarly, the engine turbine rotor can include blades of a geometry that accommodate the wake control mechanisms of the invention for reducing the noise associated with turbine wake-stator interaction. Indeed, the invention contemplates use of trailing edge blowing and boundary layer suction for any turbomachine having rotating blades whose wakes interact with turbomachine components downstream of the rotating blades. The design principles of the invention described above can be applied to the turbomachine for reducing noise associated with rotating blade wake interaction with downstream components of the turbomachine.

Furthermore, in addition to control of wakes associated with rotating blades for reduction of blade wake interaction with downstream components, the boundary layer suction and trailing edge blowing configurations provided by the invention can be applied to stationary structures such as stator rows, i.e., rows of stationary blades, and inlet guide vanes upstream of rotating blades, e.g., a rotating rotor, to reduce the interaction of the wakes produced by the stationary structures with the rotating rotor blades. The nature of the interaction of wakes produced by such upstream stationary structures with a downstream rotating blade is substantially identical with that of wakes produced by a rotating blade and interacting with a stationary downstream structure, and accordingly, all of the wake control characteristics and design procedures described above are applied equally-well in this scenario.

In fact, wake control mechanisms are more easily implemented on stationary structures due to their lack of rotation. The structural limitations placed on the wake control mechanism in stationary structures are greatly reduced, and fluid flow within the structures is less complicated than for a rotating blade; e.g., radial gradients are typically much smaller and required pressure levels are typically greatly reduced. Rotating seals are also not required to maintain fluid flow within the structure, making the overall design of the structure relatively less complicated than for rotating structures.

Figure 24:
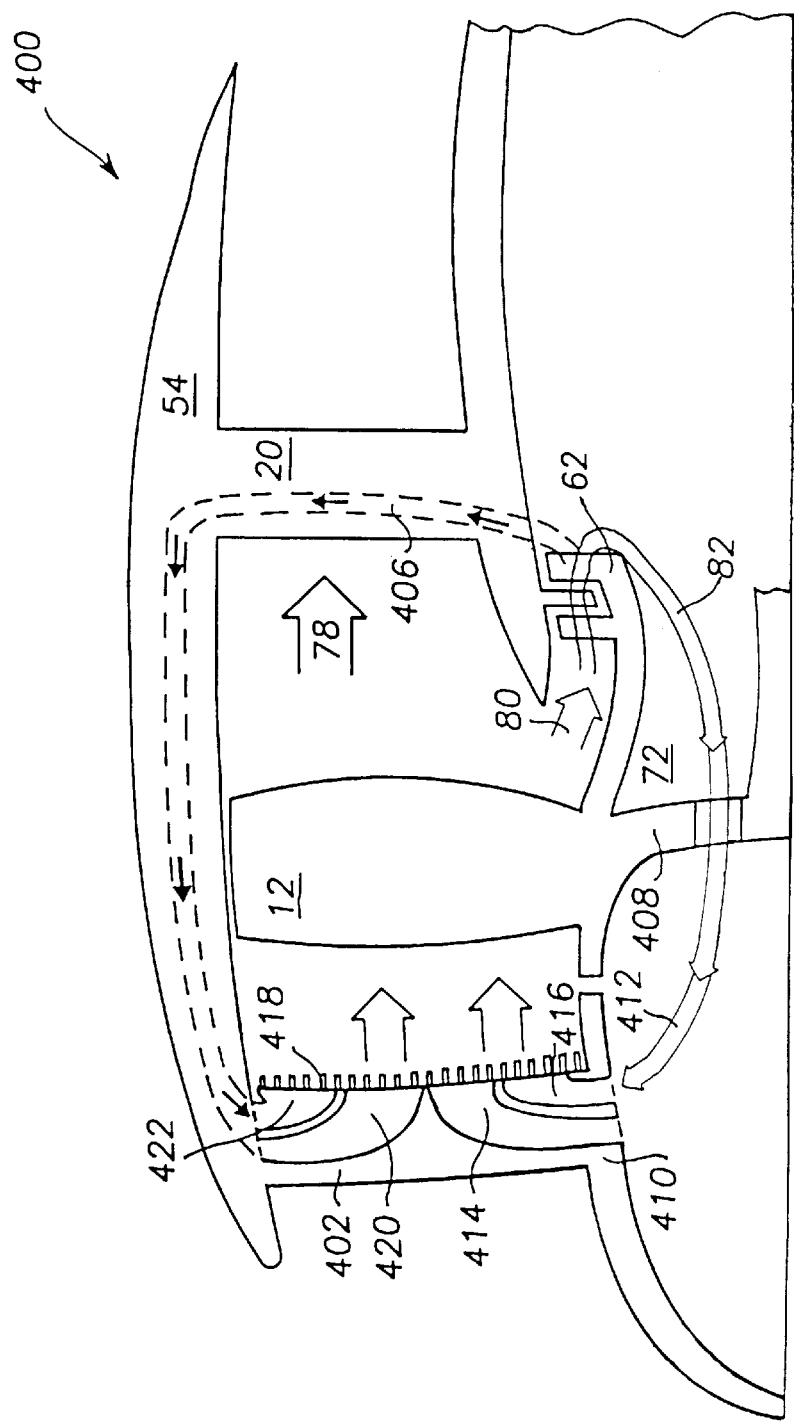
FIG. 24 is a schematic radial cross-section about the centerline of a gas turbine engine configured in accordance with the invention to provide trailing edge blowing control of the wake produced by flow around the rotor fan inlet guide vane.

Referring to FIG. 24, there is shown an example configuration 400 for enabling trailing edge blowing out of an stationary blade or inlet guide vane 402 upstream of a rotating turbofan rotor blade 12. Depending on the bypass ratio of the engine, some portion 80 of air flow 78 through the rotor is pulled into the low compressor 62. In the configuration shown, some of this air 80 is then pulled into the lower cavity 72 under the compressor, as in the configurations described earlier, while the other fraction of the air is directed into a cavity 406 in the stator 20 downstream of the rotor. Air in the lower cavity 72 is drawn 82 through the rotor disk 408 to the hub 410 of the guide vane 402, where the air is injected 412 into one or more passages 414, 416, in the vane, to be injected at the trailing edge 418 of the vane, or as in the cases above, at least about 70% along the chord of the vane, into the wake formed behind the vane. Similarly, air directed through the cavity 406 in the stator 20 is injected into one or more passages 420, 422 in the vane, to also be injected at the trailing edge 418 of the vane into the wake formed behind the vane. Because the vane does not rotate, air can be simultaneously introduced at both the hub and tip ends of the vane, whereby spanwise distribution of a selected mass flow is relatively easily accomplished.

In a configuration similar to that of FIG. 4B, boundary layer suction can also be implemented on the guide vane 402 of FIG. 24. In this case, fluid suctioned into the vane can be drawn out of both the vane hub and tip and drawn to a low pressure source such as a pump in the outer casing of the rotor. From this description, one can recognize that either or both high-pressure blowing or boundary layer suction can be applied to both ends of a stationary structure in the engine to control the wake produced by air flow around the structure. The noise associated with both broad band and tonal harmonic interaction of the wake with a downstream rotating rotor is reduced in a manner just as for a downstream stationary structure as described above.

The trailing edge blowing and boundary layer suction techniques of the invention can be further applied to a wide range of turbomachine geometries beyond those used in gas turbine engine environments. A turbomachine having rotating blades adapted in accordance with the invention for trailing edge blowing and/or boundary layer suction can be employed in a variety of applications, including heating, cooling, ventilation, and air-conditioning or other heat exchange systems, for, e.g., supply, exhaust, compression, or return air flow; in industrial exhaust systems, e.g., power roof ventilators; in electrical systems, e.g., for cooling computer components in a computer housing, such as a table top or lap top personal computer; in processed air systems, for, e.g., filtering; in pollution-control systems, for, e.g., sintering or exhaust scrubbing; in mechanical draft systems such as steam-generating units; in drier units; in ground effect machines as a lift pressure mechanism; in air-supported structures as an inflation mechanism; and in many other scenarios in which fluid flow is required, including pumping of liquid, e.g., in a centrifugal pump.

Beyond these applications, the trailing edge blowing and boundary layer suction mechanisms of the invention can be employed on rotating machines such as helicopter tail rotors and counter-rotating propeller fans. Generally, the noise associated with any combination of stationary and rotating blade structures in the path of flowing or pumping fluid can be reduced in accordance with the invention using trailing edge blowing and/or boundary layer suction on the appropriate structures. Axial-flow, radial-flow, combination-flow and other flow configurations can all be accommodated by the invention, and the size of the structures to be adapted for noise reduction is limited only by the mass flow requirements corresponding to a desired noise reduction level. Whatever the size and flow scenario of a given rotating machine, the wake produced by the rotating blades and the wake produced by stationary support or other structures both upstream and downstream from the rotor can be controlled by the wake control configurations of the invention to reduce the noise associated with interaction of those wakes with downstream structures.

Figure 25A:
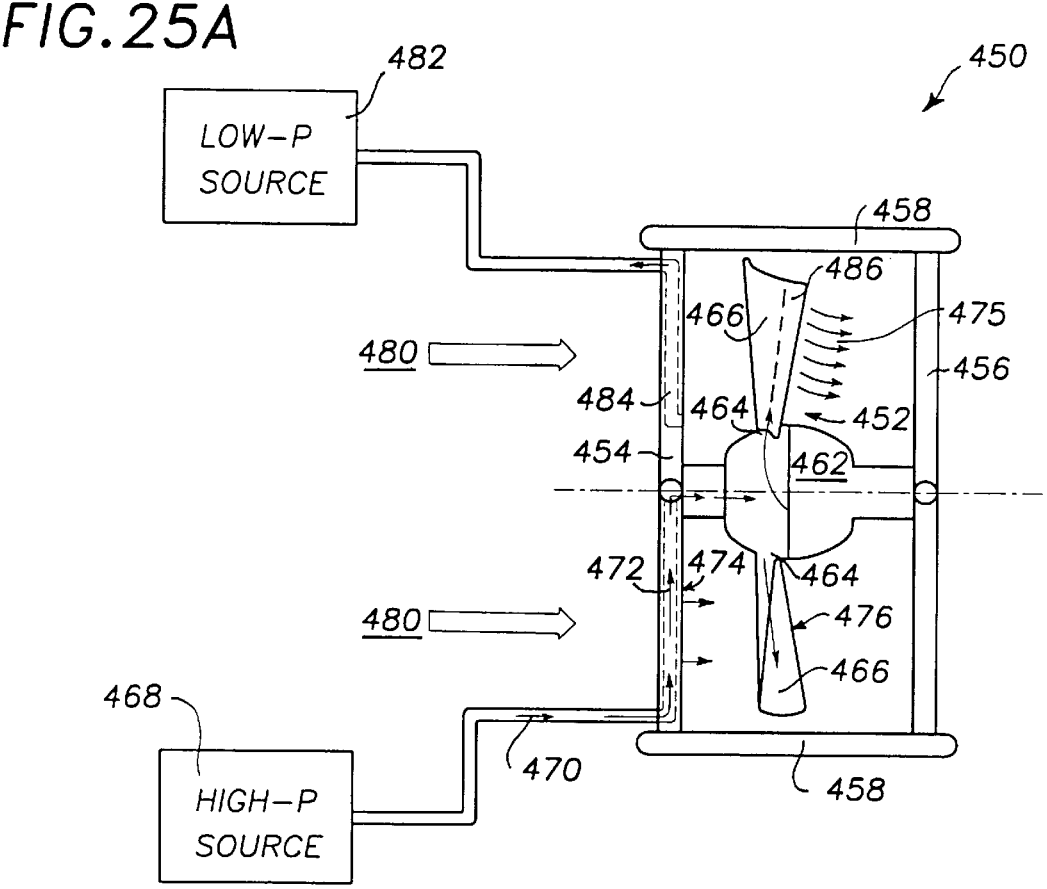
FIGS. 25A–25B are side and front views, respectively, of an axial flow-exhaust fan configured in accordance with the invention for accommodating trailing edge blowing and boundary layer suction.
Figure 25B:
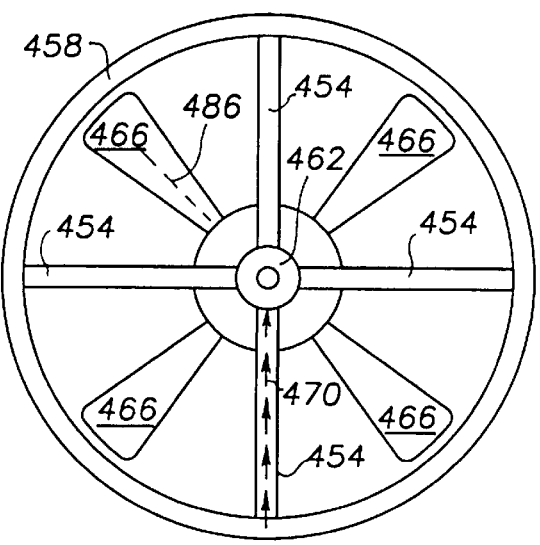

Referring to FIGS. 25A and 25B, there is shown an axial-flow fan 450 with a rotating rotor 452 supported between upstream support struts 454 and downstream support struts 456, between which is, e.g., a radially peripheral casing 458. The rotor 452 includes a rotor disk 462 to which the hub 464 of rotor blades 466 are connected. A high pressure source 468, e.g., a source of compressed air or a compressor, is provided to produce a pressure difference for driving a flow 470 of fluid into one of the struts, e.g., the front strut 454, as shown. Fluid driven into a passage 472 in the strut can be directed out of the trailing edge 474 of the strut and/or directed into a passage in the rotor disk 462. Then, using an internal blade passage configuration like any of those described earlier, the fluid can be injected 475 out of the trailing edge 476 of the rotor blades for reducing the momentum deficit of the wake produced by the rotating rotor blades. Similarly, fluid directed out of the trailing edge 474 of the strut 454 reduces the momentum deficit of the wake produced by flow 480 around the strut. As can be easily recognized, the high-pressure source could also be connected with passages in the rear support strut 456 or the radially peripheral strut 458.

Alternatively or additionally, a low-pressure source 482 can be provided in connection with one or more of the struts, e.g., 454. The low-pressure source, e.g., a vacuum pump, enables the drawing out of boundary layer fluid through, e.g., slots 484 in the strut or slots 486 in the fan rotor blades. As with the trailing edge blowing scenario, fluid is drawn though internal passages in the struts and internal passages in the rotor blades designed in the manner previously described. This demonstrates that both trailing edge blowing and boundary layer suction mechanisms can be configured in accordance with the invention in any general rotating machine structure, including fans, such as axial-exhaust fans, for reducing noise associated with the interaction of a wake, produced by both rotating and stationary fan structures, with downstream rotating or stationary structures. A wide range of low- and high-pressure sources can be employed, including various pumps or pumping devices, compressors, or other systems, for attaining a desired pressure differential; the pressure source is preferably selected based on the flow conditions and overall size of a given fan and fan system under consideration.

As explained earlier, the configuration of stationary structures, such as rotor support struts, for accomplishing suction or blowing on the struts is relatively easier than for rotating structures due to the lack of rotational effects in the stationary structures. It is therefore preferable in general to exploit the noise reduction techniques of the invention in as many stationary supports as is reasonable, in an effort to minimize noise. But in general, the blowing and suction techniques can in many cases be quite easily implemented even on rotating blades of many machinery configuration, as discussed above; typically rotating machines for, e.g., industrial applications have a lower efficiency and lower rotational speed than that of gas turbine engine fans, and in most cases, blades of the fans having these reduced operating levels can easily accommodate the design changes required to configure internal passages for wake control.

The manufacture of a blade having one or more internal passages and/or slots through its surface in accordance with the invention can be accomplished with a variety of processes. In one example process, passages can be cut into a solid blade from one blade surface and then a second blade surface attached over the cut section. Cooling fans for computers or air-conditioners, e.g., can be formed by cutting passages into the typically plastic blade material once a solid blade is formed, and then a new surface, replacing the one that was cut, glued over the passages. Alternatively, molding, e.g., injection molding, of plastic in a geometry including the passages can be accomplished. Stereolithography can also be employed to form the passages. These example manufacturing processes are best-suited for low-stress and/or low tolerance blades.

High-stress blades, which also typically require accurate, precise machining tolerances, and which are typical of jet engine rotors, require a more precise, and typically more expensive, manufacturing process. High-strength, metal alloy materials are preferable for such blades. In this case, in one example manufacturing scenario, a blade produced by first producing each of two halves, down the camber line, of the blade. The internal passages for a given wake control technique can be machined into each half and then the two halves diffusion-bonded together at high temperature. Any holes or slots to be produced in the blade can then be electrodischarge-milled as precisely as required. As will be recognized, many other manufacturing processes can alternatively be employed to produce a desired internal passage and slot geometry for a given blade design and blade material.

The foregoing description has been set forth to illustrate the many features and advantages of the trailing edge blowing and boundary layer suction techniques provided by the invention and is not intended to be limiting. Since modifications of the described embodiments incorporating the spirit and substance of the invention may occur to persons skilled in the art, the scope of the invention should be limited solely with reference to the appended claims and equivalents thereof.

We claim:

1. A method for reducing propagating broad band and tonal acoustic components of noise characteristic of interaction of a turbomachine blade wake, produced by a blade of a turbomachine as the blade rotates, with a turbomachine component downstream of the rotating blade, comprising injection of fluid into the blade wake through a plurality of discrete slots in the blade, at least one slot located at a blade chord line more than about 75% of blade chord, as the blade rotates, location of the slots along blade span and mass flow rate of the fluid injected into the blade wake from each slot being selected based on expected propagation characteristics of radial, axial, and circumferential acoustic modes associated with interaction of the wake with the downstream component, to modify momentum deficit of the wake and associated spatial harmonics of the wake, taken in a coordinate frame attached to the blade, and to correspondingly increase time-mean velocity of the wake and decrease turbulent fluctuations of the wake, reducing both propagating broad band and tonal acoustic components of noise produced by interaction of the blade wake with the turbomachine component downstream of the rotation blade.

2. The method of claim 1 wherein the mass flow rate of the fluid injected into the blade wake is selected to adjust wake width to at least about 40% of blade pitch at a distance downstream of the blade equal to about 1.5 blade chord lengths.

3. The method of claim 1 wherein the mass flow rate of the fluid injected into the blade wake is selected to increase minimum time-mean velocity of the wake to at least about 80% of time-mean velocity of freestream flow through the turbomachine, at a distance of about 1.5 blade chord lengths downstream of the blade.

4. The method of claim 1 wherein the mass flow rate of the fluid injected into the blade wake is selected to reduce maximum rms of turbulent velocity fluctuation of the wake to less than about 4% of freestream flow velocity through the turbomachine, at a distance of about 1.5 blade chord lengths downstream of the blade.

5. The method of claim 1 wherein fluid is injected into the blade wake at an angle corresponding to a flow angle characteristic of freestream flow through the turbomachine.

6. The method of claim 1 wherein the mass flow rate of the fluid injected into the blade wake is selected to produce a wake momentum deficit profile that minimizes amplitudes of propagating acoustic tonal modes produced by interaction of the blade wake with the turbomachine component downstream of the rotating blade.

7. The method of claim 6 wherein the mass flow rate of the fluid injected into the blade wake is selected to produce a wake momentum deficit profile that minimizes amplitudes of propagating acoustic tonal modes higher than a first harmonic of blade passing frequency produced by interaction of the blade wake with the turbomachine component downstream of the rotating blade.

8. The method of claim 1 wherein injection of fluid through a blade port into the blade wake comprises injection of fluid through a row of separated slots in the blade at a blade chord line more than about 75% blade chord.

9. A method for reducing propagating broad band and tonal acoustic components of noise characteristic of interaction of a turbomachine blade wake, produced by a blade of a turbomachine as the blade rotates, with a turbomachine component downstream of the rotating blade, comprising suction of boundary layer fluid into the blade, as the blade rotates, through a plurality of discrete suction slots on a side of the blade characterized as being a relatively low pressure blade side, location of the slots along blade span and mass flow rate of the boundary layer fluid suctioned into each slot being selected based on expected propagation characteristics of radial, axial, and circumferential acoustic modes associated with interaction of the wake with the downstream component to modify momentum deficit of the wake and associated spatial harmonics of the wake, taken in a coordinate frame attached to the blade, and to correspondingly increase time-mean velocity of the wake and decrease turbulent fluctuations of the wake, reducing both propagating broad band and tonal acoustic components of noise produced by interaction of the blade wake with the turbomachine component downstream of the rotation blade.

10. The method of claim 9 wherein the mass flow rate of the boundary layer fluid suctioned into the blade is selected to adjust wake width to at least about 40% of blade pitch at a distance downstream of the blade equal to about 1.5 blade chord lengths.

11. The method of claim 9 wherein the mass flow rate of the boundary layer fluid suctioned into the blade is selected to increase minimum time-mean velocity of the wake to at least about 80% of time-mean velocity of freestream flow through the turbomachine, at a distance of about 1.5 blade chord lengths downstream of the blade.

12. The method of claim 9 wherein the mass flow rate of the boundary layer fluid suctioned into the blade is selected to reduce maximum rms of turbulent velocity fluctuation of the wake to less than about 4% of freestream flow velocity through the turbomachine, at a distance of about 1.5 blade chord lengths downstream of the blade.

13. The method of claim 9 wherein the mass flow rate of the boundary layer fluid suctioned into the blade is selected to produce a wake momentum deficit profile that minimizes amplitudes of propagating acoustic tonal modes produced by interaction of the blade wake with the turbomachine component downstream of the rotating blade.

14. The method of claim 13 wherein the mass flow rate of the boundary layer fluid suctioned into the blade is selected to produce a wake momentum deficit profile that minimizes amplitudes of propagating acoustic tonal modes higher than a first harmonic of blade passing frequency produced by interaction of the blade wake with the turbomachine component downstream of the rotating blade.

15. The method of claim 9 wherein suction of boundary layer fluid into the blade suction port comprises suction of boundary layer fluid into separated slots in a row spanning at least a portion of the blade.

16. The method of claim 9 wherein suction of the boundary layer fluid into the blade suction port comprises suction of boundary layer fluid along at least a portion of blade span at a blade chord location less than about 80% blade chord.

17. A turbomachine blade comprising:
at least one internal passage extending from a corresponding open passage inlet at blade hub to a corresponding open passage outlet at a blade chord line more than about 75% of blade chord, along at least a portion of blade span, and comprising an internal passage volume substantially sufficient to accommodate fluid mass flow from the passage inlet to the passage outlet; and
a plurality of separated slots in the blade along at least a portion of the blade span corresponding to the open passage outlet of the at least one internal passage, the slots together comprising an outlet port having an area substantially sufficient to inject into a trailing edge wake produced as the blade rotates a mass flow of fluid that reduces momentum deficit characteristic of the wake, location of the slots along the blade span being selected based on expected propagation characteristics of radial, axial, and circumferential acoustic modes associated with interaction of the wake with a downstream component.

18. The blade of claim 17 wherein the separated slots are angled in the blade at an angle corresponding to a flow angle characteristic of freestream flow around the blade as it rotates.

19. The blade of claim 17 wherein the plurality of slots are along substantially the entire blade span.

20. The blade of claim 17 wherein the plurality of slots together comprise a port having an area that is about three times as large as combined closed blade areas separating the slots.

21. The blade of claim 20 wherein the slots are characterized by a slot width, between blade surfaces, that is about one-half of blade trailing edge thickness.

22. The blade of claim 17 wherein the at least one internal passage comprises at least three internal passages.

23. The blade of claim 22 wherein the at least three internal passages comprises at least four internal passages.

24. The blade of claim 17 wherein the internal passages together comprise an internal passage blade volume that is less than about 80% of total blade volume.

25. The blade of claim 17 wherein each internal passage comprises a chordwise passage width that accommodates a steady mass flow through that chordwise passage for a choked flow condition at the passage outlet.

26. The blade of claim 17 further comprising the blade hub coupling to a source of high pressure.

27. The blade of claim 26 wherein the source of high pressure comprises a gas turbine engine compressor.

28. A turbomachine blade comprising:
at least one internal passage extending from a corresponding passage end region at a point along blade span to a corresponding open passage outlet at blade hub, and comprising an internal passage volume substantially sufficient to accommodate fluid mass flow from the passage end region to the passage outlet; and
a plurality of separated slots in a side of the blade characterized as a relatively low-pressure blade side, along at least a portion of the blade span corresponding to the passage end region of the at least one internal passage, the slots together comprising a suction port having an area substantially sufficient to suction into the internal passage from a boundary layer produced as the blade rotates a mass flow of fluid that reduces momentum deficit characteristic of a wake produced as the blade rotates, location of the slots along the blade span being selected based on expected propagation characteristics of radial, axial, and circumferential acoustic modes associated with interaction of the wake with a downstream component.

29. A turbomachine blade comprising:
at least one internal passage extending from a corresponding passage end region at a point along blade span to a corresponding open passage outlet at blade tip, and comprising an internal passage volume substantially sufficient to accommodate fluid mass flow from the passage end region to the passage outlet; and
a plurality of separated slots in a side of the blade characterized as a relatively low-pressure blade side, along at least a portion of the blade span corresponding to the passage end region of the at least one internal passage, the slots together comprising a suction port having an area substantially sufficient to suction into the internal passage from a boundary layer produced as the blade rotates a mass flow of fluid that reduces momentum deficit characteristic of a wake produced as the blade rotates, location of the slots along the blade span being selected based on expected propagation characteristics of radial, axial, and circumferential acoustic modes associated with interaction of the wake with a downstream component.

30. The blade of either of claims 28 or 29 wherein the plurality of separated slots comprise at least one row of separated slots.

31. The blade of claim 30 wherein the at least one row of separated slots comprises at least two rows of slots, the slots of one row being spanwise-offset from slots in other rows, and wherein the slots are characterized by a rectangular geometry having rounded corners.

32. The blade of either of claims 28 or 29 wherein the at least one internal passage comprises at least three internal passages, each passage end region spanning a portion of the plurality of slots.

33. The blade of either of claims 28 or 29 wherein the plurality of separated slots comprises at least one row of separated slots, the at least one slot row being located at a blade chord line less than about 80% of blade chord.

34. The blade of claim 28 further comprising the blade hub coupling to a source of low pressure.

35. The blade of claim 29 further comprising a blade tip coupling to a source of low pressure.

36. A turbomachine blade comprising:
at least one internal mass flow injection passage extending from a corresponding open injection passage inlet at blade hub to a corresponding open injection passage outlet at a port in the blade at a blade chord line more than about 75% blade chord along at least a portion of blade span, and comprising an internal injection passage volume substantially sufficient to accommodate fluid mass flow from the injection passage inlet to the injection passage outlet;
a plurality of separated injection slots in the blade along at least a portion of the blade span corresponding to the open passage outlet of the at least one injection passage, the injection slots together comprising an outlet port area substantially sufficient to inject from the internal injection passage into a trailing edge wake produced as the blade rotates a mass flow of fluid that reduces momentum deficit characteristic of the wake;

at least one internal mass flow suction passage extending from a corresponding suction passage end region at the point along blade span to the corresponding open suction passage outlet at blade tip, and comprising an internal suction passage volume substantially sufficient to accommodate fluid mass flow from the suction passage end region to the suction passage outlet; and a plurality of separated suction slots in a side of the blade characterized as a relatively low-pressure blade side, along at least a portion of the blade span corresponding to the suction passage end region of the at least one suction passage, the suction slots together comprising a suction area substantially sufficient to suction into the internal suction passage from a boundary layer produced as the blade rotates a mass flow of fluid that reduces momentum deficit characteristic of the wake.

37. The blade of claim 36 wherein the at least one mass flow injection passage comprises at least three mass flow injection passages.

38. The blade of claim 36 wherein the plurality of separated suction slots comprise at least one row of separated suction slots.

39. The blade of claim 38 wherein the at least one row of separated suction slots is located at a blade chord line less than about 80% of blade chord.

40. The blade of claim 36 further comprising:
a blade tip coupling to a source of low pressure; and
a blade hub coupling to a source of high pressure.

41. The blade of claim 40 wherein the high pressure source comprises a gas turbine engine compressor and wherein the low pressure source comprises a pump located in a casing radially peripheral to the blade tip.

42. The blade of claim 36 further comprising a shroud connected to the blade tip and having a slot corresponding to the open suction passage outlet at the blade tip.

43. The blade of claim 42 wherein the shroud comprises suction orifii.

44. A turbomachine comprising:
a rotor having a plurality of rotor blades each connected at a rotor blade hub to a rotor disk for rotation about a radial axis of the disk;
a stationary blade upstream of the rotor, the stationary blade having at least one internal passage extending between a corresponding open passage inlet at one end of the stationary blade to a corresponding open passage outlet at a stationary blade chord line more than about 75% of stationary blade chord along at least a portion of stationary blade span, and comprising an internal passage volume substantially sufficient to accommodate fluid mass flow from the passage inlet to passage outlet, a plurality of separated slots being located in the stationary blade along at least a portion of the stationary blade span corresponding to the open passage outlet of the at least one internal passage, the slots together comprising an outlet port having an area substantially sufficient to inject into a trailing edge stationary blade wake produced as fluid flows around the stationary blade a mass flow that reduces momentum deficit characteristic of the stationary blade wake; and
a coupling path from the open passage inlet of the stationary blade to a compressor for providing a source of high pressure to the at least one internal passage of the stationary blade.

45. A turbomachine comprising:
a rotor having a plurality of rotor blades each connected at a blade hub to a rotor disk for rotation about a radial axis of the disk;
a stationary blade upstream of the rotor, the stationary blade having at least one internal passage extending from a corresponding passage end region at a point along stationary blade span to an open passage outlet at one end of the stationary blade, and comprising an internal passage volume substantially sufficient to accommodate fluid mass flow from the passage end region to the passage outlet, a plurality of separated slots being located in a side of the stationary blade along at least a portion of the stationary blade span corresponding to the passage end region of the at least one internal passage, the slots together comprising a suction port having an area substantially sufficient to suction into the internal passage from a boundary layer produced as fluid flows around the stationary blade a mass flow of fluid that reduces momentum deficit characteristic of a stationary blade wake produced as fluid flows around the stationary blade; and a coupling path from the open passage outlet of the stationary blade to a pump in a casing of the rotor for providing a source of low pressure to the at least one internal passage of the stationary blade.

46. A turbomachine comprising:
a rotatable shaft;
a support strut engaged with the shaft for supporting the shaft as it rotates; and
a plurality of blades, each blade being connected at a blade hub to the shaft and having at least one internal blade passage extending from a corresponding open passage inlet, for coupling at the blade hub to a source of high pressure, to a corresponding open passage outlet at a blade chord line more than about 75% of blade chord along at least a portion of blade span, and comprising an internal passage volume substantially sufficient to accommodate fluid mass flow from the passage inlet to the passage outlet, a plurality of separated slots being located in the blade along at least a portion of the blade span corresponding to the open passage outlet of the at least one internal blade passage, the slots together comprising an outlet port having an area substantially sufficient to inject into a trailing edge wake produced as the blade rotates a mass flow of fluid from the high pressure source that reduces momentum deficit characteristic of the blade wake.

47. The turbomachine of claim 46 wherein the support strut comprises an internal strut passage having a passage inlet for coupling to the source of high pressure and having a plurality of separated slots located at a strut chord line more than about 75% of strut chord along at least a portion of strut span and connected to the internal strut passage, the slots together comprising an outlet port having an area substantially sufficient to inject into a trailing edge strut wake produced as fluid flows around the strut a mass flow of fluid from the high pressure source that reduces momentum deficit characteristic of the strut wake.

48. A turbomachine comprising:
a rotatable shaft;
a support strut engaged with the shaft at an end of the shaft for supporting the shaft as it rotates; and
a plurality of blades, each blade being connected at a blade hub to the shaft and having at least one internal blade passage extending from a corresponding passage end region at a point along blade span to a corresponding open passage outlet at blade hub for coupling to a source of low pressure, and comprising an internal passage volume substantially sufficient to accommodate fluid mass flow from the passage end region to the passage outlet, a plurality of separated slots being located in a side of the blade characterized as a relatively low-pressure blade side, along at least a portion of the blade span corresponding to the passage end region of the at least one internal passage, the slots together comprising a suction port having an area substantially sufficient to suction to the low pressure source through the internal blade passage from a boundary layer produced as the blade rotates a mass flow of fluid that reduces momentum deficit characteristic of a wake produced as the blade rotates.

49. The turbomachine of claim 48 wherein the support strut comprises a internal strut passage having a passage outlet for coupling to the source of low pressure and having a plurality of separated slots in a side of the strut along at least a portion of strut span, the slots together comprising a suction port having an area substantially sufficient to suction to the low-pressure source through the internal strut passage from a boundary layer produced as fluid flows around the strut a mass flow of fluid that reduces momentum deficit characteristic of a strut wake produced as fluid flows around the strut.

\* \* \* \* \*